United States Patent
Nosaki et al.

[11] Patent Number: 6,016,386
[45] Date of Patent: Jan. 18, 2000

[54] IMAGE FORMING SYSTEM FOR PREPARING SUBSEQUENT COPIES QUICKLY

[75] Inventors: Takefumi Nosaki, Odawara; Toshiharu Takahashi, Kawasaki, both of Japan

[73] Assignee: Kabushiki Kaisha Toshiba, Kawasaki, Japan

[21] Appl. No.: 08/893,118

[22] Filed: Jul. 15, 1997

Related U.S. Application Data

[63] Continuation of application No. 08/407,104, Mar. 17, 1995, abandoned.

[30] Foreign Application Priority Data

Mar. 31, 1994 [JP] Japan .................................. 6-085551

[51] Int. Cl.$^7$ .................................................. H04N 1/00
[52] U.S. Cl. ......................... 395/114; 395/116; 358/403; 358/450
[58] Field of Search .................................. 358/401, 403, 358/404, 444, 468, 442, 426, 450; 395/114, 117, 109, 116, 115

[56] References Cited

U.S. PATENT DOCUMENTS

| | | | |
|---|---|---|---|
| 5,068,745 | 11/1991 | Shimura | 358/403 |
| 5,084,770 | 1/1992 | Nakayama | 358/403 |
| 5,220,438 | 6/1993 | Yamamoto | 358/404 |
| 5,222,157 | 6/1993 | Yoneda et al. | 358/403 |
| 5,251,297 | 10/1993 | Takayanagi | 358/403 |
| 5,377,016 | 12/1994 | Kashinagi et al. | 358/468 |
| 5,383,029 | 1/1995 | Kojima | 358/403 |
| 5,448,375 | 9/1995 | Cooper et al. | 358/444 |
| 5,459,579 | 10/1995 | Hu et al. | 358/401 |

*Primary Examiner*—Kim Yen Vu
*Assistant Examiner*—Cheukfan Lee
*Attorney, Agent, or Firm*—Limbach & Limbach LLP

[57] ABSTRACT

In a composite digital copying machine of a plain paper copying machine, a printer, and a facsimile apparatus, when the machine is operated as a printer for printing out document data of codes created by a wordprocessor, an internally obtained data image is compressed and stored, as image data, in a hard disk simultaneously with print processing of the data. When this printout is to be copied later, the original image data is searched or retrieved to be printed without scanning the printout.

14 Claims, 46 Drawing Sheets

| 8 BITS/PIX | | 4TH. PIX | 3TH. PIX | 2ND. PIX | 1ST. PIX |
|---|---|---|---|---|---|
| TD7-1 | BISD | (31) | (23) | (15) | (07) |
| TD6-1 | BISD | (30) | (22) | (14) | (06) |
| TD5-1 | BISD | (29) | (21) | (13) | (05) |
| TD4-1 | BISD | (28) | (20) | (12) | (04) |
| TD3-1 | BISD | (27) | (19) | (11) | (03) |
| TD2-1 | BISD | (26) | (18) | (10) | (02) |
| TD1-1 | BISD | (25) | (17) | (09) | (01) |
| TD0-1 | BISD | (24) | (16) | (08) | (00) |

| 4 BITS/PIX | | 8TH. PIX | 7TH. PIX | 6TH. PIX | 5TH. PIX | 4TH. PIX | 3TH. PIX | 2ND. PIX | 1ST. PIX |
|---|---|---|---|---|---|---|---|---|---|
| TD7-1 | BISD | (31) | (27) | (23) | (19) | (15) | (11) | (07) | (03) |
| TD6-1 | BISD | (30) | (26) | (22) | (18) | (14) | (10) | (06) | (02) |
| TD5-1 | BISD | (29) | (25) | (21) | (17) | (13) | (09) | (05) | (01) |
| TD4-1 | BISD | (28) | (24) | (20) | (16) | (12) | (08) | (04) | (00) |
| TD3-1 | | | | | | | | | |
| TD2-1 | | | | | | | | | |
| TD1-1 | | | | | | | | | |
| TD0-1 | | | | | | | | | |

| 1 BIT/PIX | | 32TH. PIX | 31TH. PIX | 30TH. PIX | ... | 3TH. PIX | 2ND. PIX | 1ST. PIX |
|---|---|---|---|---|---|---|---|---|
| TD7-1 | BISD | (31) | (30) | (29) | --- | (02) | (01) | (00) |
| TD6-1 | | | | | | | | |
| TD5-1 | | | | | | | | |
| TD4-1 | | | | | | | | |
| TD3-1 | | | | | | | | |
| TD2-1 | | | | | | | | |
| TD1-1 | | | | | | | | |
| TD0-1 | | | | | | | | |

FIG. 16

|  | 8TH. PIX | 7TH. PIX | 6TH. PIX | 5TH. PIX | 4TH. PIX | 3TH. PIX | 2ND. PIX | 1ST. PIX | | |
|---|---|---|---|---|---|---|---|---|---|---|
| 4 BITS/PIX | | | | | | | | | | |
| BISD | (31) | (27) | (23) | (19) | (15) | (11) | (07) | (03) | -1 | PXD7-1 |
| BISD | (30) | (26) | (22) | (18) | (14) | (10) | (06) | (02) | -1 | PXD6-1 |
| BISD | (29) | (25) | (21) | (17) | (13) | (09) | (05) | (01) | -1 | PXD5-1 |
| BISD | (28) | (24) | (20) | (16) | (12) | (08) | (04) | (00) | -1 | PXD4-1 |

|  | 32TH. PIX | 31TH. PIX | 30TH. PIX | — — — — — — | 3TH. PIX | 2ND. PIX | 1ST. PIX | | |
|---|---|---|---|---|---|---|---|---|---|
| 1 BIT/PIX | | | | | | | | | |
| BISD | (31) | (30) | (29) | — — — — — — | (02) | (01) | (00) | -1 | PXD7-1 |
|  | 0 | 0 | 0 | | 0 | 0 | 0 | | PXD6-1 |
|  | 0 | 0 | 0 | | 0 | 0 | 0 | | PXD5-1 |
|  | 0 | 0 | 0 | | 0 | 0 | 0 | | PXD4-1 |

FIG. 17

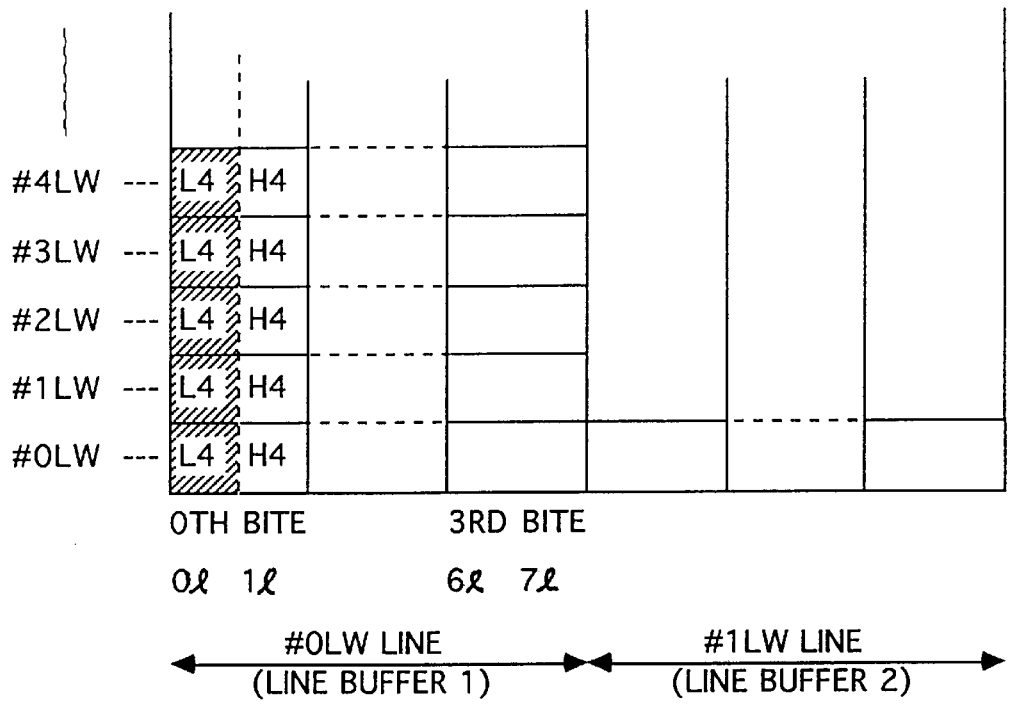
FIG. 18A
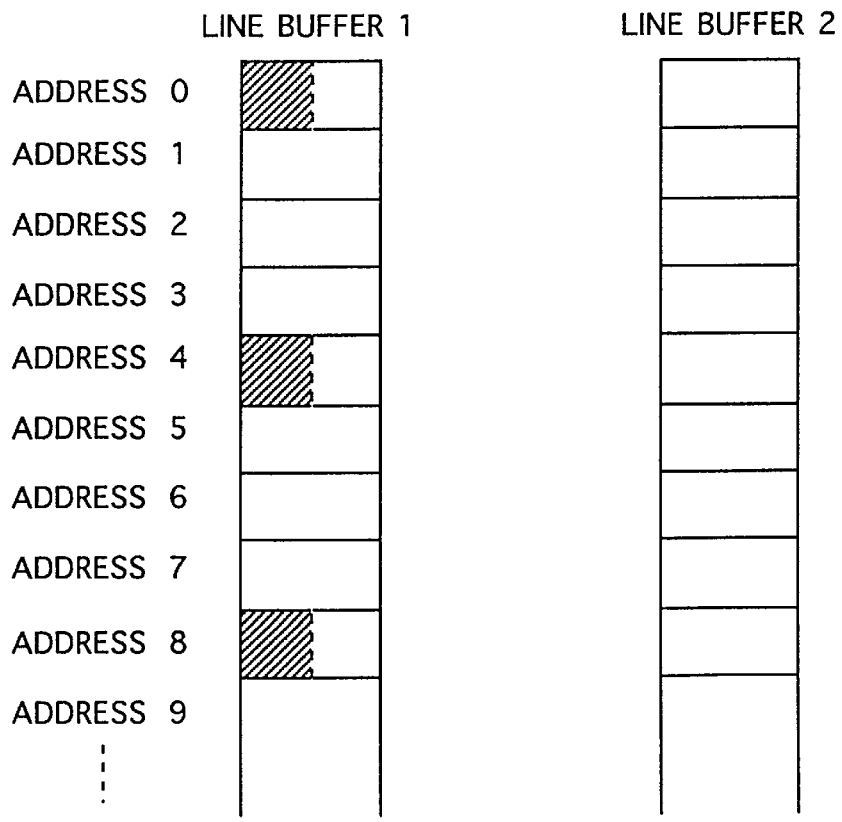
FIG. 18B  FIG. 18C

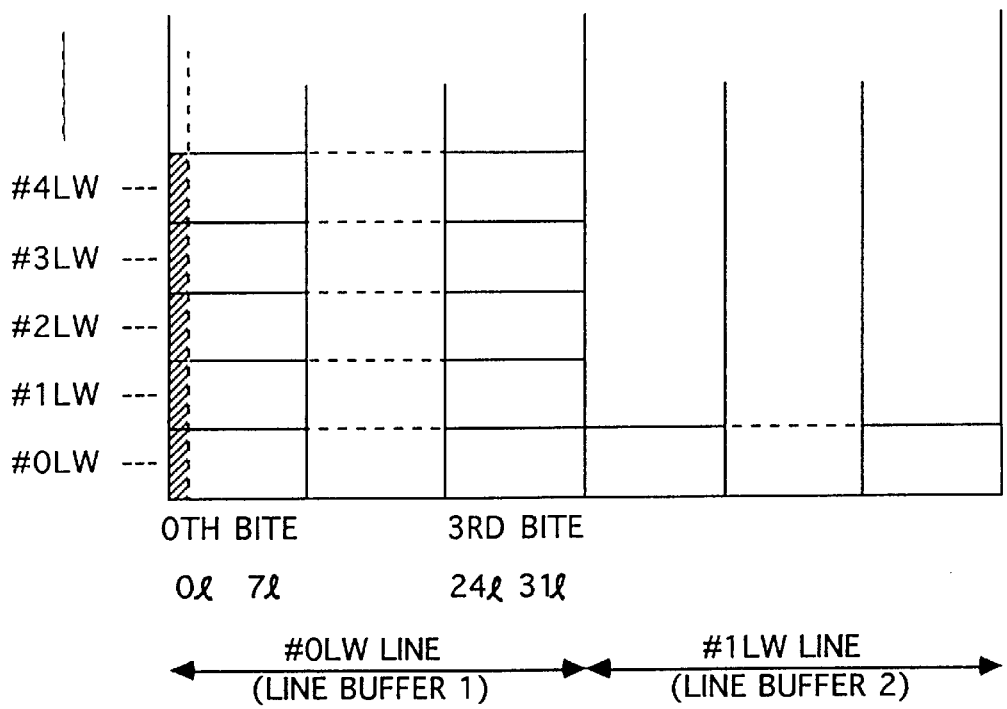
FIG. 19A
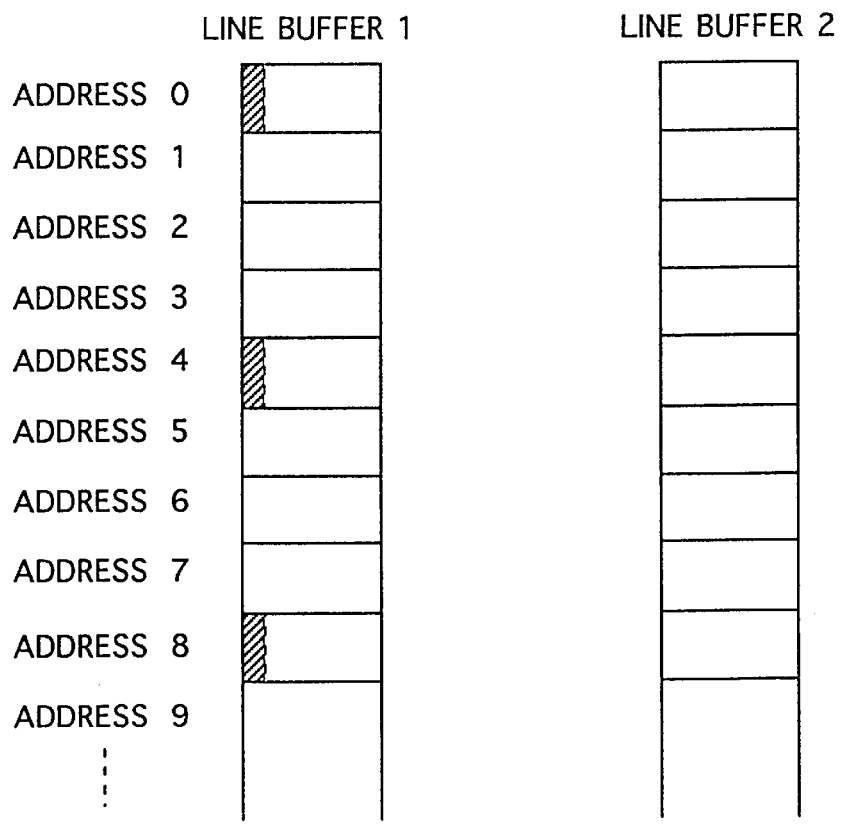
FIG. 19B  FIG. 19C

PAGE DATA AREA
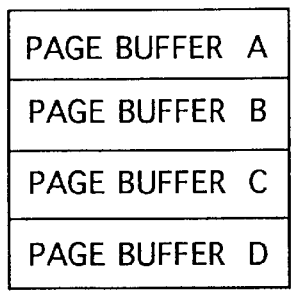
FIG. 20A
COMPRESSED DATA AREA
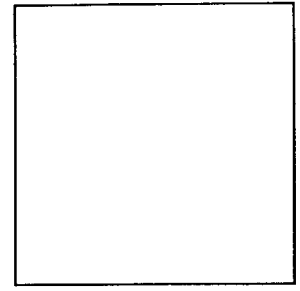
FIG. 20B
COMPRESSED DATA MANAGEMENT AREA
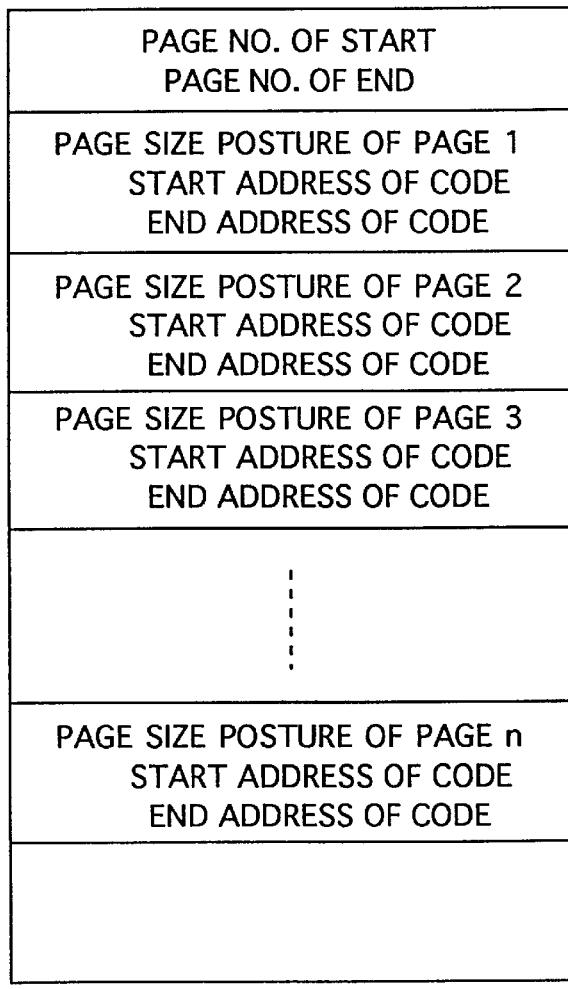
COMPRESSED CODE DATA AREA
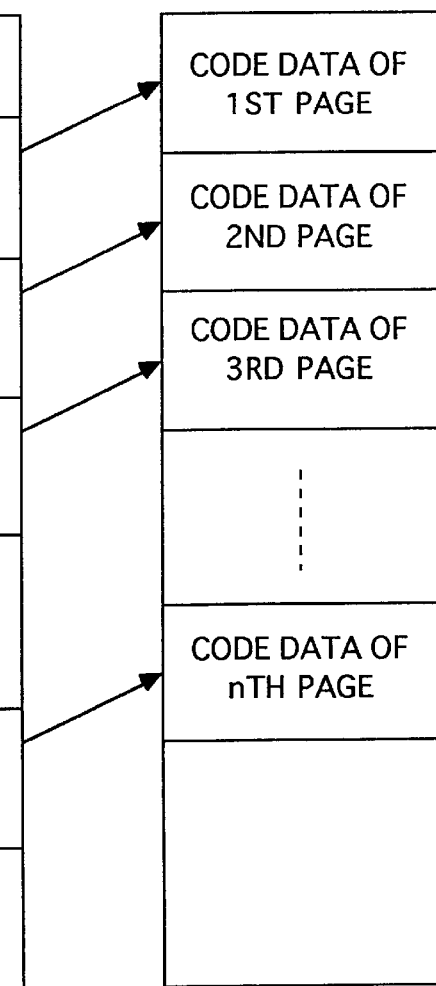
FIG. 21

940224006-01

[NAME OF DOCUMENT]    SPECIFICATION

[TITLE OF THE INVENTION]    IMAGE FORMING APPARATUS

[WHAT IS CLAIMED IS]

[CLAIM 1]    BASE FOR PLACING AN ORIGINAL;

MEANS FOR CARRYING THE ORIGINAL TO THE BASE;

MEANS FOR READING IMAGE FROM THE ORIGINAL PLACED ON THE BASE;

xxxxxxxxxxxxxxxxxxxxxxxxxxxxxxxxxxxxxxxxxxxxxx xxxxxxxxxxxxxxxxxxxxxxxxxxxxxxxxxxxxxxxxxxxxxx xxxxxxxxxxxxxxxxxxxxxxxxxxxxxxxxxxxxxxxxxxxxxx xxxxxxxxxxxxxxxxxxxxxxxxxxxxxxxxxxxxxxxxxxxxxx xxxxxxxxxxxxxxxxxxxxxxxxxxxxxxxxxxxxxxxxxxxxxx xxxxxxxxxxxxxxxxxxxxxxxxxxxxxxxxxxxxxxxxxxxxxx xxxxxxxxxxxxxxxxxxxxxxxxxxxxxxxxxxxxxxxxxxxxxx xxxxxxxxxxxxxxxxxxxxxxxxxxxxxxxxxxxxxxxxxxxxxx xxxxxxxxxxxxxxxxxxxxxxxxxxxxxxxxxxxxxxxxxxxxxx

FILE STRUCTURE

|  | YEAR | MONTH | DAY | DOC. NO. | PAGE NO. |
|---|---|---|---|---|---|
| FILE NAME --- 9 | 4 | 0 2 | 2 2 | 0 0 5 | 0 0 0 --- |

RENEWED TIME STAMP (YEAR/MONTH/DAY/HOUR/MIN./SEC)

LEADING ADDRESS

TOTAL FILE SIZE

FILE NAME
RENEWED TIME STAMP
LEADING ADDRESS
TOTAL FILE SIZE
|
|
|
TOTAL PAGE NUMBERS
LEADING ADDRESS OF STORAGE AREA FOR 1ST. PAGE OF DOCUMENT
LEADING ADDRESS OF STORAGE AREA FOR 2ND. PAGE OF DOCUMENT
|
|
|
IMAGE SIZE OF 1ST. PAGE
RESOLUTION OF 1ST. PAGE
TYPE OF CODEC FOR 1ST. PAGE
CODE AMOUNT OF 1ST. PAGE
CODE DATA OF 1ST. PAGE
|
|
|
IMAGE SIZE OF 2ND. PAGE
RESOLUTION OF 2ND. PAGE
TYPE OF CODEC FOR 2ND. PAGE
CODE AMOUNT OF 2ND. PAGE
CODE DATA OF 2ND. PAGE
|
|
|

FIG. 37

IMAGE FORMING SYSTEM FOR PREPARING SUBSEQUENT COPIES QUICKLY

This is a continuation of application Ser. No. 08/407,104 filed on Mar. 17, 1995, now abandoned.

BACKGROUND OF THE INVENTION

1. Field of the Invention

The present invention relates to an image forming system or apparatus such as a composite digital copying machine of a plain paper copying machine, a printer, and a facsimile apparatus.

2. Description of the Related Art

A conventional plain paper copying machine (PPC) is designed to record an image formed on a paper original on a recording medium such as a paper sheet in the hard copy form.

A conventional printer is designed to record image information or code information received from a conventional printer or personal computer (PC) on a recording medium such as a paper sheet directly or upon code/image conversion.

A conventional facsimile apparatus (FAX) is designed to expand compressed/coded image information received from other party to record the information on a recording medium such as a paper sheet in the reception mode. In the transmission mode, the FAX photoelectrically converts image information on a paper original into image data, and transmits compressed code information of the image data to the other party.

Assume that the user wants to produce 10 copies of a printout. In this case, there are two options: (1) sending the original data to the printer so as to print out 10 copies, and (2) producing 10 copies of the printout by using a copying machine.

The problem in the former case is that the printing speed is relatively low because the printer generally takes much time to perform code/image conversion. Therefore, it takes much time to obtain desired products, i.e., 10 copies.

The problem in the latter case is that an image deterioration tends to occur in copying the printout of a complicated image because reading and image formation steps are performed again in each copying operation. As a result, a desired copy quality cannot be obtained in many cases.

SUMMARY OF THE INVENTION

It is accordingly an object of the present invention to provide an image forming system which can obtain a printout identical to another printout at a high speed without any image deterioration.

According to an image forming system of the present invention, code data is received by reception means, and the received code data is converted into image data by conversion means. An image as the converted image data is compressed by compression means. The compressed image is stored in document storage means in units of documents each comprising one or more pages in correspondence with retrieval data (or search information) for retrieving (or searching) each document. Image data of the retrieval (or searched) data is added to the image data converted by the conversion means. The image to which the retrieval data is added is formed on an image formation medium by image forming means. When the retrieval data (search information) is input, image data stored in units of documents in correspondence with the input retrieval data is read out from the document storage means. The image data read out in units of pages is expanded. An image of the expanded image data is formed on an image formation medium by the image forming means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 16 explains the conversion in a 32-bit converter;

FIG. 17 explains the conversion in a pixel converter;

FIGS. 18A, 18B, and 18C are views for explaining the operation of a rotation processing section in a mode of four bits/pixel;

FIGS. 19A, 19B, and 19C are views for explaining the operation of the rotation processing section in a mode of one bit/pixel;

FIGS. 20A and 20B are views for explaining examples of data stored in the page memory;

FIG. 21 exemplifies data stored in the page memory;

FIG. 22 is a view showing a printout (hard copy) with retrieval data (serial No. as search information) being added thereto;

FIG. 37 is a view for explaining the file structure of the hard disk.

DETAILED DESCRIPTION OF THE PREFERRED EMBODIMENTS

An embodiment of the present invention will be described below with reference to the accompanying drawings.

Figure 1A:
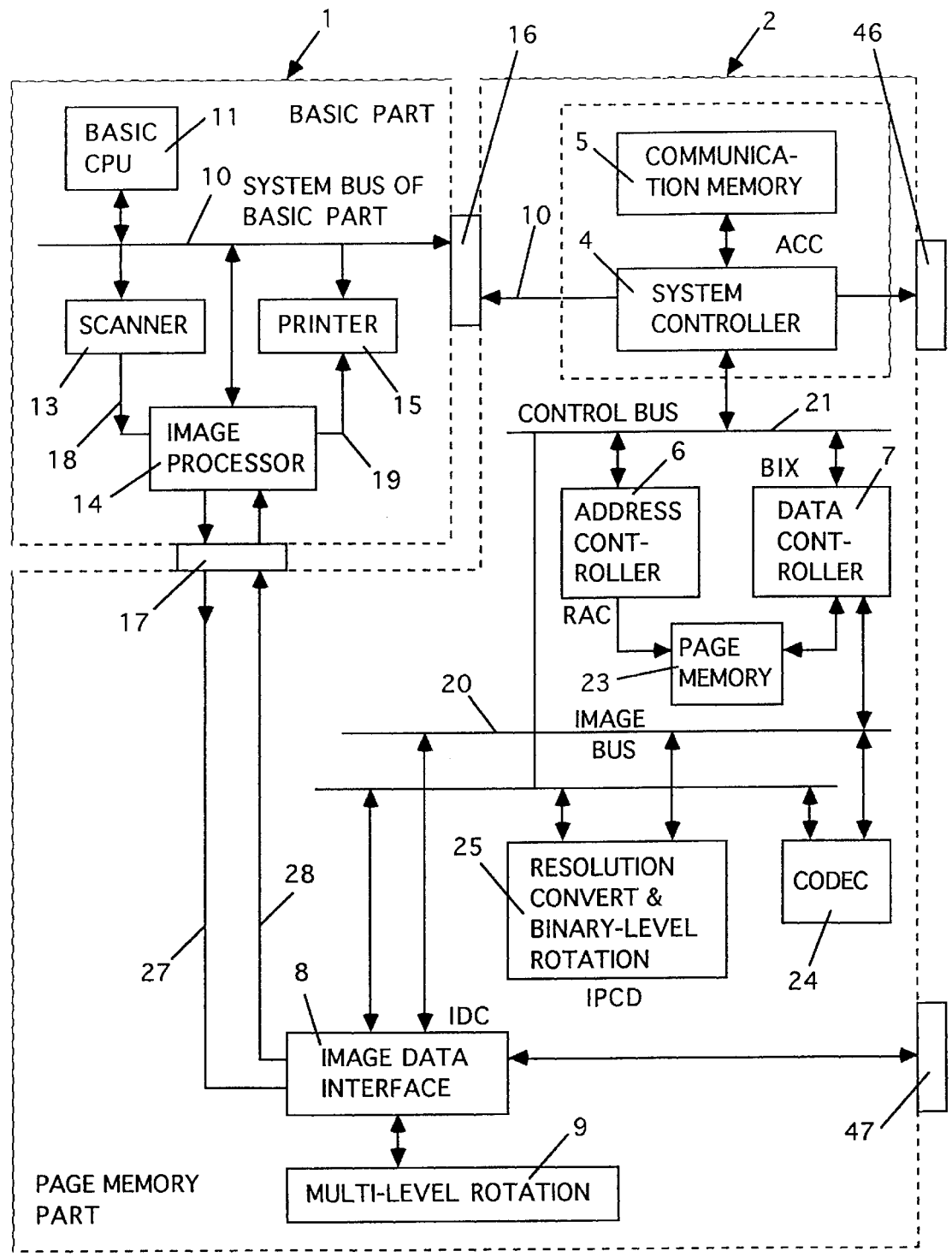
FIGS. 1A and 1B are block diagrams showing the overall arrangement of an image forming system according to an embodiment of the present invention.
Figure 1B:
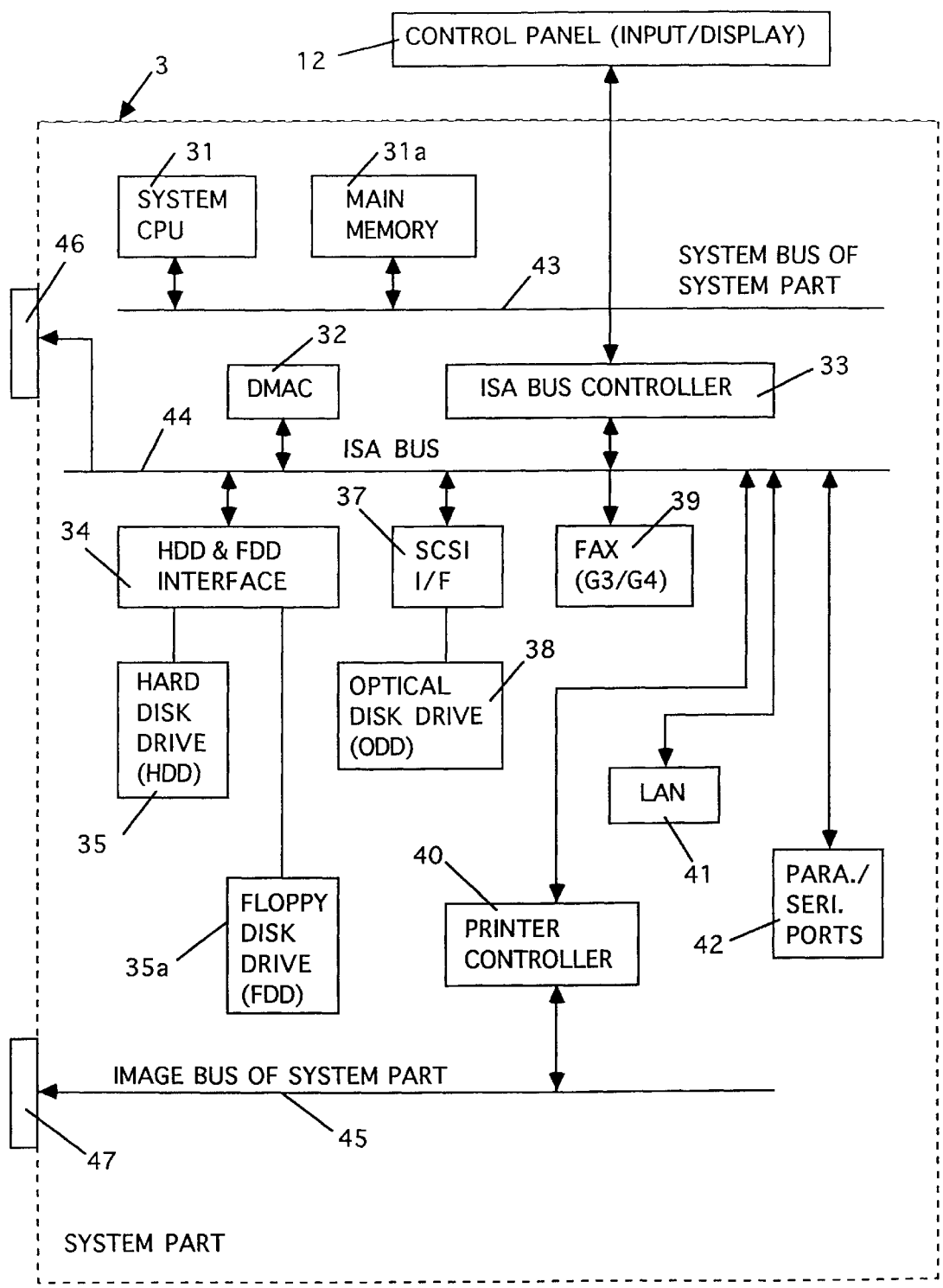

FIGS. 1A and 1B are block diagrams showing the schematic arrangement of an image forming system such as a digital copying machine control system according to an embodiment of the present invention.

The digital copying machine control system is basically constituted by three blocks, i.e., basic part 1, page memory part 2, and system part 3. In basic part 1, scanner 13 and printer 15 are connected to each other via image processing unit 14, thus constituting a digital copying machine. Page memory part 2 receives/stores image data from basic part 1 and transfers the stored image data to basic part 1, thereby realizing a memory copy function. System part 3 includes optical disk drive (ODD) 38, hard disk drive (HDD) 35, and floppy disk drive (FDD) 35a, as a secondary memory for storing compressed image data from page memory part 2. System part 3 also includes FAX board (G4/G3•FAX control unit) 39 for exchanging compressed image data with an external device via a public line, parallel/serial port 42 for exchanging data with an external device, and LAN board (Local Area Network line control unit) 41 for exchanging data via a LAN. System part 3 further includes a mother board comprising system CPU 31 for controlling the above components via system bus 43 and ISA bus 44, main memory 31a used by system CPU 31, and DMAC 32 for controlling a DMA transfer operation on ISA bus 44.

Basic part 1 and page memory part 2 are connected to each other via basic part system interface 16 for exchanging control data and basic part image interface 17 for exchanging image data. Page memory part 2 and system part 3 are connected to each other via system part system interface 46 for exchanging control data and system part image interface 47 for exchanging image data. Basic part 1 and system part 3 are not directly to each other and always exchange image data with each other via page memory part 2.

The internal arrangement of the above three systems will be described below.

Basic part 1 comprises input unit (scanner) 13, output unit (printer) 15, image processing unit 14, and control unit (basic part CPU) 11 for controlling these components.

Scanner 13 includes a CCD line sensor (not shown) constituted by a plurality of light-receiving elements (corresponding to one line) arranged in a line. Scanner 13 reads an image on an original placed on an original table (not shown) in units of lines in accordance with a command from basic part CPU 11, and converts the density of an image into 8-bit digital data. Thereafter, scanner 13 outputs the digital data as time series digital data to image processing unit 14, together with a sync signal, via scanner interface 18.

Figure 6:
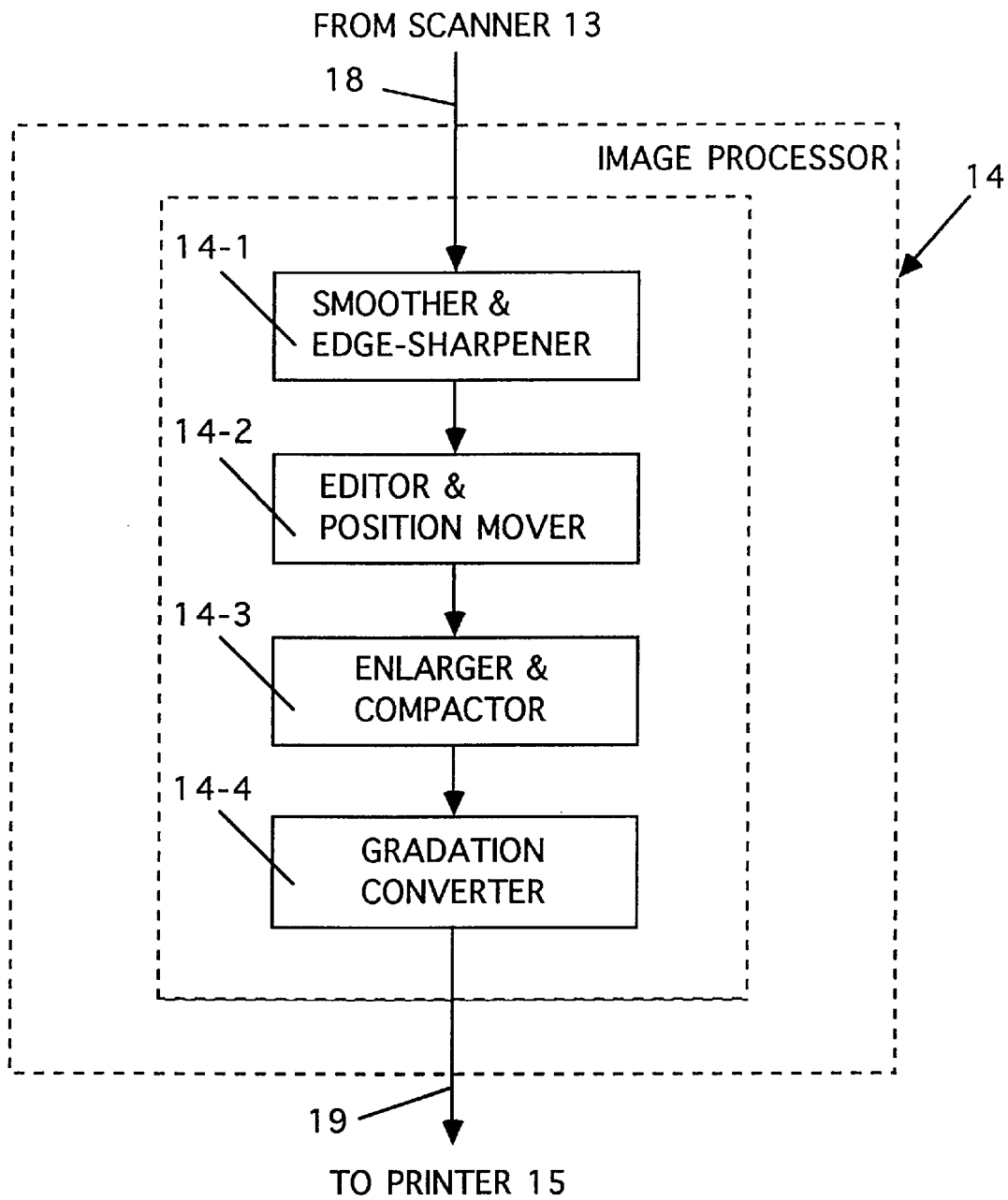
FIG. 6 is a block diagram showing the schematic arrangement of an image processing unit.

FIG. 6 shows the schematic arrangement of image processing unit 14. In smoothing/edge sharpening unit 14-1, a smoothing circuit removes noise mixed with image data in an image read operation, and an edge emphasizing circuit sharpens an edge blurred by a smoothing operation. Editing/moving unit 14-2 is a block for performing simple edit processing in units of lines. For example, editing/moving unit 14-2 performs move processing in the line direction and masking/trimming processing. Enlargement/reduction unit 14-3 performs enlargement/reduction processing by repetitive pixel processing in accordance with a designated magnification or a combination of thinning processing and interpolation processing. Gray scale transformation unit (gradation converter) 14-4 performs gray scale transformation of image data formed of 8-bit pixels and read by scanner 13 in accordance with a designated gray scale level by using a dot matrix method. The image data having undergone gray scale transformation is supplied, as image data formed of 4-bit pixels conforming to the bit count of printer 15 (to be described later), to printer 15, or to page memory part 2 via scanner data bus 27 and basic part image interface 17. The nonlinearity of the input/output characteristics of printer 15 is corrected by using the dot matrix method at the same time when gray scale processing is performed.

Basic part CPU 11 controls each of the above unit in basic part 1 and each unit in page memory part 2 (to be described later).

Page memory part 2 comprises system control unit 4, storage unit (page memory) 23, address controller 6, image bus 20, control bus 21, data control unit 7, image data I/F unit 8, resolution conversion/binary rotation unit 25, compression/expansion unit 24, and multivalued rotation memory 9. System control unit 4 controls communication of control information between basic part CPU 11 in basic part 1 and system CPU 31 in system part 3, and also controls access from basic part 1 and system part 3 to page memory 23. System control unit 4 incorporates communication memory 5. Page memory 23 temporarily stores image data. Address controller 6 generates an address for page memory 23. Image bus 20 serves to perform data transfer between the respective devices in page memory part 2. Control bus 21 serves to transfer a control signal between each device in page memory part 2 and system control unit 4. Data control unit 7 controls a data transfer operation when data is to be transferred between page memory 23 and another device via image bus 20. Image data I/F unit 8 serves as an interface for image data when the image data is to be transferred to basic part 1 via basic part image interface 17. When image data is to be transmitted to another device having a different resolution, resolution conversion/binary rotation unit 25 converts the image data into the resolution data of this device. Resolution conversion/binary rotation unit 25 converts image data received from a device having a different resolution into the resolution data of printer 15 of basic part 1, and also executes 90°-rotation processing of binary image data. Compression/expansion unit 24 transmits image data upon compression as in facsimile transmission or optical disk storage processing, compresses input image data for a storage device, and expands compressed image data to visualize it through printer 15. Multivalued rotation memory 9 is connected to image data I/F unit 8 and used to output image data upon rotating it through 90° or −90° when the image data is to be output from printer 15. Each unit in page memory part 2 will be described in detail later.

System part 3 comprises system CPU 31, main memory 31a, general ISA bus 44, ISA bus controller (ISA•B/C) 33, DMA controller (DMAC) 32, storage unit (HDD/FDD) 35/35a, HD•FD interface (HD•FD I/F) 34, storage unit (optical disk drive: ODD) 38, SCSI interface 37, local area network line control unit (LAN) 41, printer control unit 40, G3•FAX control unit 39, parallel/serial port 42, and system part image bus 45. System CPU 31 controls each device in system part 3 via system bus 43. Main memory 31a is used by basic part 1. ISA•B/C 33 serves as an interface between system bus 43 and ISA bus 44. DMAC 32 controls data transfer on ISA bus 44. HDD 35 is connected to ISA bus 44 to electronically store image data. HD•FD I/F 34 serves as an interface for HDD 35. ODD 38 is connected to ISA bus 44 to electronically store image data. SCSI interface 37 serves as an interface for ODD 38. Local area network line control unit (LAN) 41 is used to realize a LAN function. G3•FAX control unit 39 has a G3•FAX control function. Parallel/serial port 42 serves to exchange data with an external device. System part image bus 45 outputs image data from printer controller unit 40 to page memory part 2 via system part image interface 47.

Compressed image data is stored, as files, in hard disk HD incorporated in HDD 35 in units of documents each comprising one or more pages in such a manner that the stored data is managed by retrieval data (search data) for retrieving (searching) each document.

As shown in FIG. 37, this file structure is constituted by a file name consisting of "year", "month", "day", a document number, and a page number, updated time and date, a start address, a total file size, updated time and date, a start address, a total file size, . . . , a total page count, the start address of a first-page document storage area, the start address of a second-page document storage area, . . . , a first-page image size, a first-page resolution, a first-page compressing/coding scheme, a first-page code amount, first-page code data, . . . , a second-page image size, . . . .

A keyboard used to input a command to system part 3 and control panel 12 constituted by a display are connected to system bus 43.

Storage unit (ODD) 38 is connected to ISA bus 44 via SCSI interface 37. System CPU 31 controls storage unit 38 via system bus 43, ISA•B/C 33, and ISA bus 44 by using a SCSI command.

Figure 2:
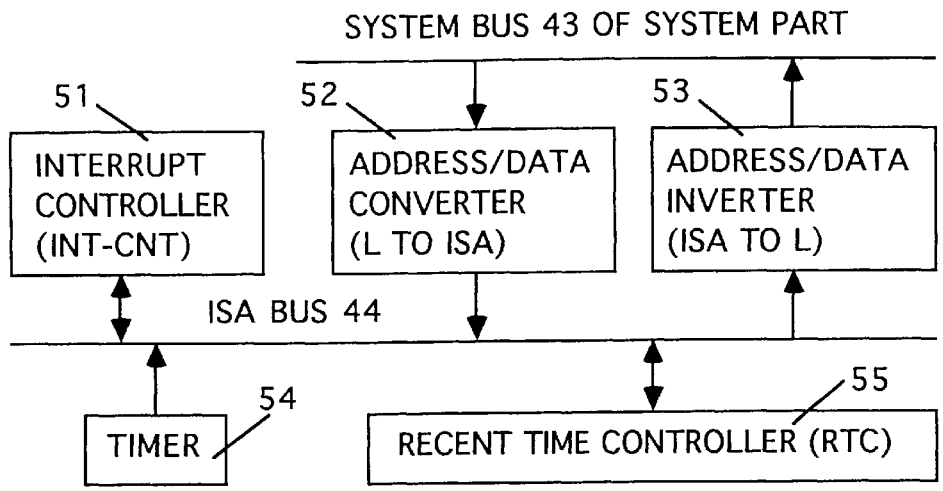
FIG. 2 is a block diagram showing the schematic arrangement of an ISA bus controller.

FIG. 2 shows the detailed arrangement of ISA•B/C 33.

ISA•B/C 33 comprises a converter (L to ISA) for converting an address and data from system bus 43 to ISA bus 44, a converter (ISA to L) for performing conversion which is inverse to the above conversion, interrupt controller (INT-CNT) 51 for performing interrupt control, timer (TIMER) 54 used for various purposes, and timepiece part (RTC timer) 55 for counting time and managing the current time.

Figure 5:
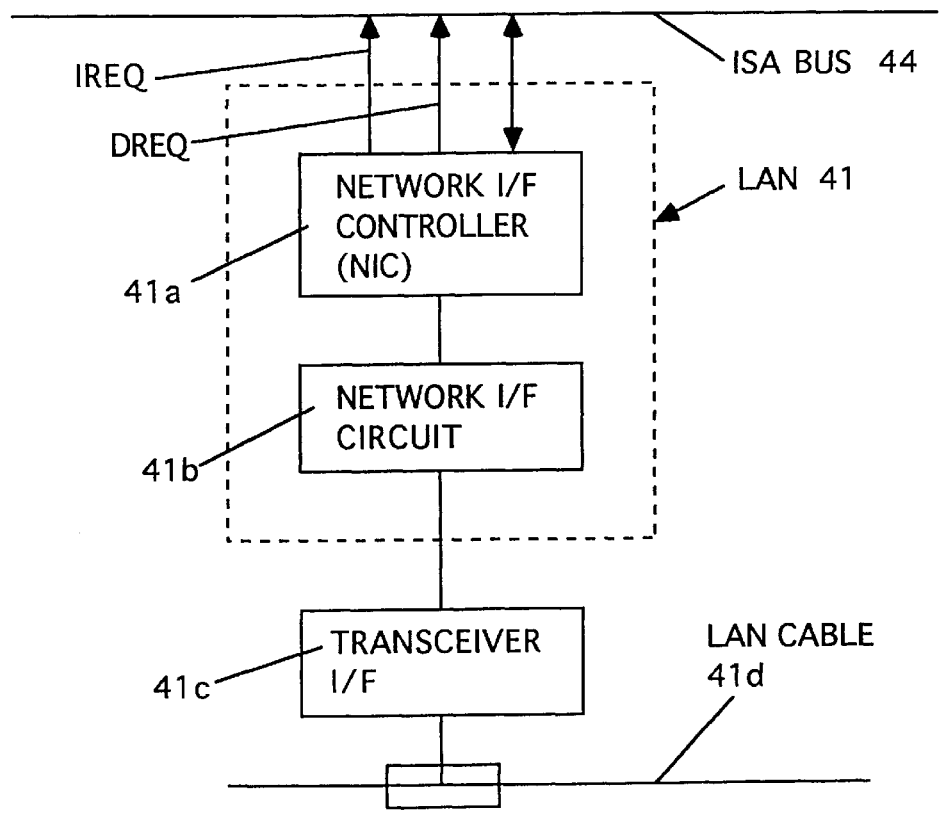
FIG. 5 is a block diagram showing the schematic arrangement of a local area network line control unit.

Local area network line control unit (LAN) 41 is constituted by a LAN board like the one shown in FIG. 5. When LAN board 41 is set in an operative state, and the digital copying machine is registered, as a network printer, in a file server in the network, the digital copying machine can be used through a personal computer/workstation, in the network, which is registered in the above file server. When data is transmitted from the network to the digital copying machine, network interface controller (NIC) 41a outputs an interrupt request (IREQ) to notify the reception of the data. System CPU 31 recognizes the presence of the received data in response to this interrupt request, inputs a command to NIC 41a to write the received data in a predetermined area of main memory 31a managed by system CPU 31, and sets DMA controller 32. NIC 41a outputs a DMA request (DREQ) for data transfer. In response to this request, DMAC 32 repeatedly transfers data to main memory 31a to transmit data having a notified length. This operation is repeated while data is received. Network interface controller (NIC) 41a is a control circuit for controlling the above operation. Network interface circuit 41b is a circuit network for converting an analog voltage signal into a digital signal. Network interface controller (NIC) 41a is connected to Ethernet cable 41d via network interface circuit 41b and transceiver interface 41c constituted by an insulating transformer and the like.

Figure 3:
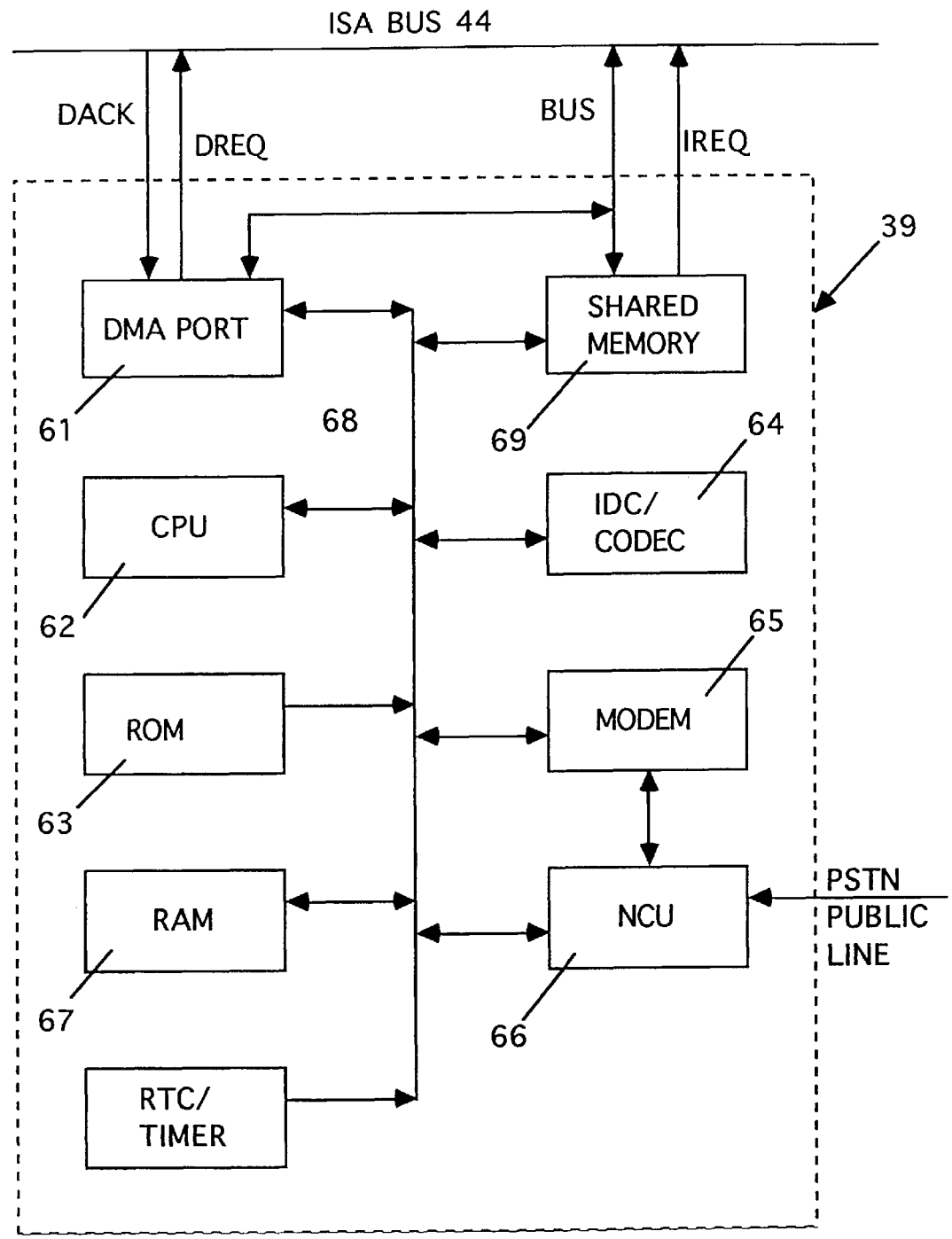
FIG. 3 is a block diagram showing the schematic arrangement of a G3•FAX control unit.

G3•FAX control unit 39 is constituted by a FAX board like the one shown in FIG. 3.

G3•FAX control unit 39 comprises CPU 61, ROM 62, RAM 63, IDC CODEC 64, MODEM 65, NCU (Network Control Unit) 66, shared memory 69, DMA port 68, and RTC timer 67. CPU 61 controls the overall FAX board. ROM 62 is used to store programs used by CPU 61. RAM 63 is used to execute a program and temporarily store transmission/reception data. IDC CODEC 64 converts data, for which a transmission request is generated by system part 3, into data of the resolution/coding scheme at the transmission destination, and converts data received from the other party into data of the resolution/coding scheme employed in the digital copying machine. MODEM 65 converts digital binary data into a frequency signal. NCU 66 boosts the frequency signal to the voltage used on the line side and controls connection to the line side. Shared memory 69 is used to exchange a command with the system part. DMA port 68 performs DMA transmission/reception of transfer data. RTC timer 67 monitors the time. G3•FAX control unit 39 receives a FAX reception/transmission command from system CPU 31 and performs FAX transmission/reception of compressed image data via a public line (PSTN).

Figure 4:
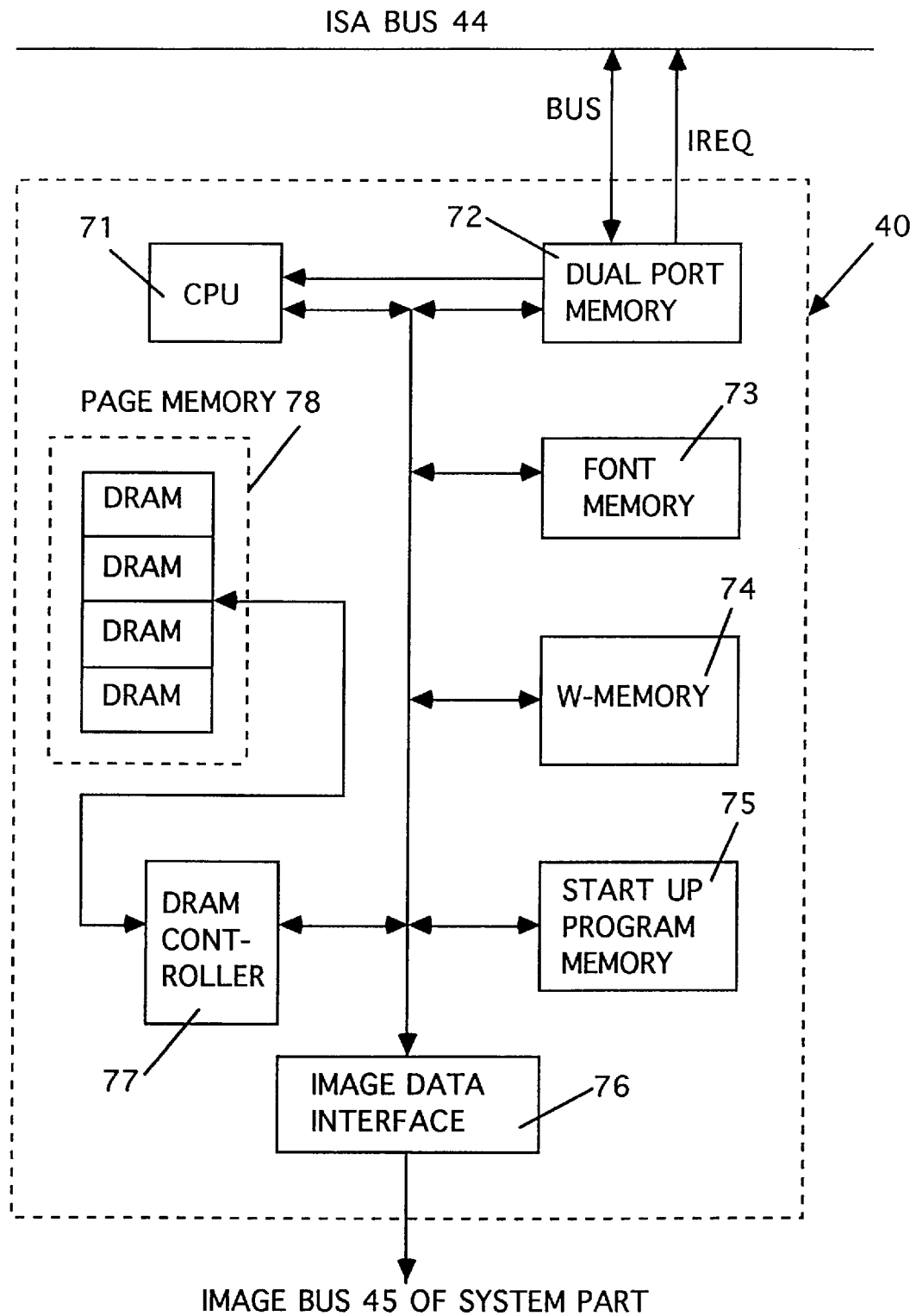
FIG. 4 is a block diagram showing the schematic arrangement of a printer controller unit.

Printer control unit 40 is connected to the mother board or the like. FIG. 4 shows the detailed arrangement of printer control unit 40.

Printer control unit 40 receives received code data from system CPU 31, performs pixel development of the code data into image data to be actually printed by using an internal font and the like, and supplies the image data to page memory part 2 via an image bus.

Printer control unit 40 comprises CPU 71, work RAM 74, FONT•RAM 73, DRAM 78, DRAM controller 77, start-up ROM 75, image I/F part 76, dual-port RAM 72, and the like. CPU 71 performs internal-board operation control, font development, image development or expansion, and the like. Work RAM 74 is used by CPU 71. FONT•RAM 73 stores font data. DRAM 78 constitutes a partial page memory. DRAM controller 77 controls DRAM 78. Start-up ROM 75 is used to store programs for intra-board setup and downloading of a program from main memory 31a. Image I/F part 76 transfers image data from the partial page memory constituted by DRAM 78 to page memory part 2 in units of raster lines. Dual-port RAM 72 serves to exchange data such as command/program/font data between the printer controller part and the system part.

The arrangements and functions of the main unit in page memory part 2 serving as a base for systematization will be described in detail next.

Figure 7:
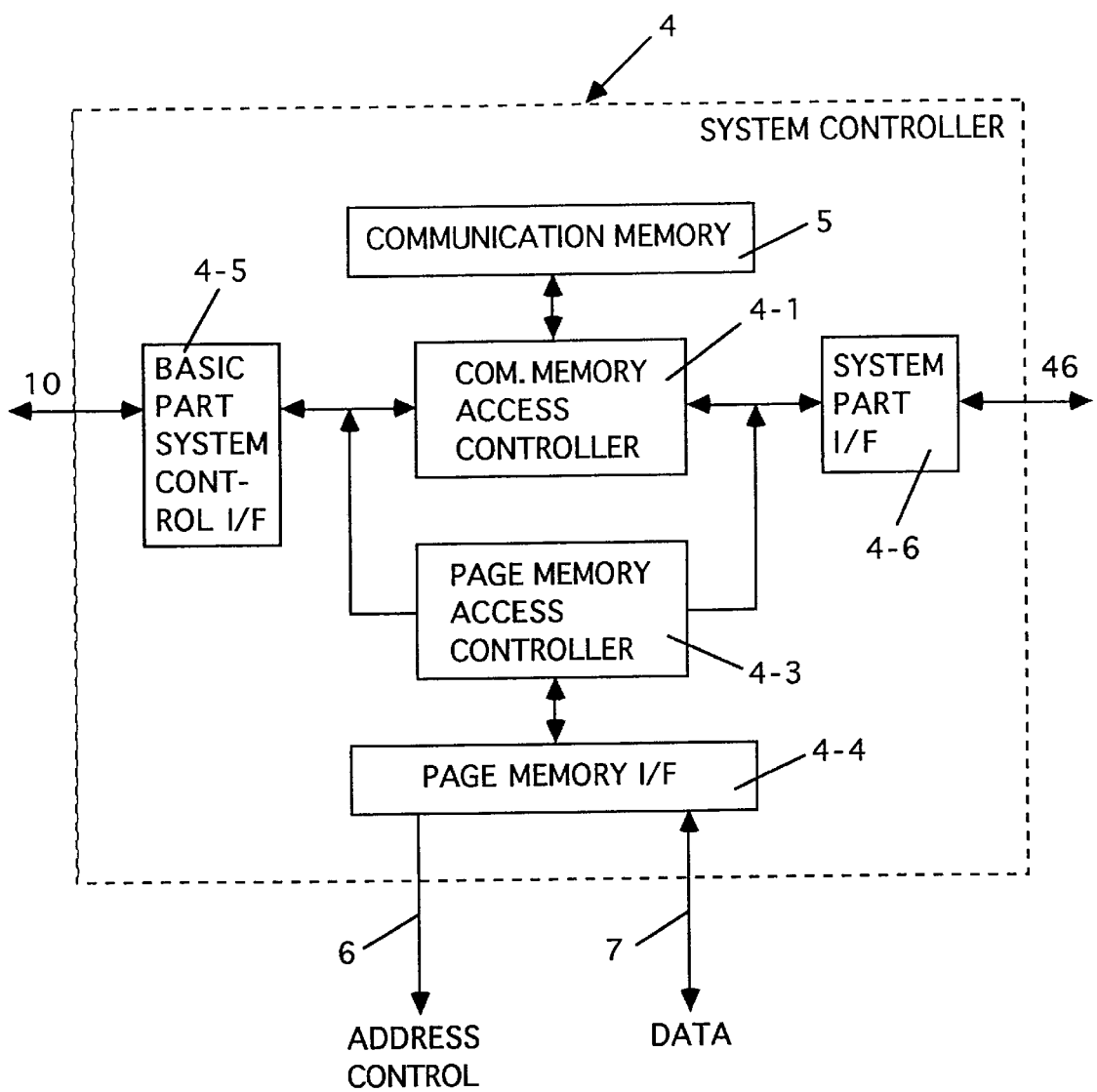
FIG. 7 is a block diagram showing the schematic arrangement of a system control unit.

The arrangement and function of system control unit 4 will be described first. FIG. 7 is a block diagram showing the schematic arrangement of system control unit 4. System control unit 4 comprises communication memory access control unit 4-1, communication memory 5, page memory access control unit 4-3, basic part system bus interface (basic part system control I/F) 4-5, system bus interface (system part I/F) 4-6, and page memory interface (PM I/F) 4-4. Communication memory access control unit 4-1 controls communication of control information between basic part CPU 11 and system CPU 31 in system part 3. Communication memory 5 is used to store control information when communication of the control information is to be performed between basic part CPU 11 and system CPU 31 in system part 3. Page memory access control unit 4-3 controls access from basic part 1 and system part 3 to page memory 23. Basic part system control I/F 4-5 distributes control information or image information sent from basic part CPU 11 of basic part 1 via basic part system bus 10 to a corresponding block in page memory part 2 by decoding an address sent simultaneously with the information. System part I/F 4-6 distributes control information or image information from system part 3 to a corresponding block in system control unit 4 by decoding an address sent simultaneously with the information. Page memory interface 4-4 serves to exchange image data between page memory access control unit 4-3 in system control unit 4 and page memory 23 when a unit (basic part CPU 11 in basic part 1) capable of page memory access on basic part system bus 10 or another unit (system CPU 31 or DMAC 32 in system part 3) capable of page memory access on system bus 43 accesses image information in page memory 23 via basic part system bus 10.

Communication memory access control unit 4-1 controls access to communication memory 5 when basic part CPU 11 in basic part 1 and system CPU 31 in system part 3 exchange a control code with each other via communication memory 5 connected to communication memory access control unit 4-1 in system control unit 4. Communication memory 5 is mapped in the memory space of basic part CPU 11 in basic part 1 and the memory space of system CPU 31 in system part 3. Data can be read/written from/in communication memory 5 by accessing specific areas from each control unit.

Address controller 6 for generating an address for page memory 23 will be described next.

Figure 8:
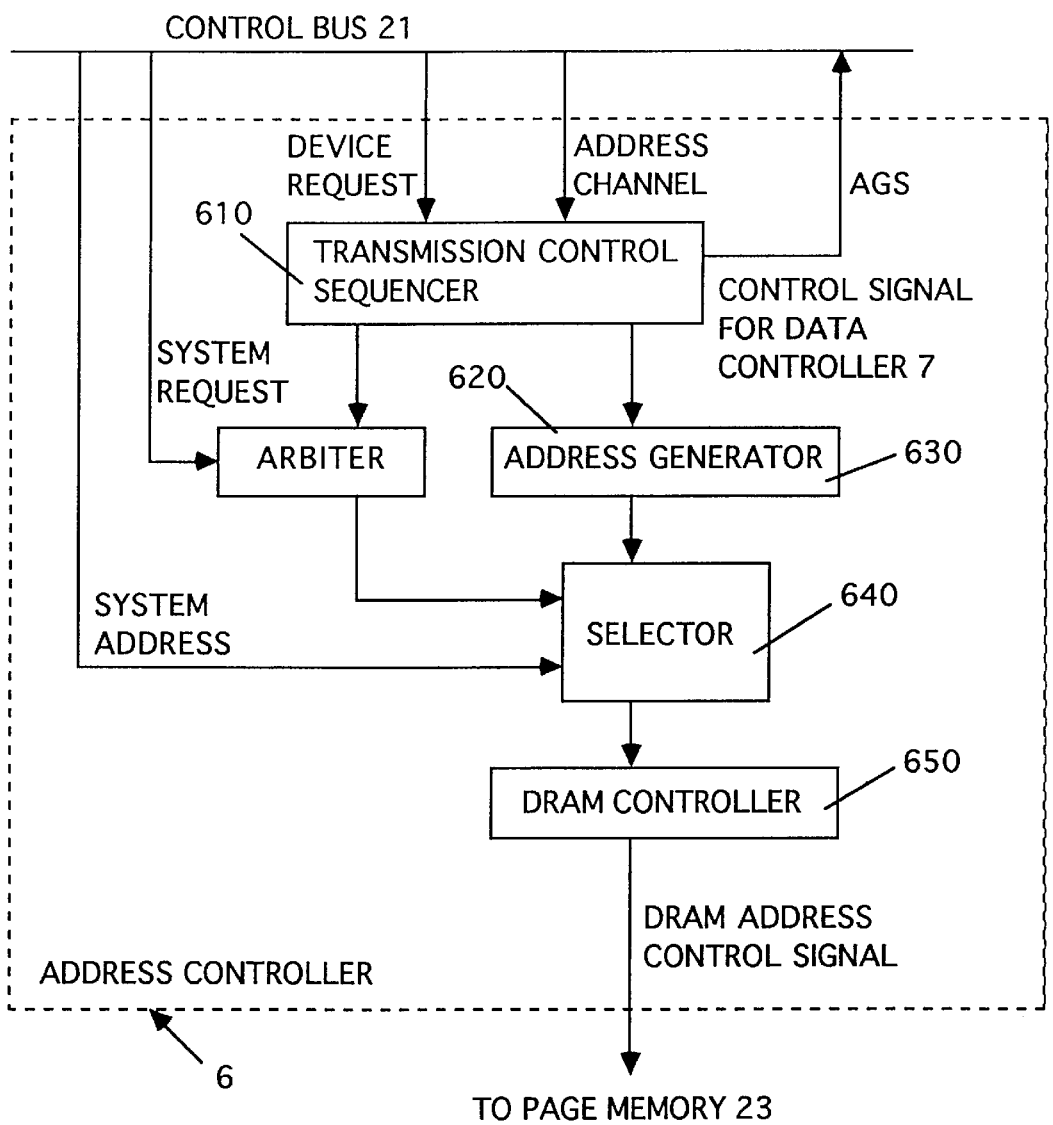
FIG. 8 is a block diagram showing the schematic arrangement of an address controller.

FIG. 8 is a block diagram showing the schematic arrangement of address controller 6.

Address controller 6 comprises transfer control sequencer 610, arbitration part 620, address generator 630, selector 640, and DRAM controller 650. Transfer control sequencer 610 executes various transfer sequences in response to requests from image bus 20. Arbitration part 620 arbitrates between a request from image bus 20 and a request from basic part system bus 10 or system part system interface 46. Address generator 630 generates various memory addresses of a plurality of channels in data transfer from image bus 20. Selector 640 selects an address output from address generator 630 or a system address. DRAM controller 650 generates a DRAM address and a control signal.

Address controller 6 receives memory access requests from two systems, i.e., image bus 20 and basic part system bus 10 or system part system interface 46. Arbitration between the above requests is performed by arbitration part 620, and data transfer processing on the side which has won the contention is performed.

When the request from basic part system bus 10 or system part system interface 46 wins the contention, the system address selected by selector 640 is input to DRAM controller 650. DRAM controller 650 converts the input address into a DRAM address, and generates a control signal required for a read/write operation.

In addition, an address channel signal is input from image bus 20 to transfer control sequencer 610 together with the request, and one of a plurality of address generators in address generator 630 is selected. When the request from the image bus 20 wins the contention, the memory address of the selected channel is output from address generator 630 and input to DRAM controller 650.

Figure 9:
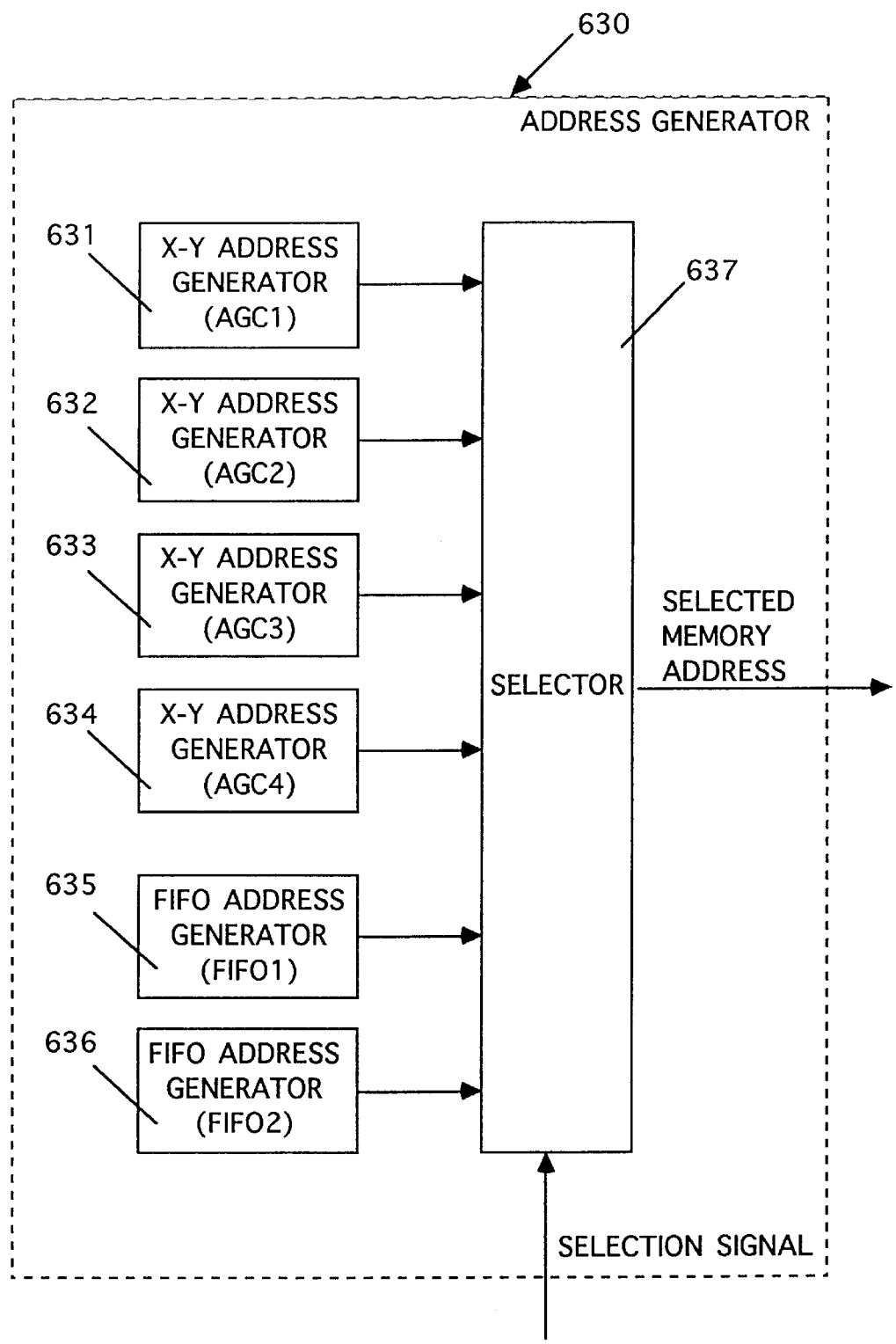
FIG. 9 is a block diagram showing the schematic arrangement of an address generator.

FIG. 9 is a block diagram showing the schematic arrangement of address generator 630.

The above address generator comprises a 4-channel two-dimensional address generator (AGC1 (631), AGC2 (632), AGC3 (633), and AGC4 (634)), a 2-channel FIFO address generator (FIFO1 (635) and FIFO2 (636)), and selector 637 for selecting one of memory addresses generated by these address generators in accordance with a channel select signal from transfer control sequencer 610.

Figure 10:
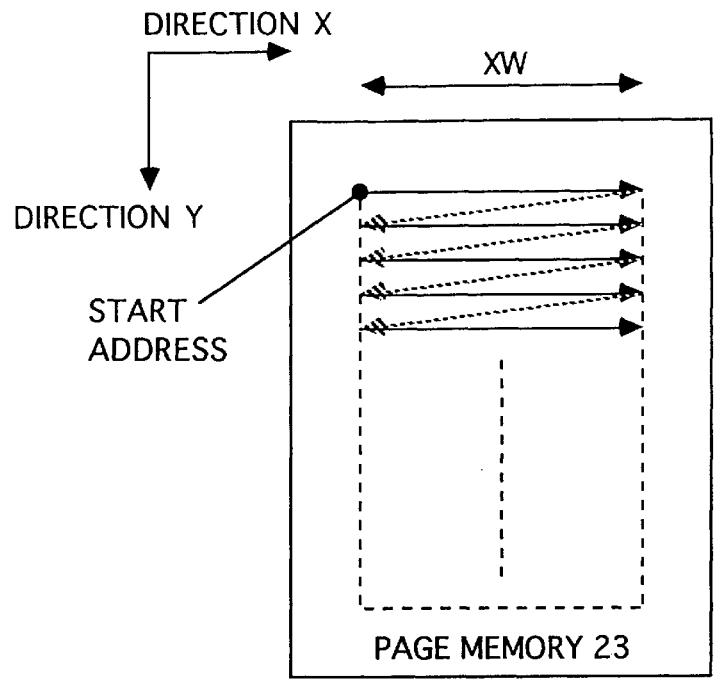
FIG. 10 is a view for explaining the contents of addresses generated by a two-dimensional address generator.
Figure 11:
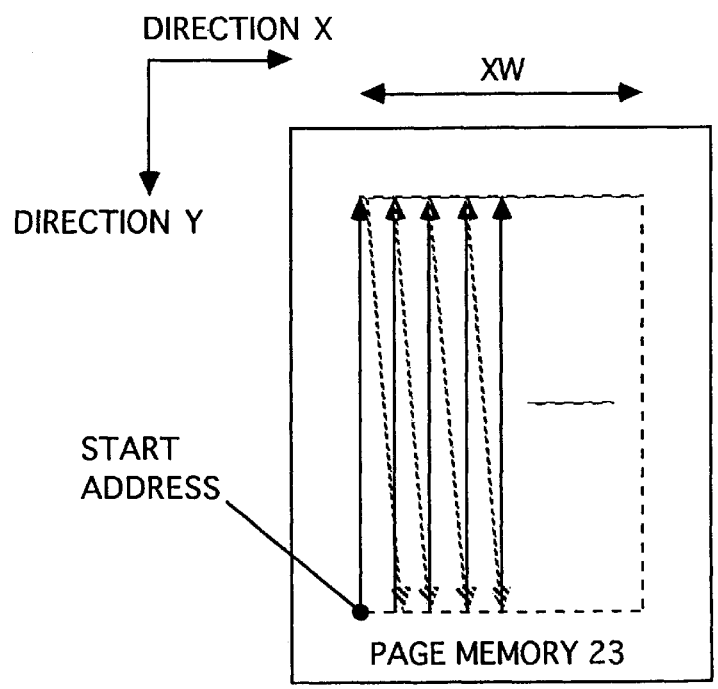
FIG. 11 is another view for explaining the contents of addresses generated by a two-dimensional address generator.

Two-dimensional address generators AGC1 to AGC4 (631 to 634) can generate various addresses. For example, as shown in FIG. 10, these address generators can sequentially generate addresses in the X direction in synchronism with clocks from transfer control sequencer 610. In contrast to this, the address generators can sequentially generate addresses in the Y direction by changing the parameters, as shown in FIG. 11.

A start address and the main scanning width (XW) of one line can be arbitrarily set in accordance with the paper size of original O.

By using address generators AGC capable of generating various addresses, a data transfer operation, a rotation read operation, and a repetitive read operation are performed with respect to arbitrary rectangular areas of page memory 23. In addition, by using the address generators AGC corresponding to two channels, movement between arbitrary areas of page memory 23, rotation, vertical/horizontal conversion, repetition processing, mirror image processing, and the like can be performed.

The FIFO address generator (FIFO1 (635) and FIFO2 (636)) generates a FIFO address for using page memory 23 as a FIFO memory and status data required for FIFO control.

The status data includes "FIFO full" (indicating a state wherein the FIFO area is filled with non-read data), "FIFO empty" (indicating a state wherein no non-read data is present in the FIFO area), and "FIFO half" (indicating a state wherein a half or more of the FIFO area is filled with non-read data). The amount of data in the FIFO and its remaining capacity can be known when the CPU read-accesses FIFO registers.

By performing FIFO control using these statuses, differences in transfer rate and transfer timing, which are caused when data is transferred from a device on image bus 20 to another device or from a device on image bus 20 to basic part system bus 10, can be absorbed by the FIFO memory, thereby allowing high-speed data transfer.

When FIFO control is not performed, FIFO address generators 635 and 636 can be used as a 2-channel one-dimensional address generator per channel.

Figure 12:
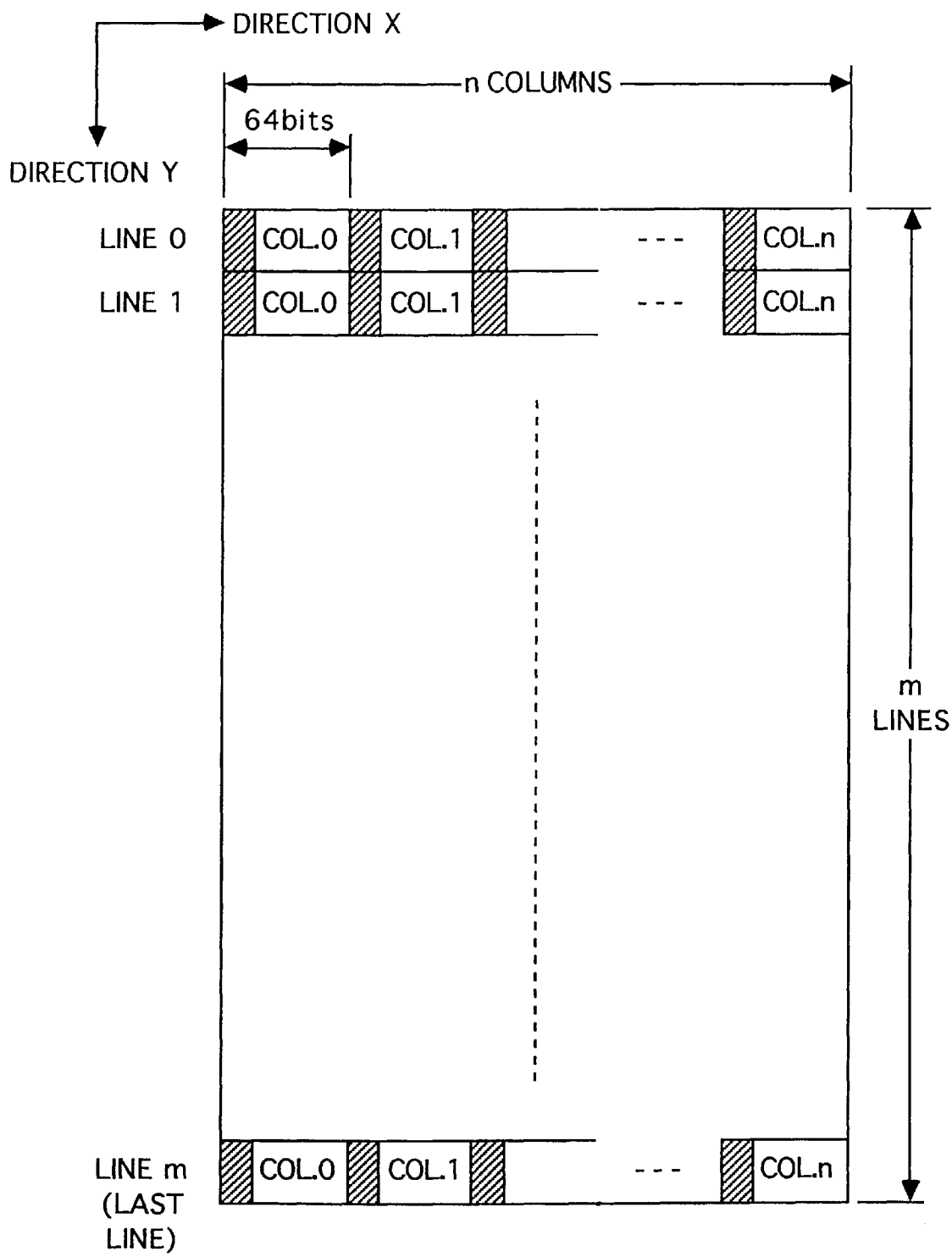
FIG. 12 is a view showing the concept of two-dimensional access to a page memory.

FIG. 12 shows a concept of two-dimensional access to page memory 23. If an access width (64 bits in FIG. 12) of one access to page memory 23 is defined as one column, one line is constituted by an integer multiple of one column. Consecutive columns on the same line in the X direction have consecutive linear addresses of page memory 23, and the linear addresses of the end column of the line and the start column of the next line are consecutive.

Figure 13:
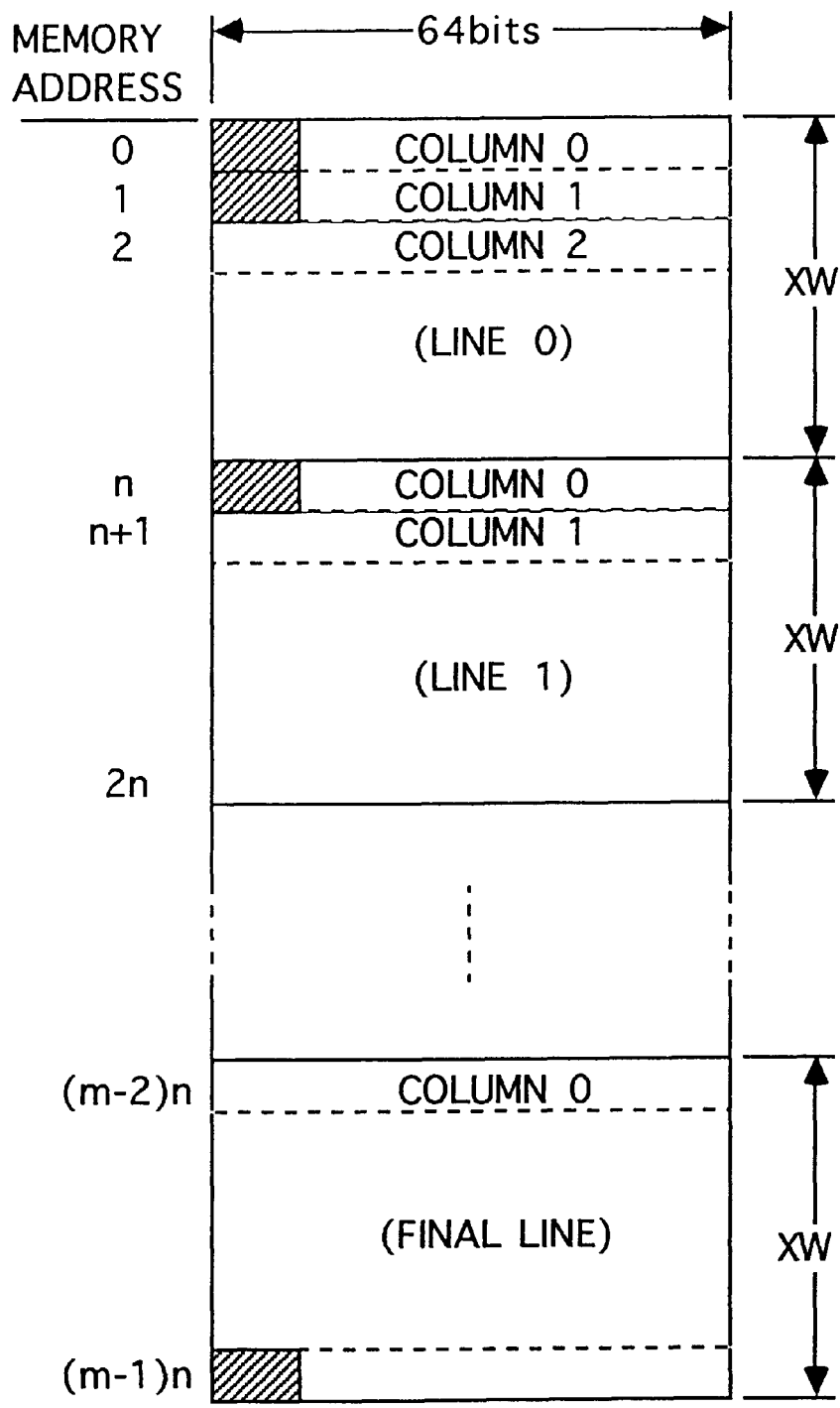
FIG. 13 is a view showing a two-dimensional memory structure of the page memory in the linear address form.

FIG. 13 shows the two-dimensional memory of page memory 23 in FIG. 12 in the form of linear addresses.

Page memory 23 comprises a page data area and a compressed data area, as shown in FIGS. 20A and 20B. As shown in FIG. 21, the compressed data area includes a compressed data management area, in which compressed data management information is stored in units of pages, and a compressed code data area, in which compressed code data is recorded in units of pages. In the compressed data management area, a start page number, an end page number, and the page size/posture, code start address, and code end address of each page are stored.

Figure 14:
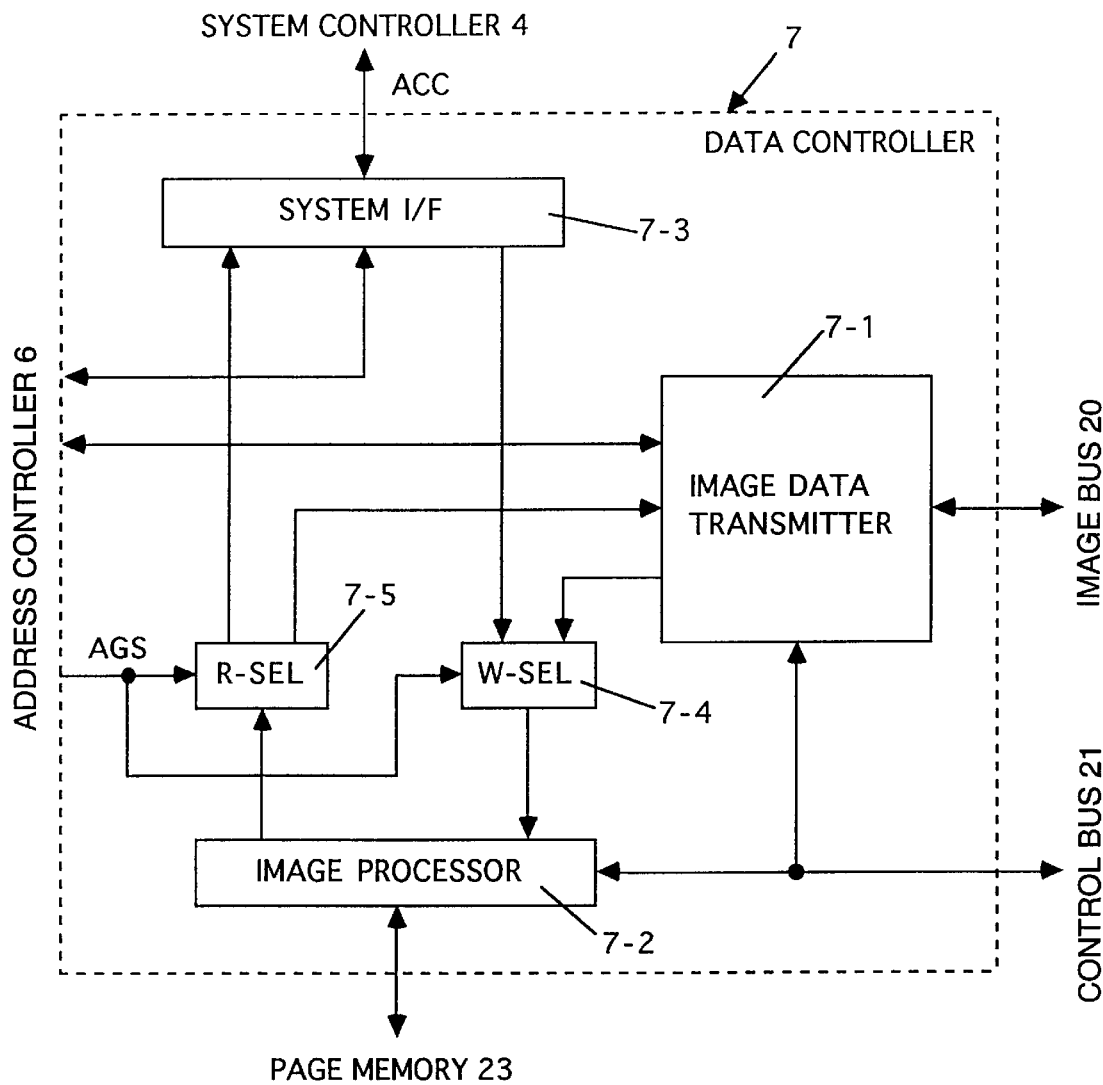
FIG. 14 is a block diagram showing the schematic arrangement of a data control unit.

Data control unit 7 will be described next. FIG. 14 shows the internal arrangement of data control unit 7. Data control unit 7 comprises image data transfer control unit 7-1, image processing unit (bit block transfer unit) 7-2, system I/F 7-3, selector 7-4, and selector (RSEL) 7-5. Image data transfer control unit 7-1 controls data transfer between devices on image bus 20 in page memory part 2 and data transfer between a device on image bus 20 and page memory 23. Image processing unit 7-2 executes bit block transfer and various raster operations (logical operations). System I/F 7-3 serves as an interface for data when basic part CPU 11 in basic part 1 or system CPU 31 in system part 3 accesses (reads/writes) page memory 23 via system control unit 4. Selector 7-4 selects data sent from a device on image bus 20 via image data transfer control unit 7-1 or data sent from a control unit (basic part CPU 11 in basic part 1 or system CPU 31 in system part 3) via system I/F 7-3 on the basis of a page memory access arbitration result obtained by address controller 6 in write processing with respect to page memory 23. Selector 7-5 selects between sending data to a device on image bus 20 via image data transfer control unit (WSEL) 7-1 and sending data to a control unit (basic part CPU 11 in basic part 1 or system CPU 31 in system part 3) on the basis of a page memory access arbitration result obtained by address controller 6 in data read processing with respect to page memory 23.

Image processing unit 7-2 reads and writes data from and in page memory 23 via independent routes. Each route includes four independent channels so that concurrent operations in a plurality of channels can be performed. Since logical operations in two channels can be performed, two pages can be synthesized (or superimposed) to be written as one page. Such synthesis (superimposition) of two pages is automatically performed by address controller 6 and data control unit 7 in corporation with each other.

Image data I/F unit (image data control unit) 8 will be described next. Image data I/F unit 8 is a device on image bus 20 and performs image data transfer between scanner 13 or image processing unit 14 and page memory 23 via image processing unit 14. In addition, image data I/F unit 8 performs image data transfer between page memory 23 and buffer memory 36, printer controller unit 40, or the like, connected to system part image bus 45 in system part 3.

Figure 15:
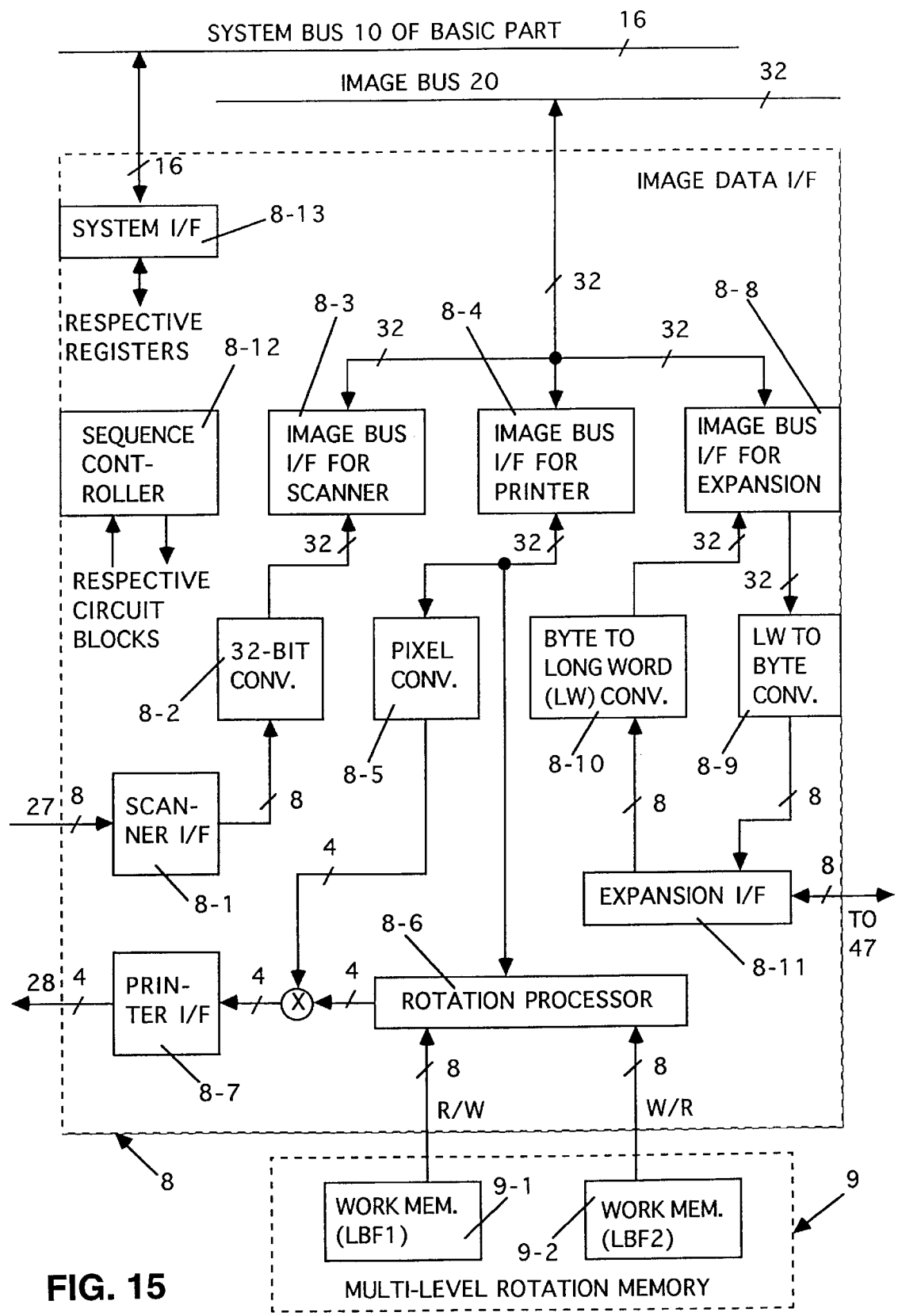
FIG. 15 is a block diagram showing the schematic arrangement of an image data I/F unit.
Figure 23A:
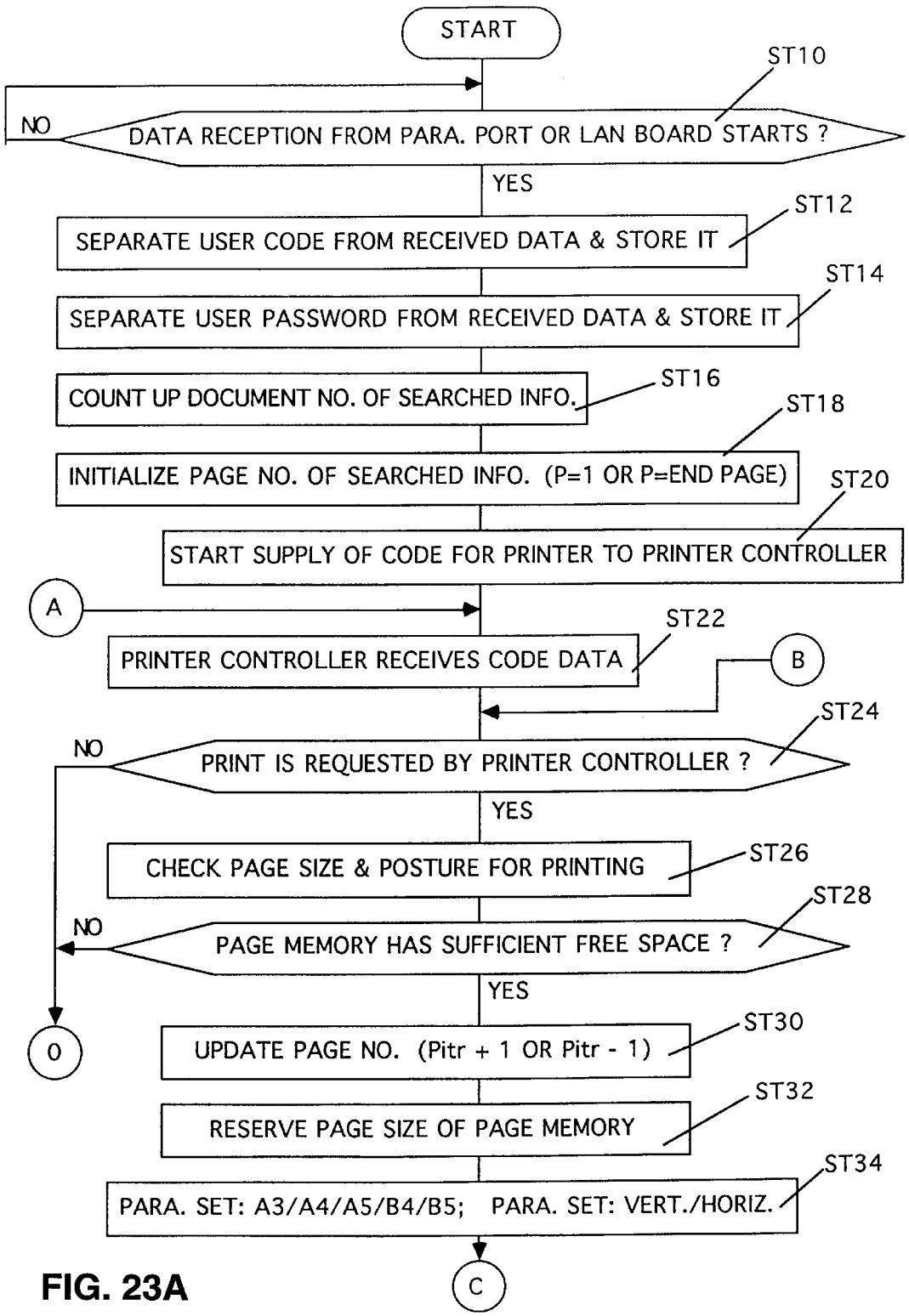
FIGS. 23A and 23B are flow charts for explaining an operation of printing out an image with retrieval data being added thereto in a printer output mode, and at the same time compressing and storing the print image in a hard disk together with the retrieval data.
Figure 23B:
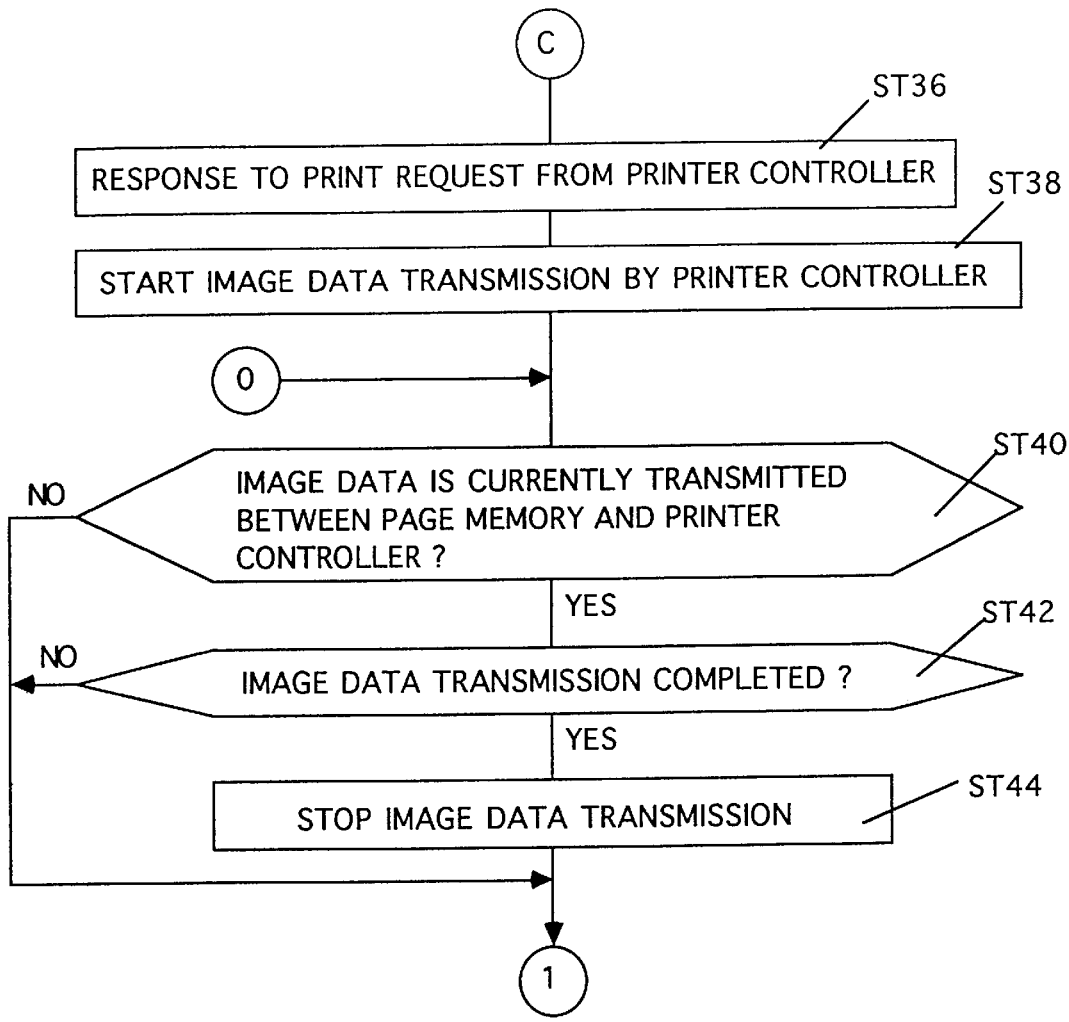

FIG. 15 is a block diagram showing the internal arrangement of image data I/F unit 8. Image data I/F unit 8 comprises scanner I/F part 8-1, 32-bit converter 8-2, image bus I/F (scanner) part 8-3, image bus I/F (printer) part 8-4, pixel converter 8-5, rotation processing part 8-6, printer I/F part 8-7, image bus I/F part 8-8, LW/byte converter 8-9, byte/LW converter 8-10, extended I/F part 8-11, and the like. Scanner I/F part 8-1 is used to input scanner image data transferred from image processing unit 14. 32-bit converter 8-2 converts the input data into 32-bit data in accordance with an input scanner image data definition bit count. Image bus I/F part 8-3 transfers the 32-bit data generated by 32-bit converter 8-2 to page memory 23. Image bus I/F part 8-4 receives the image data from page memory 23 via image bus 20 when the data is to be output to printer 15. Pixel converter 8-5 converts the 32-bit image data input to image bus I/F (printer) part 8-4 into data having a bit count set per pixel. Rotation processing part 8-6 receives data before pixel conversion, rotates printer image data from page memory 23 through 90° by using multivalued rotation memory 9 arranged outside image data I/P unit 8, and converts the data into data having a bit count set per pixel. Printer I/F part 8-7 outputs the data from pixel converter 8-5 or rotation processing part 8-6 to printer 15 via image processing unit 14. Image bus I/F part 8-8 inputs/outputs extended I/F image data to/from page memory 23 via image bus 20 in units of 32 bits. LW/byte converter 8-9 converts the 32-bit data input to image bus I/F part 8-8 into 8-bit data. Byte/LW converter 8-10 converts the 8-bit data from extended I/F part 8-11 into 32-bit data. Extended I/F part 8-11 inputs/outputs image data to system part 3 in units of eight bits.

Image data I/F unit 8 also includes sequence controller 8-12 and system interface part 8-13.

FIG. 16 shows conversion performed by 32-bit converter 8-2 in accordance with each image data definition bit count.

When eight bits are set per pixel, 32-bit converter 8-2 converts four pixels into 32-bit data. Similarly, when four bits are set per pixel, eight pixels are converted into 32-bit data, and when one bit are set per pixel, 32 pixels are converted into 32-bit data. Note that eight bits are set per pixel when data is to be read by scanner 13, but this bit count is not used in a general copy operation. Four bits are set per pixel in a multivalued memory copy operation. One bit is set per pixel in a compression sort operation or FAX transmission.

FIG. 17 shows conversion performed by pixel converter 8-5. Pixel converter 8-5 converts 32-bit data into eight pixels when four bits are set per pixel, and converts 32-bit data into 32 pixels when one bit is set per pixel.

FIGS. 18A, 18B, and 18C show the operation of rotation processing part 8-6 in the mode of four bits/pixel. When data is read from page memory 23 in the order shown in FIG. 11, the 0th LW, 1st LW, 2nd LW, . . . of the 0th LW (long word=four-byte length) line shown in FIG. 18A are sequentially sent to image data I/F unit 8. The lower four bits of the 0th byte in each sent LW is the 1st (line) data (indicated by hatching in FIG. 18A). That is, the sent LWs include eight-line data. These LWs are temporarily stored in external line buffer 9-1 in units of bytes, as shown in FIGS. 18B and 18C, and are read out in units of pixels after 1-LW data is stored. That is, the data are read out in the order of addresses 0, 4, 8, . . . , to output only the lower four bits. At the next line, the upper four bits corresponding to addresses 0, 4, 8, . . . are output. At the next line, the lower four bits corresponding to addresses 1, 5, 9, . . . are output. At the next line, the upper four bits corresponding to addresses 1, 5, 9, . . . are output. When 8-line data is read out in this manner, a similar operation is performed in next external line buffer 9-2. Two external line buffers 9-1 and 9-2 are prepared to prevent an idle time in a line operation in such a manner that while one of the line buffers is set in the read mode, the other line buffer performs a write operation.

In the mode of one bit/pixel, since one LW (long word) includes 32-line data according to the same arrangement as described above, the read operation repetition count and the data selection bit count are different from those in the above mode. FIGS. 19A to 19C show an operation in the mode of one bit/pixel.

It seems that the description made with reference to FIGS. 18A to 18C and 19A to 19C is associated with an operation of reading out the contents of page memory 23 clockwise and eventually outputting the data counterclockwise. However, when a read operation is performed in the reverse direction, all the long words are subjected to bit inversion in data control unit 7. Therefore, image data I/F unit 8 can cope with such operations with this one type of operation.

FIG. 22 shows a printout to which retrieval data (search data) is added. For example, this retrieval data (search data) comprises a date, a document number, and a page number. An image normally sent from page memory 23 is an image obtained by removing the retrieval data from the image shown in FIG. 22. In this case, the retrieval data (search data) is automatically stored in page memory 23 by a program running on system CPU 31, and the two images are synthesized by address controller 6 and data control unit 7, thereby obtaining the image shown in FIG. 22. When this image is printed out by printer 15, the image with the retrieval data (serial No. "940224006-01" shown at the upper right corner in FIG. 22) can be obtained.

Incidentally, the above retrieval or search data may be an optional file name input by an user or operator from control panel 12 in FIG. 1B.

Assume that an image is printed out with retrieval data (search data) being added thereto in a printer output mode, and at the same time the print image is compressed and stored with the retrieval data in a hard disk (HD) serving as a secondary memory together. This operation will be described next with reference to the flow charts shown in FIGS. 23A to 25C.

It is checked whether reception of data by parallel/serial port 42 or local area network line control unit (LAN) 41 is started as processing of expanding and registering (or storing) a received image of print data (step ST10). This check is performed by checking a LAN board interrupt flag or parallel port reception flag. If the data reception is started (YES in step ST10), the user code portion of the received data is separated and held (step ST12). The user password portion of the received data is separated and held (step ST14). Document number P of retrieval data (search data) is counted up (step ST16).

Document number P of retrieval/search data is then initialized (step ST18). This initialization is normally performed by setting P=1. If, however, code data is received from the last page, P=last page is set. Transfer of the code portion for printer 15 to printer control unit 40 is started (step ST20). The code data is transferred to printer control unit 40 (step ST22). If a print request is generated by printer control unit 40 (YES in step ST24), the printer page size/posture is checked (step ST26), and it is checked whether any free area is present in page memory 23 (step ST28). If a free area is present (YES in step ST28), the page number is updated (step ST30), and the page size in page memory 23 is reserved (step ST32). Parameters are set (step ST34), and a print request acknowledgment is sent to printer control unit 40 (step ST36), thereby starting transfer of the image data to printer control unit 40 (step ST38).

Assume that this transfer operation is started, no print request is generated by printer control unit 40 (NO in step ST24), or no free space is present in page memory 23 (NO in step ST28). In this case, it is checked whether image data is being transferred between page memory 23 and printer control unit 40 (step ST40). If the image data is being transferred (YES in step ST40), and the transfer of the image data is completed (YES in step ST42), the transfer of the image data is stopped (step ST44).

Assume that the image data is not being transferred (NO in step ST40), the transfer of the image data is not completed (NO in step ST42), or the transfer of the image data is stopped (step ST44). In this case, it is checked whether there is a page which has not undergone image compression (step ST46). Assume that there is such a page (YES in step ST46), image compression is not completed (NO in step ST48), and image compression is not in progress (YES in step ST48). In this case, the image compressing operation performed by compression/expansion unit 24 is stopped (step ST54).

Assume that there is no page which has not undergone image compression (NO in step ST46), image compression is in progress (YES in step ST50), or an image compressing operation is stopped (step ST54). In this case, the next processing is performed. If an image has been compressed, and a page which has not undergone file retention processing is present in hard disk HD (YES in step ST56), it is checked whether any free area is present in the file (step ST58). If there is a free space in the file (YES in step ST58), file retention (saving) processing is performed (step ST60). When retention of the page file is completed (YES in step ST62), the file retention/saving processing is stopped (step ST64), and the flow advances to retrieval data addition processing.

Incidentally, the file retention/saving processing of step ST60 can be performed as background processing of the print (step ST82 in FIG. 24B) of the first page. If retention of the page file is not completed (NO in step ST62), the flow returns to the step in which the presence of a free area in the file is checked (step ST58). If no free area is present in the file (NO in step ST58), the flow advances to oldest file deletion routine 1 (FIG. 25B or FIG. 25C) for the secondary memory. If no page which has undergone file retention processing is present in hard disk HD (NO in step ST56), the flow advances to the retrieval data addition processing.

In the retrieval/search data addition processing (step ST66), if file retention processing has been completed, and there is a page to which no retrieval data is added (YES in step ST68), it is checked whether imaging processing of retrieval data is completed (step ST70). If the imaging processing is not completed (NO in step ST70), imaging processing of the retrieval data is performed (step ST72). After imaging processing of the retrieval data is completed, or if imaging processing of the retrieval data is completed (YES in step ST70), it is checked whether superimposition processing of the retrieval data image is completed (step ST74). If this processing is not completed (NO in step ST74), it is checked whether superimposition processing of the retrieval data is in progress (step ST76). If this processing is not in progress (NO in step ST76), image superimposition processing is started (step ST78). The flow then advances to the next page print processing (step ST82). If the superimposition processing is in progress (YES in step ST76), the flow advances to the next page print processing (step ST82). If the superimposition processing of the retrieval data image is completed (YES in step ST74), the image superimposition processing is stopped (step ST80), and the flow advances to the next page print processing (step ST82). If file retention/saving processing has been completed, and there is no page having no retrieval data added thereto (NO in step ST68), the flow advances to the next page print processing (step ST82).

In page print processing, if page printing is not completed (NO in step ST84), it is checked whether page printing is in progress (step ST866). If page print processing is not in progress (NO in step ST86), it is checked whether preparation of an image of page Pprt is completed (step ST88). If preparation of an image of this page is completed (YES in step ST88), page print processing is started, and transfer of the image data is started (step ST90).

If the page print processing is completed (YES in step ST84), the page image is closed (step ST92), and it is checked whether printing of all the pages is completed (step ST94). If the printing operation is not completed (NO in step ST94), page No. increment "Pprt+1" or page No. decrement "Pprt−1" is performed (step ST96).

Assume that this processing is performed (step ST96), page print processing is in progress (YES in step ST86), preparation of an image of page Pprt is not completed (NO in step ST88), or transfer of image data is started (step ST90). In this case, it is checked whether reception of data from parallel port 42 is completed (step ST98). If this processing is completed (YES in step ST98), transfer of data to printer control unit 40 is stopped (step ST100). It is then checked whether image development of all the pages is completed by printer control unit 40 (step ST102). If this processing is completed (YES in step ST102), it is checked whether compression/filing and retention of all the pages are completed (step ST104). If this processing is completed (YES in step ST104), and printing of all the pages is completed (YES in step ST106), the images of all the pages are closed (step ST108), and the processing is terminated.

If reception of data from parallel port 42 is not completed (NO in step ST98), the flow returns to the transfer processing of code data to printer control unit 40 (step ST22). If image development of all the pages by printer control unit 40 is not completed (NO in step ST102), or printing of all the pages is not completed (NO in step ST106), the flow returns to the processing of waiting for a print request from printer control unit 40 (step ST24). If compression/filing and retention of all the pages are not completed (NO in step ST104), the flow returns to the processing of checking the presence of a page which has not undergone image compression (step ST46).

Figure 25A:
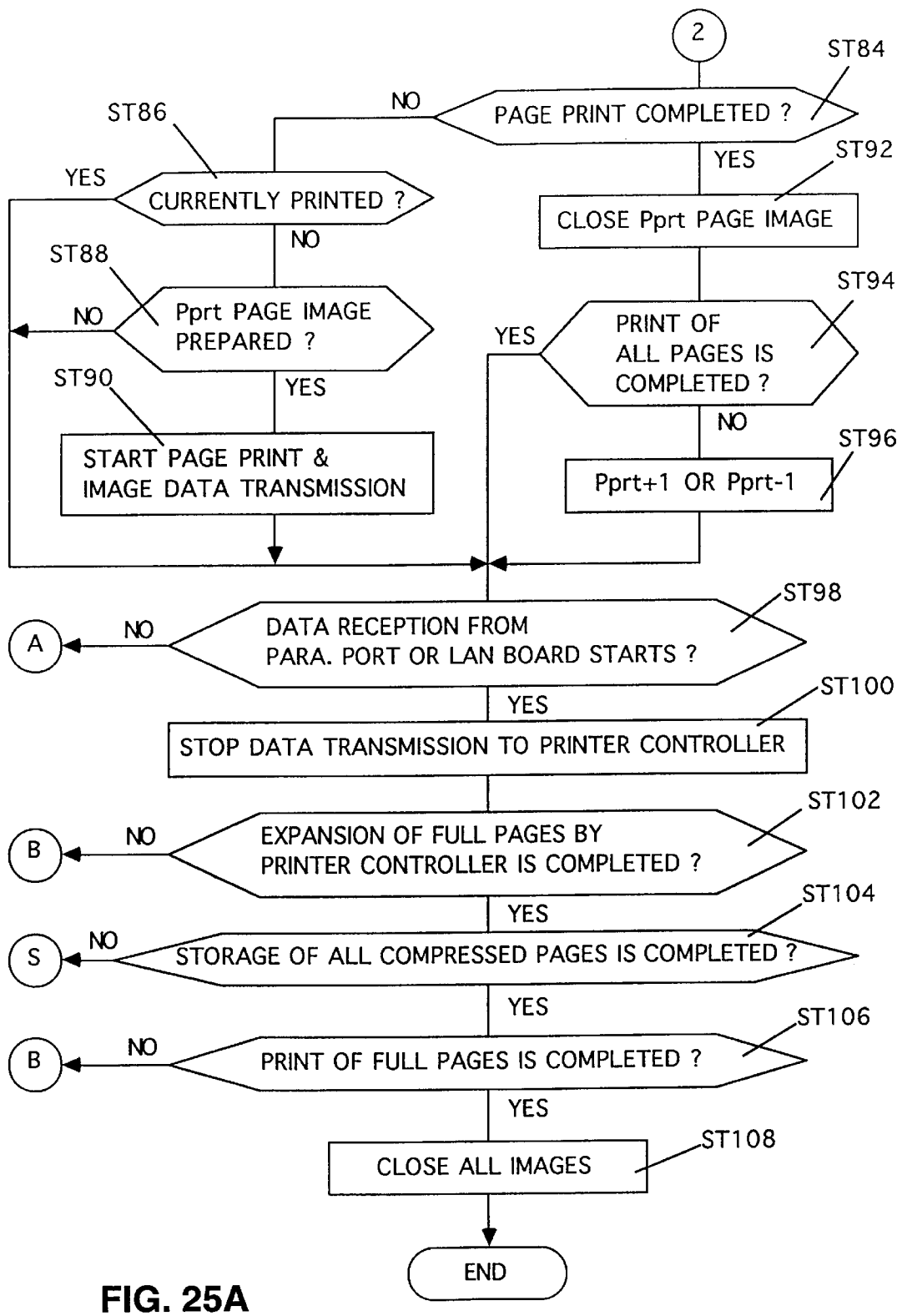
FIGS. 25A, 25B and 25C are flow charts for explaining an operation of printing out an image with retrieval data being added thereto in the printer output mode, and at the same time compressing and storing the print image in the hard disk together with the retrieval data.
Figure 25B:
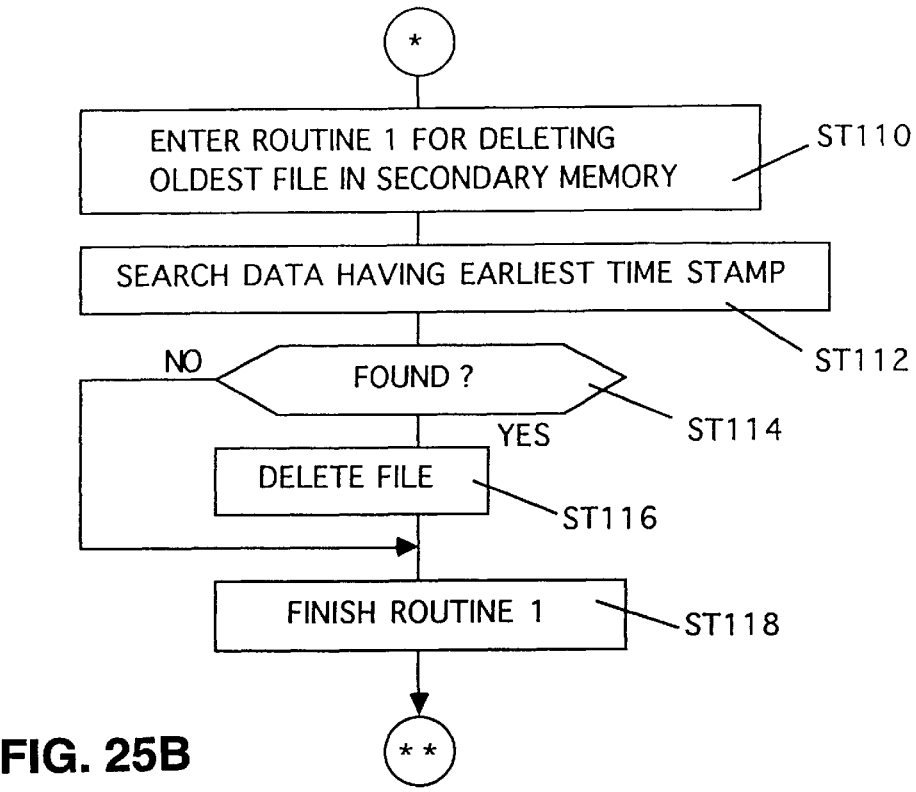

Oldest file deletion routine 1 for hard disk HD as a secondary memory will be described next with reference to FIG. 25B.

When routine 1 is started (step ST110), a search for data filed at the earliest time is performed (step ST112). If such data is found (YES in step ST114), the corresponding file is deleted from hard disk HD (step ST116). Routine 1 is then terminated (step ST118).

Figure 25C:
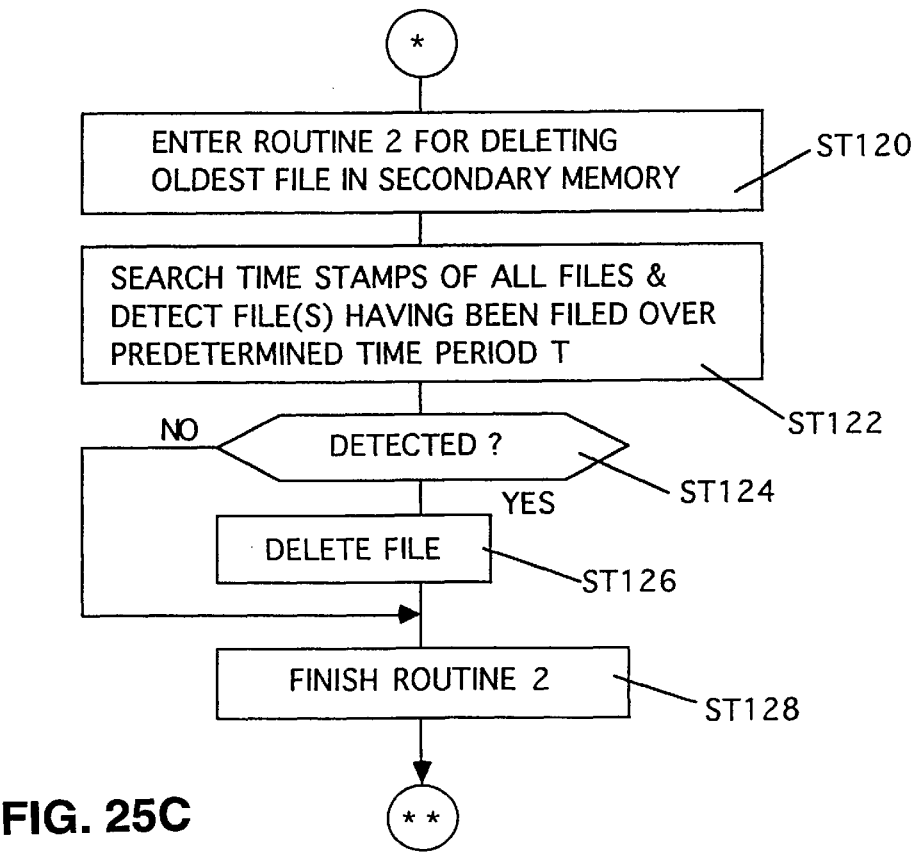
Figure 26A:
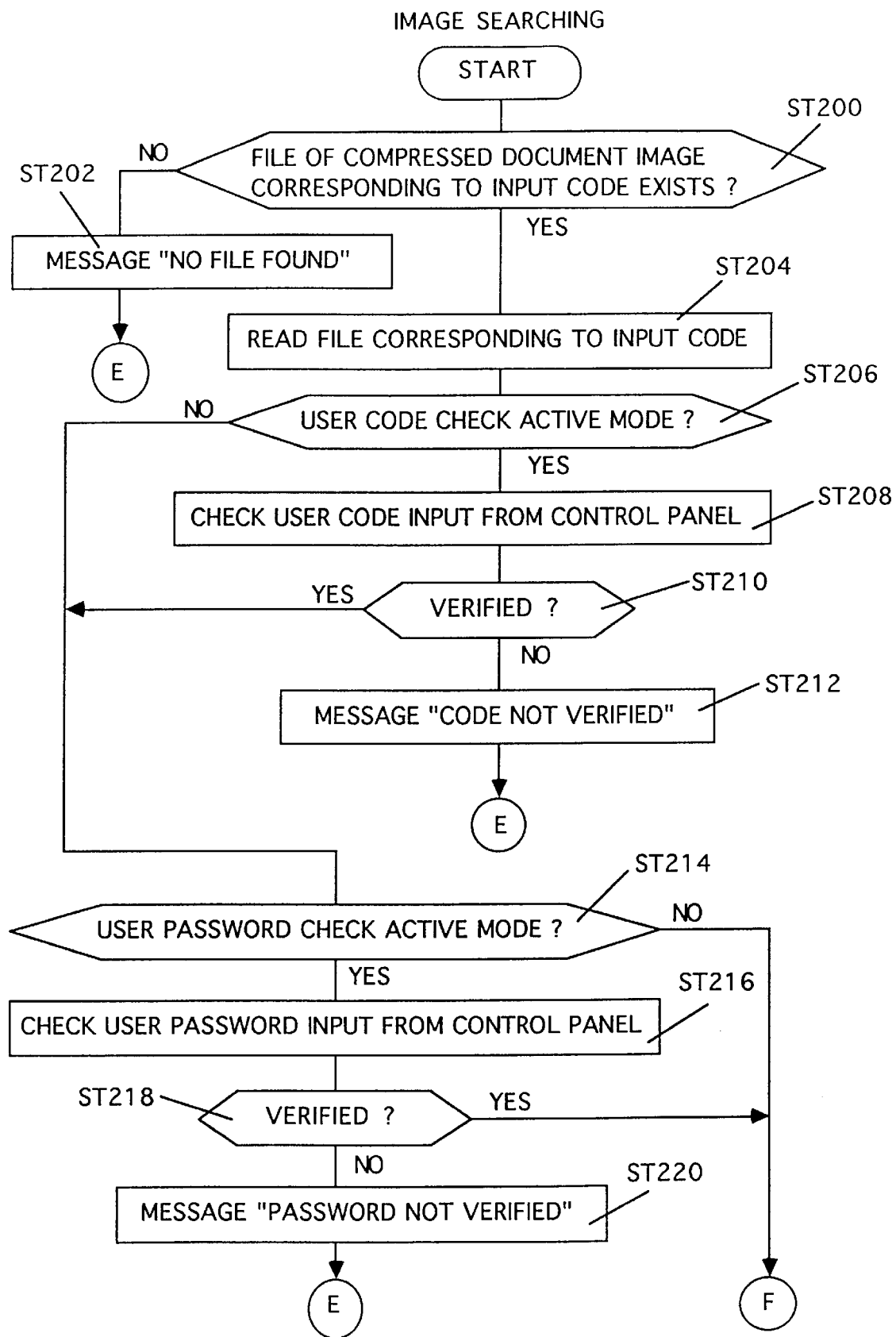
FIGS. 26A and 26B are flow charts for explaining an operation of retrieving (searching) an image stored in the hard disk by using retrieval data, and printing out a plurality of copies of the image.
Figure 26B:
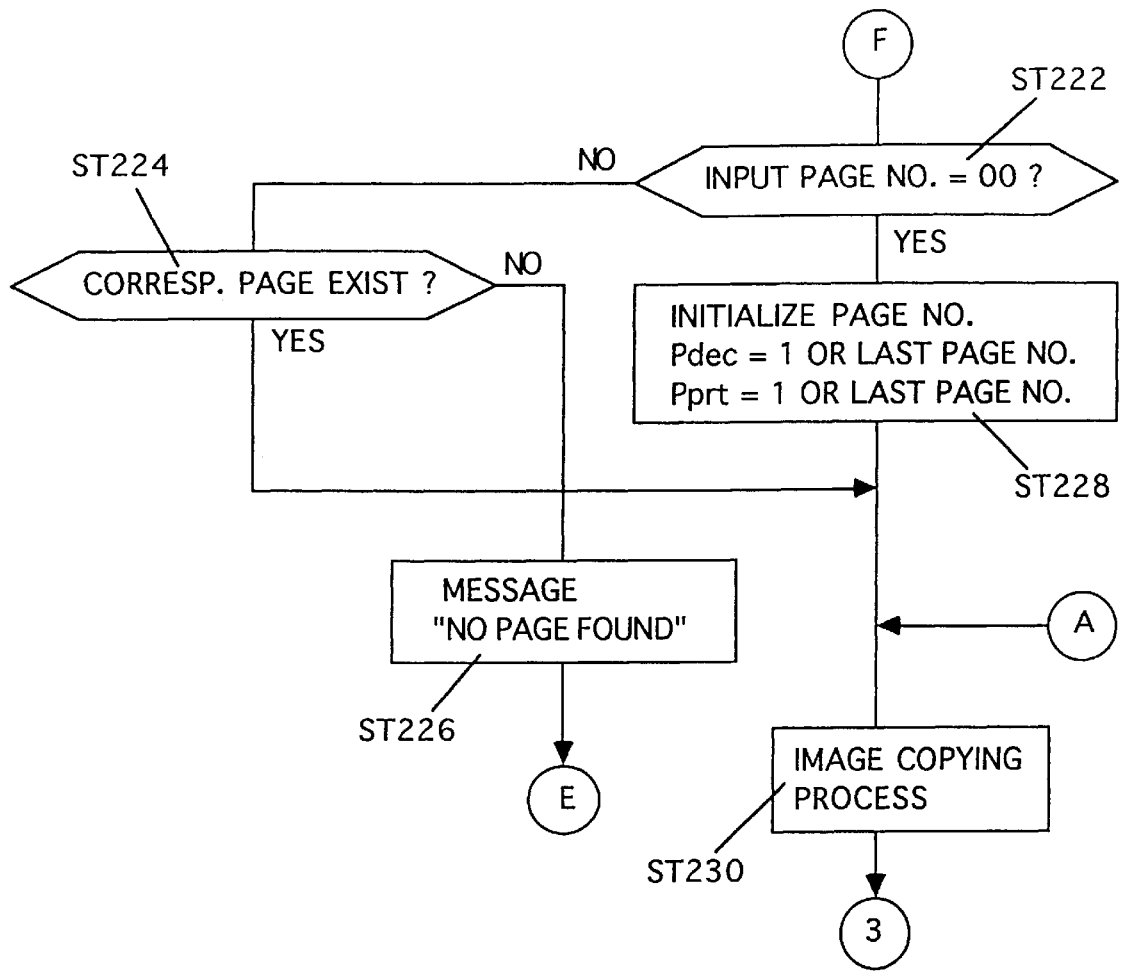
Figure 27A:
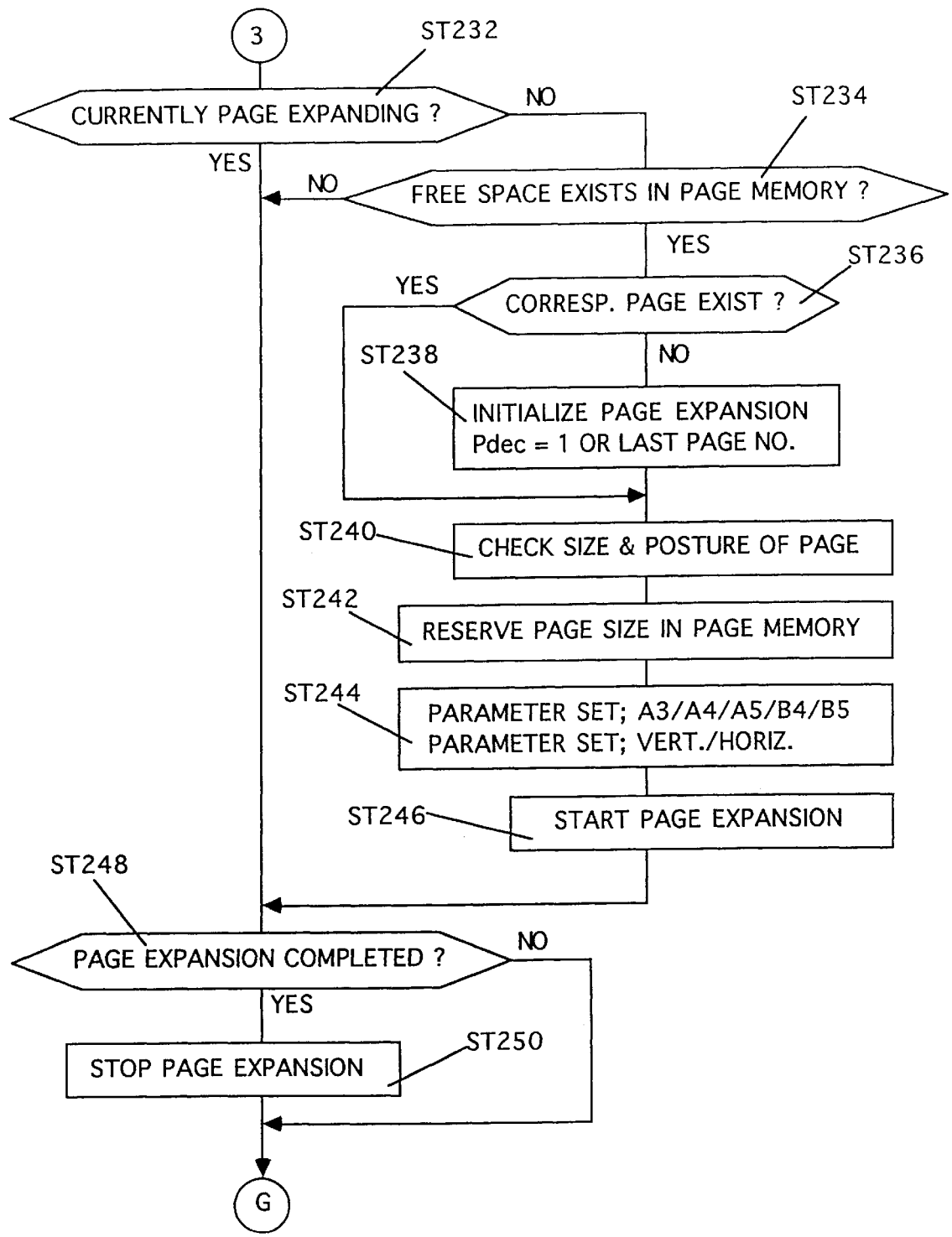
FIGS. 27A and 27B are flow charts for explaining an operation of retrieving an image stored in the hard disk by using retrieval data, and printing out a plurality of copies of the image.
Figure 27B:
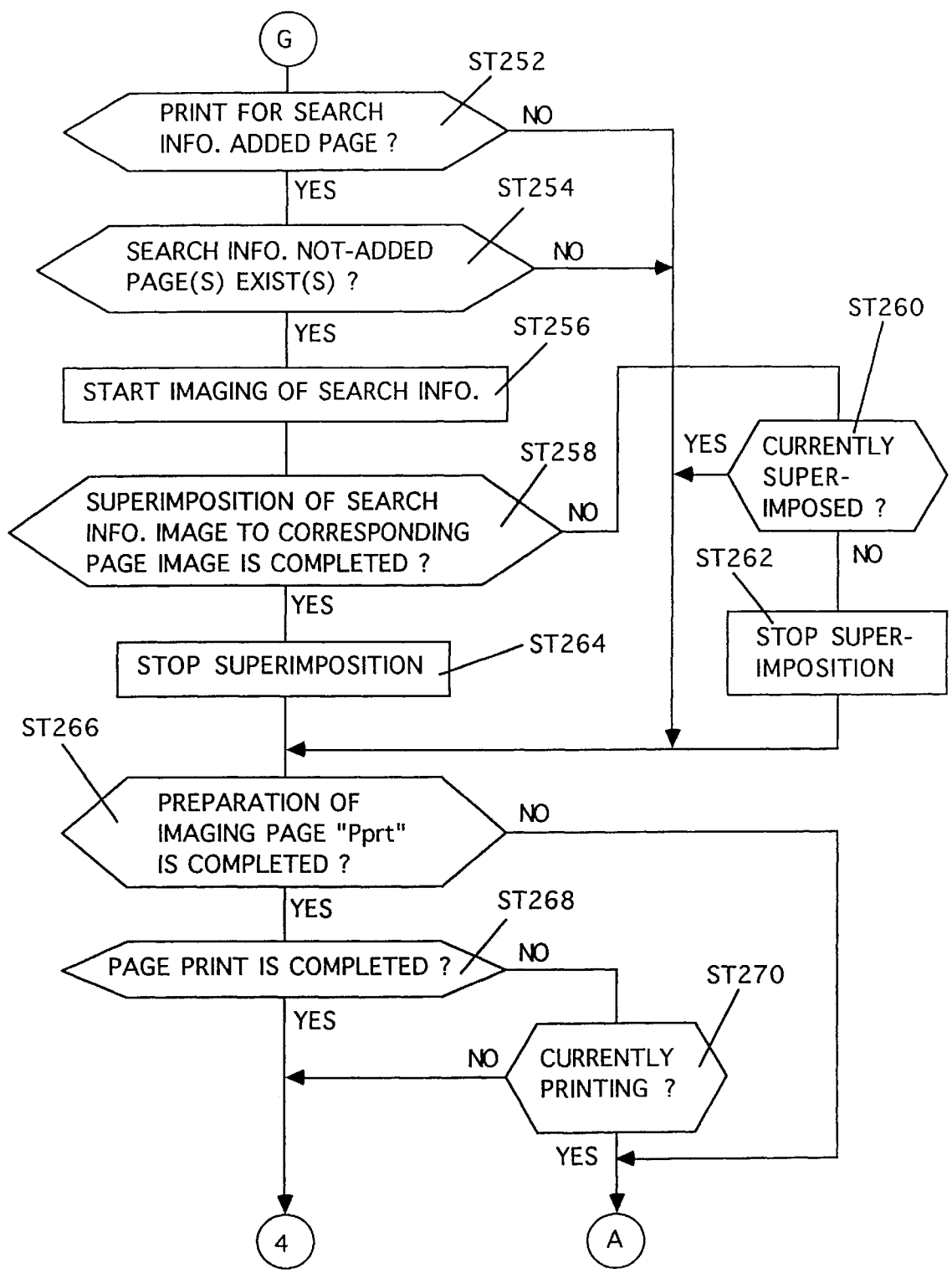
Figure 28A:
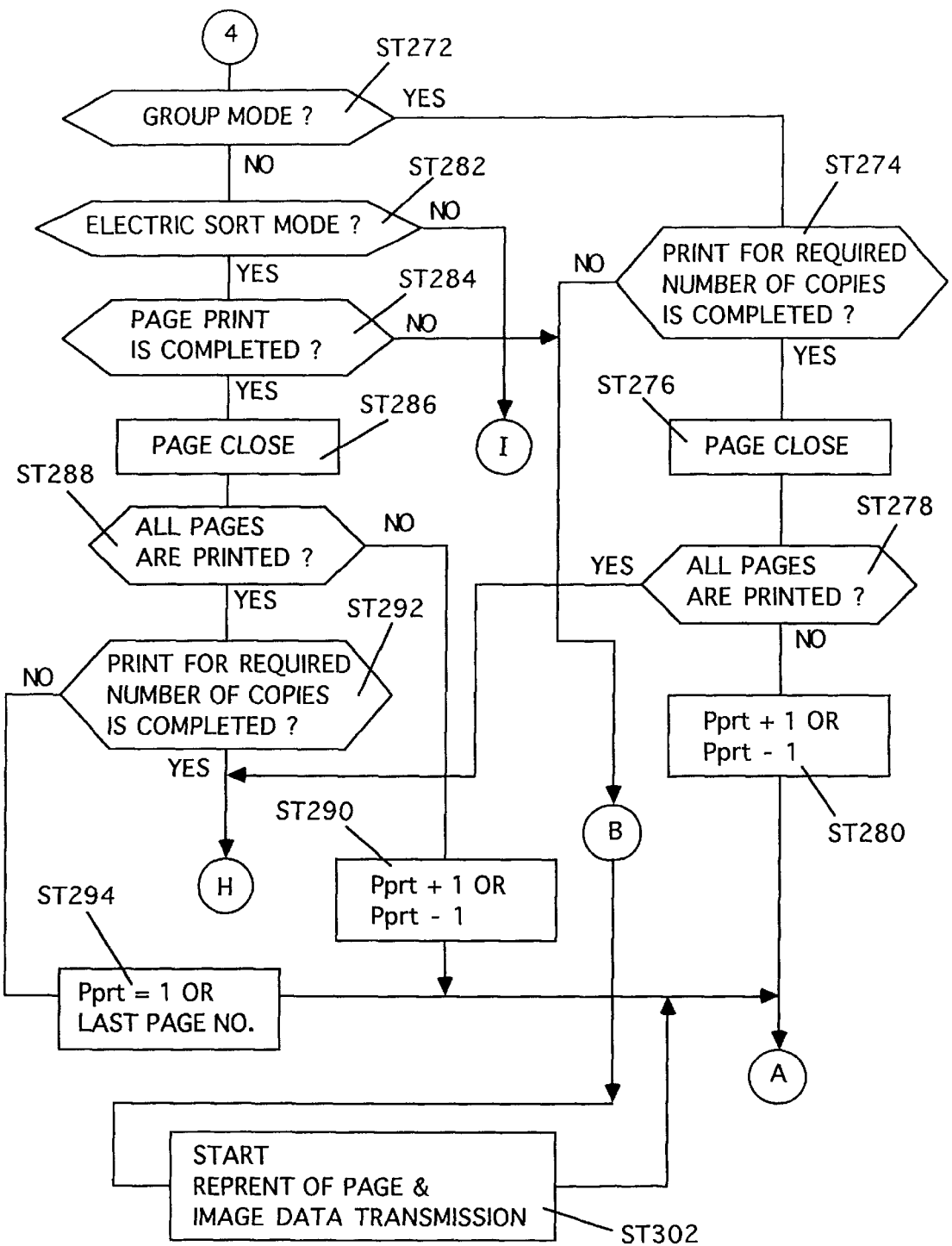
FIGS. 28A and 28B are flow charts for explaining an operation of retrieving an image stored in the hard disk by using retrieval data, and printing out a plurality of copies of the image.
Figure 28B:
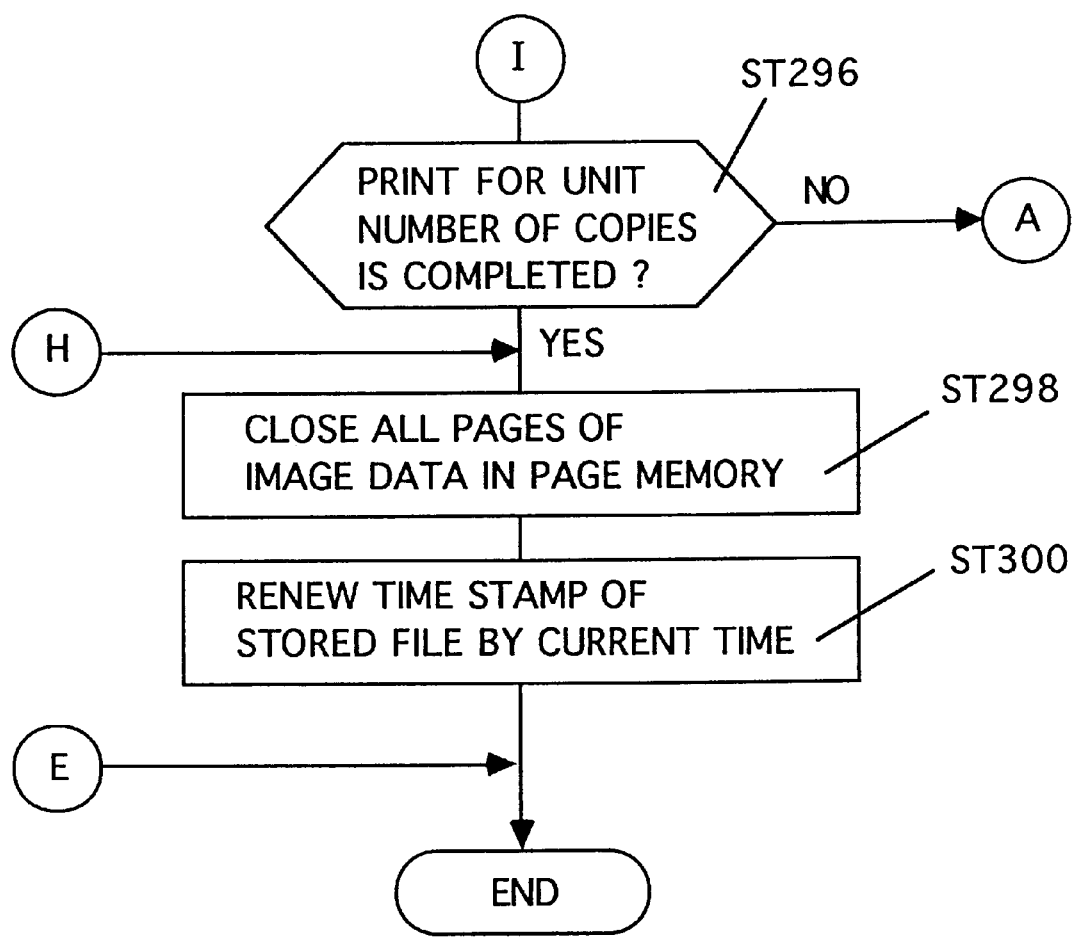
Figure 29A:
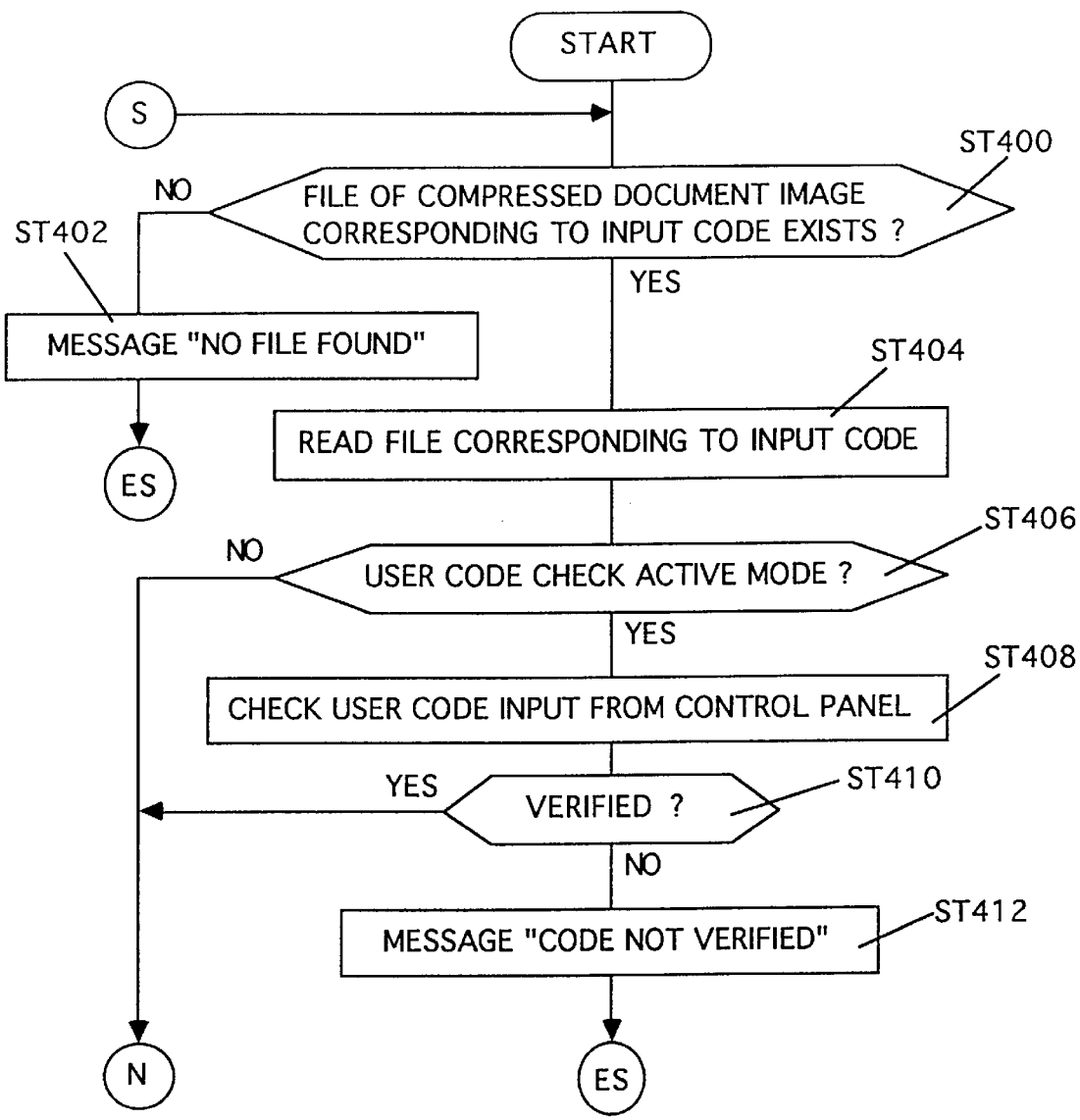
FIGS. 29A and 29B are flow charts for explaining an operation of retrieving an image stored in the hard disk by using retrieval data, and transmitting it through a FAX.
Figure 29B:
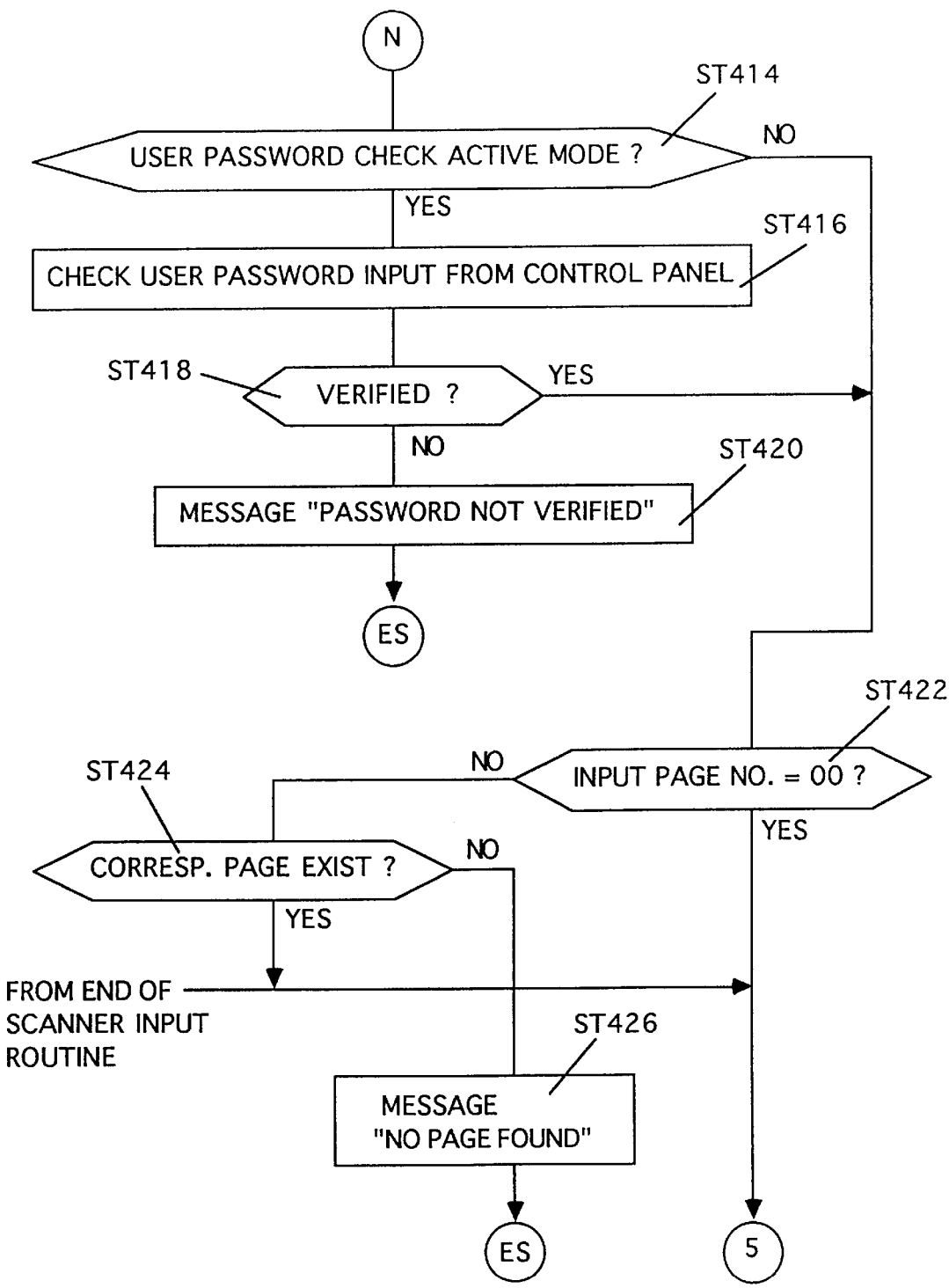
Figure 30A:
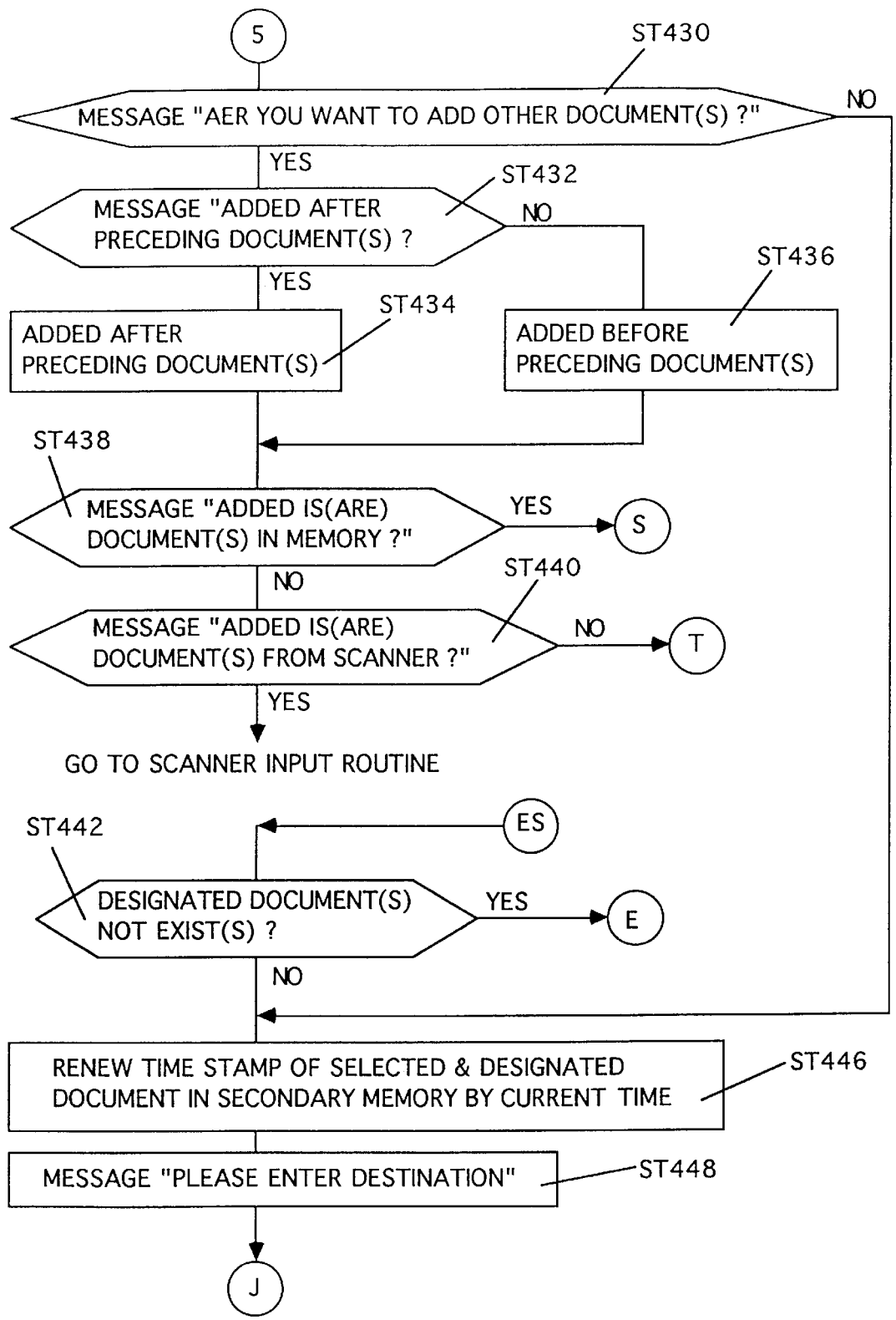
FIGS. 30A and 30B are flow charts for explaining an operation of retrieving an image stored in the hard disk by using retrieval data, and transmitting it through the FAX.
Figure 30B:
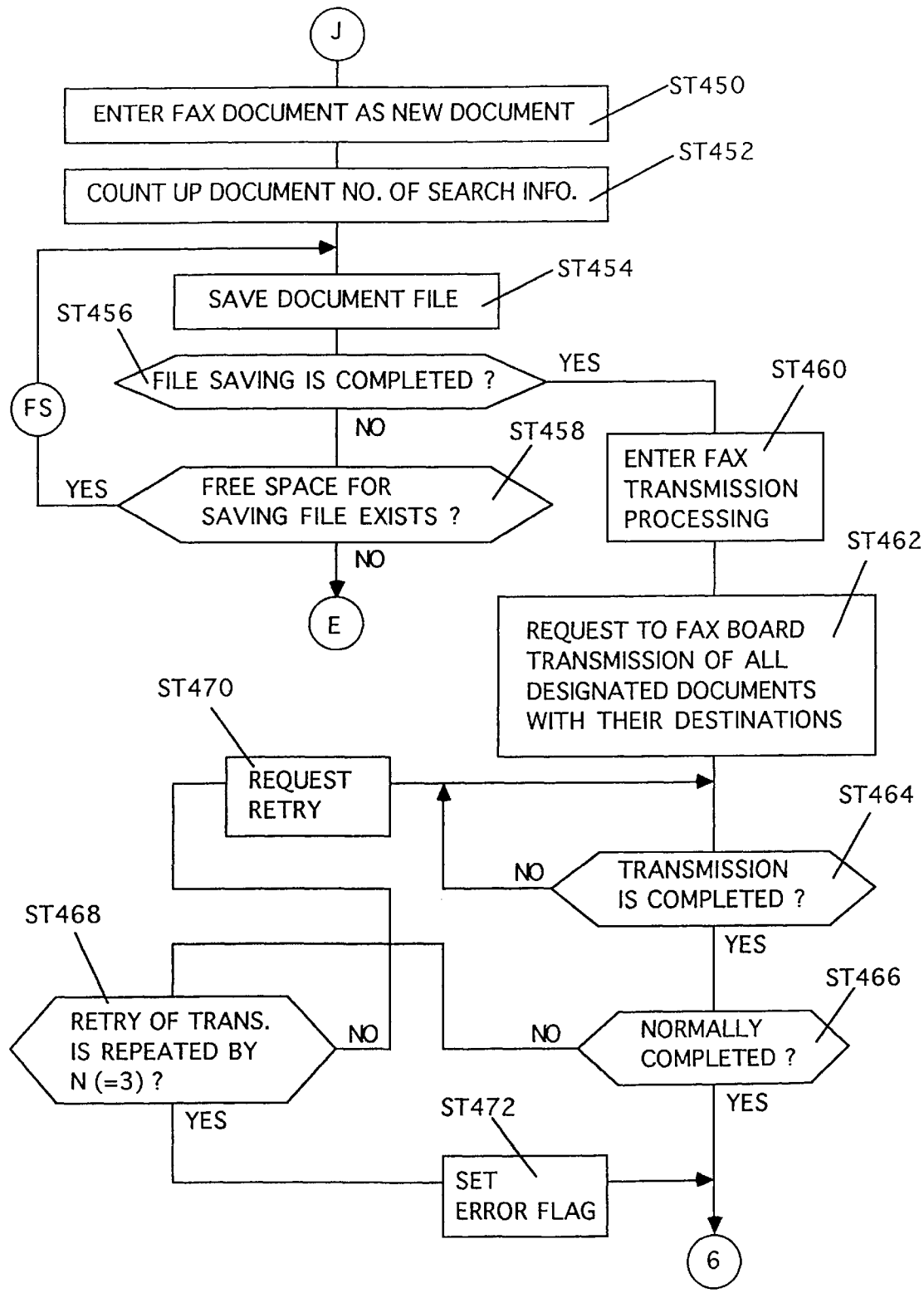
Figure 31A:
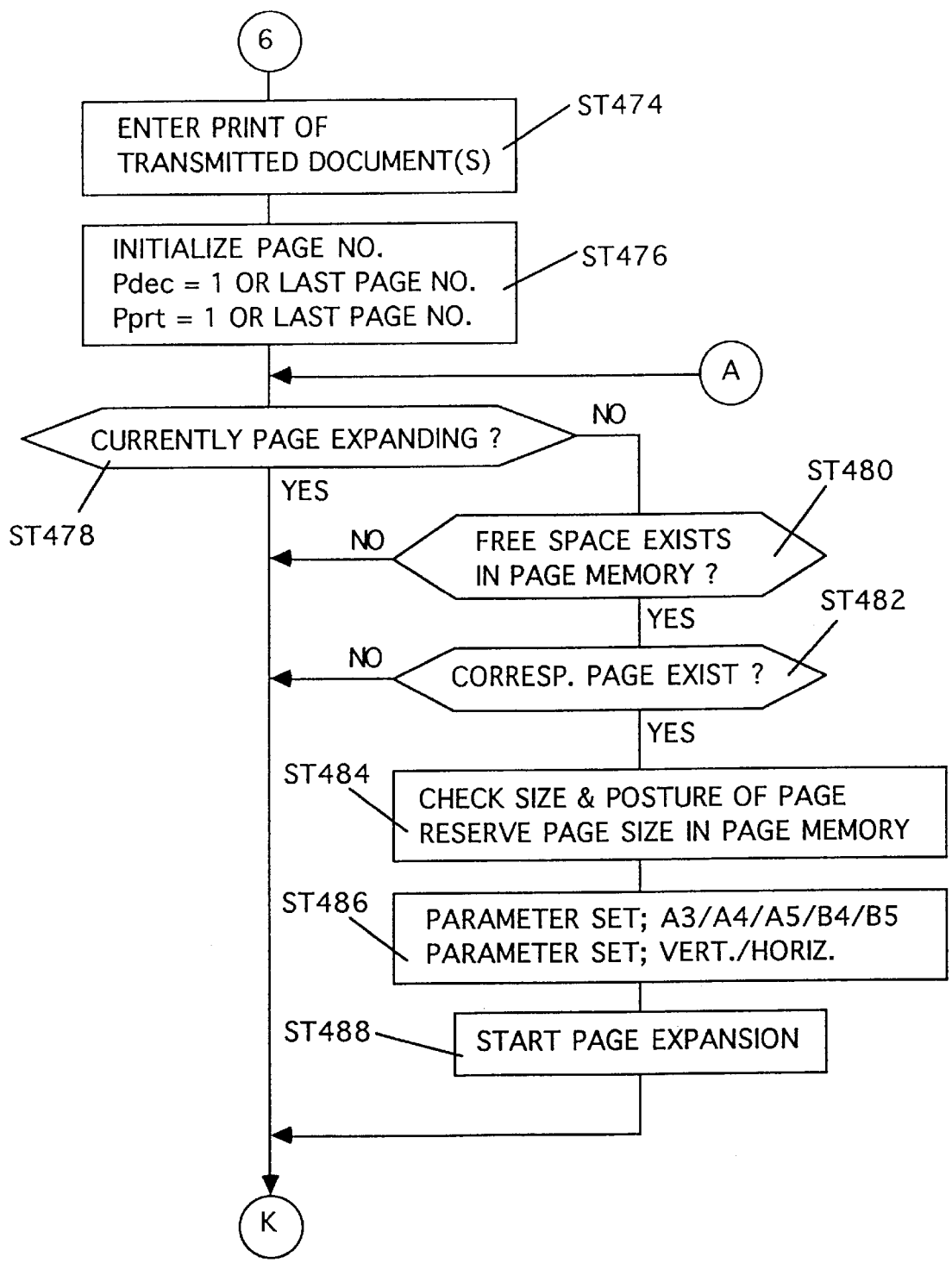
FIGS. 31A and 31B are flow charts for explaining an operation of retrieving an image stored in the hard disk by using retrieval data, and transmitting it through the FAX.
Figure 31B:
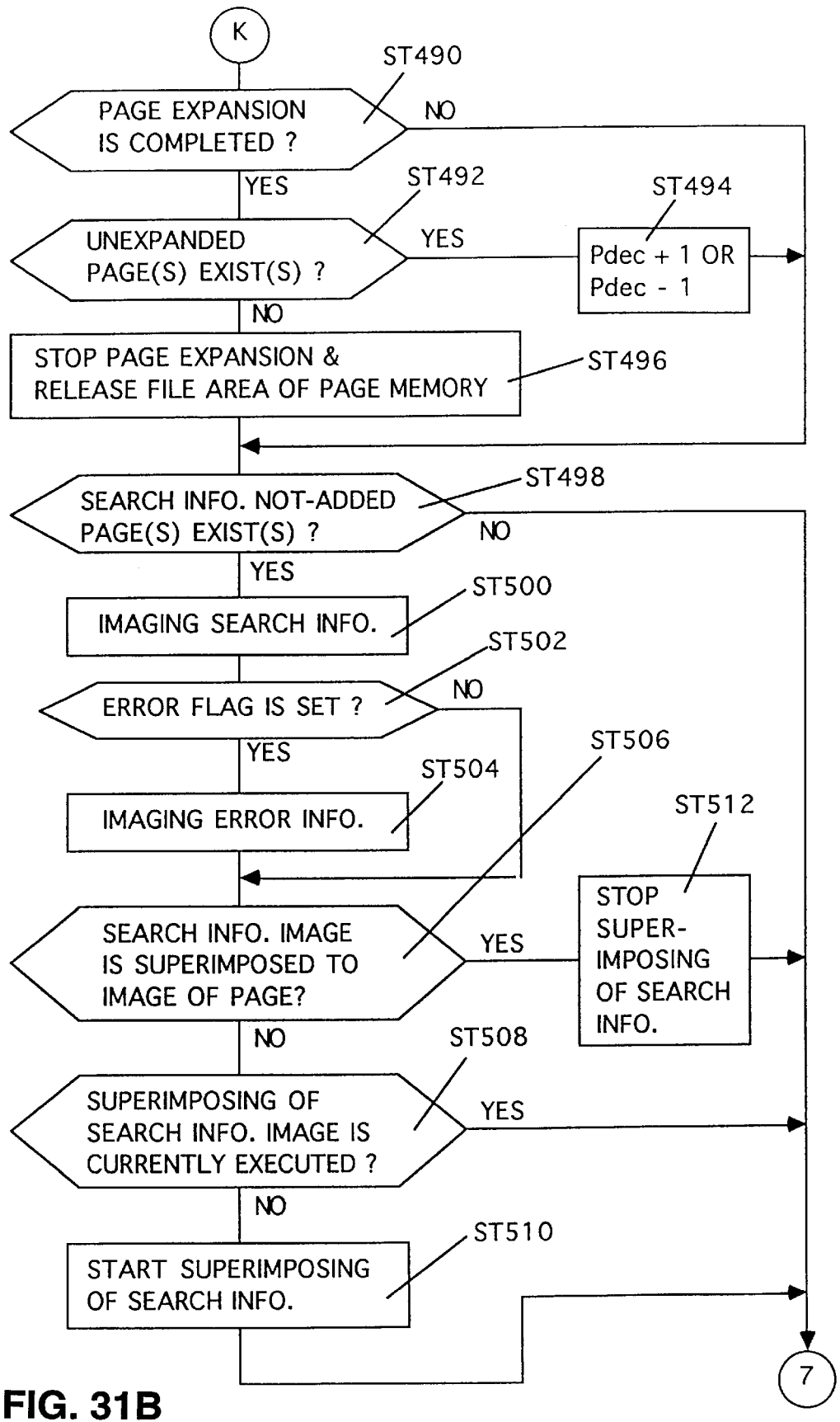
Figure 32:
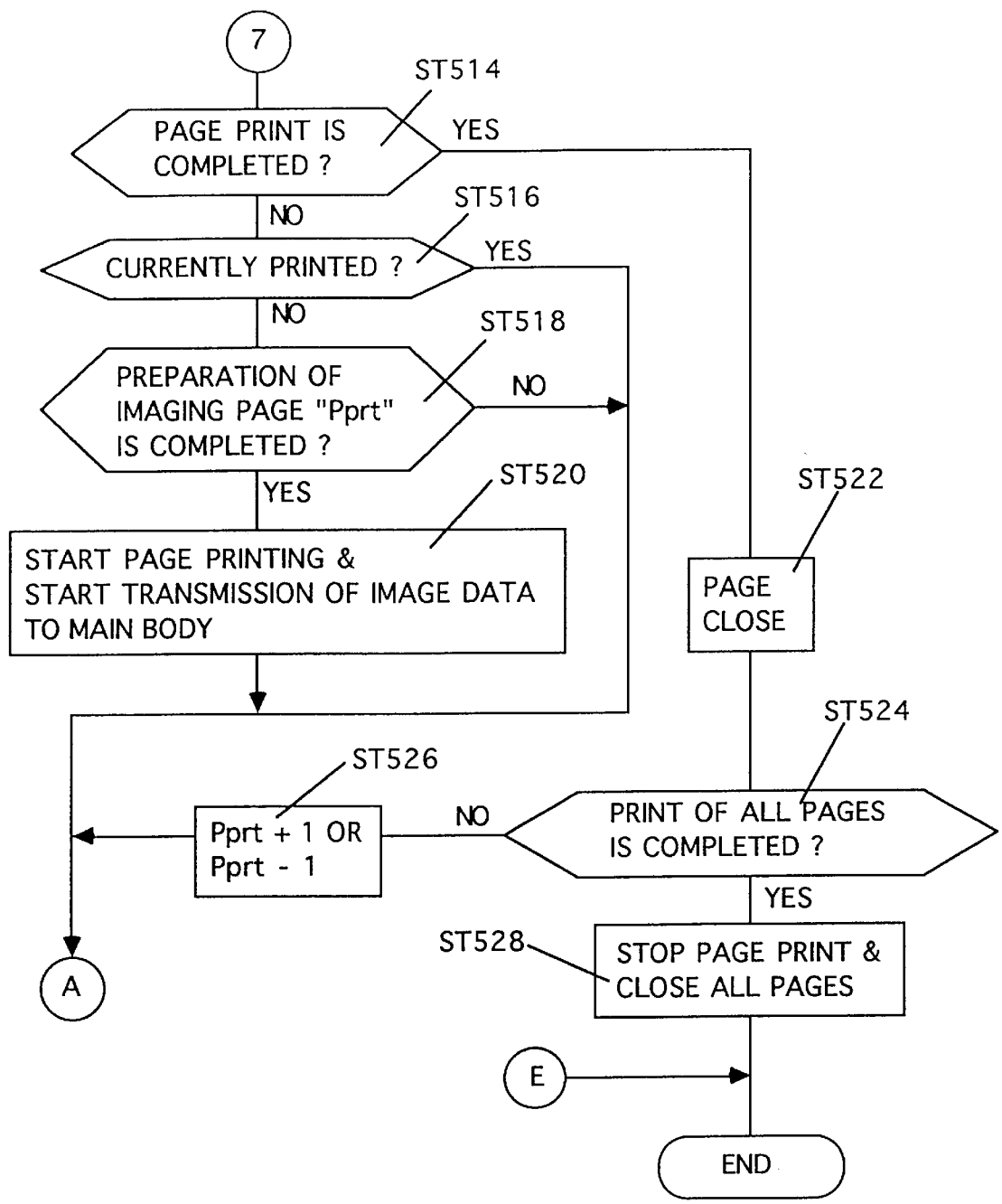
FIG. 32 is a flow chart for explaining an operation of retrieving an image stored in the hard disk by using retrieval data, and transmitting it through the FAX.
Figure 33:
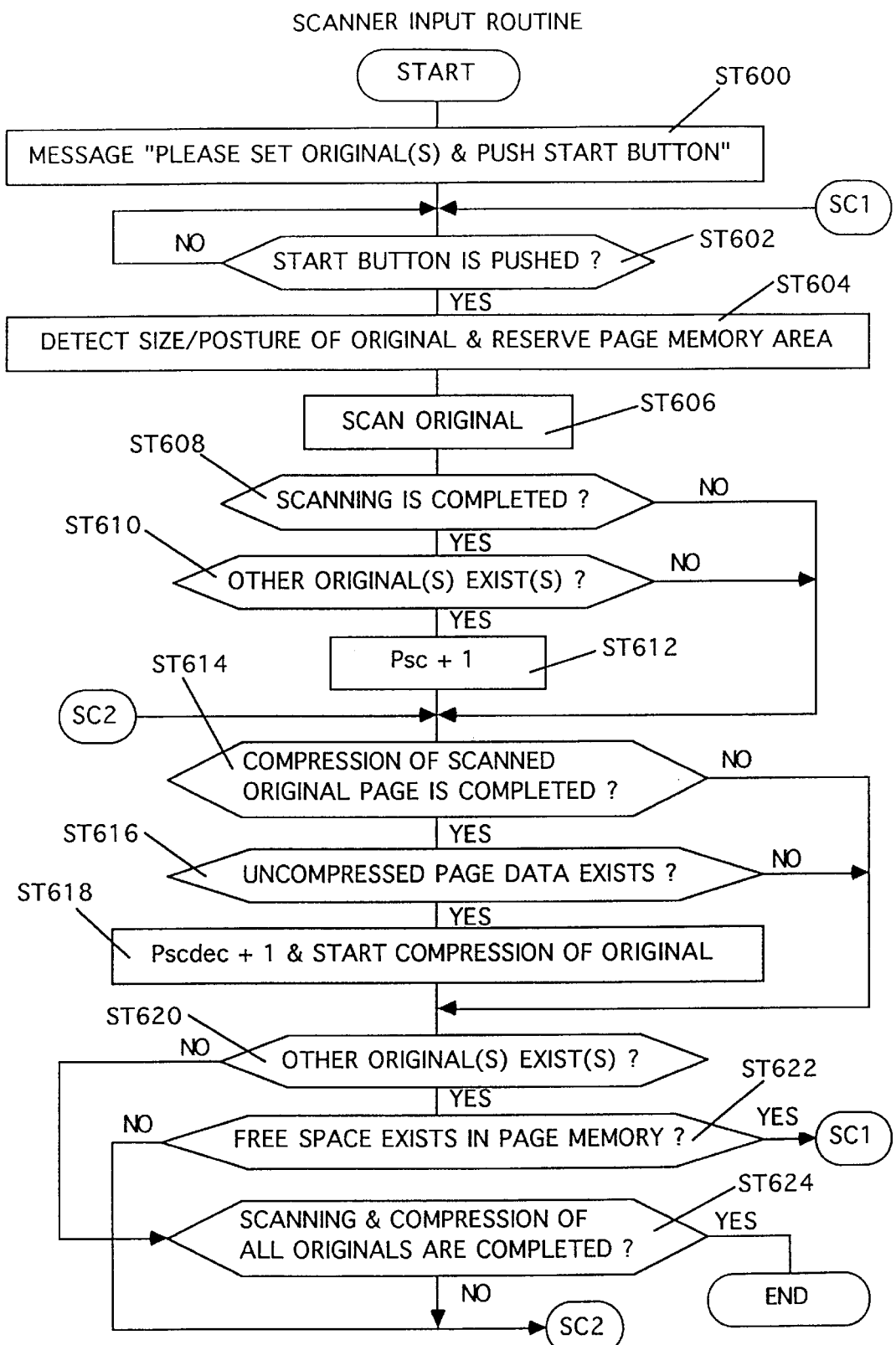
FIG. 33 is a flow chart for explaining an operation of retrieving an image stored in the hard disk by using retrieval data, and transmitting it through the FAX.
Figure 34:
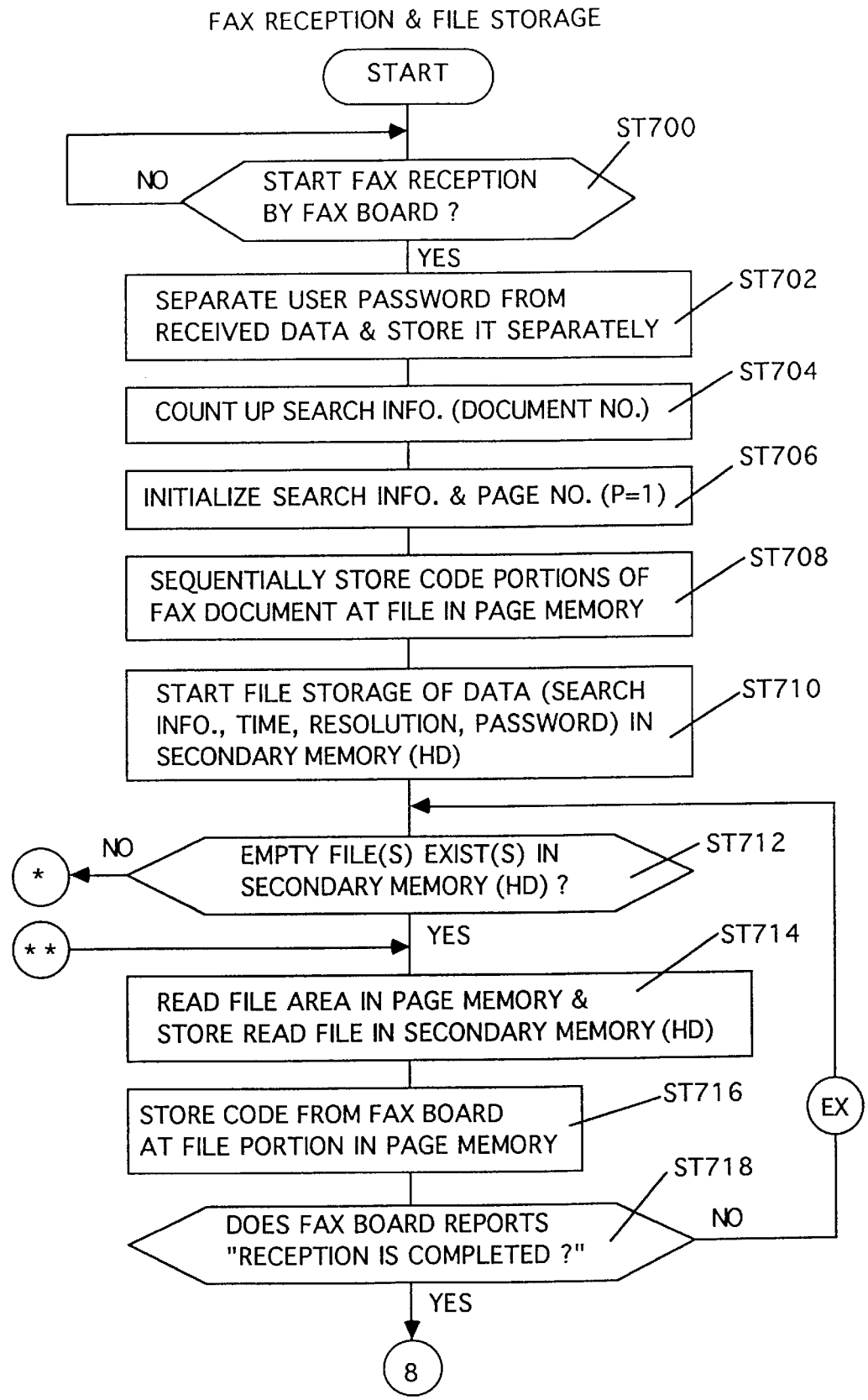
FIG. 34 is a flow chart for explaining an operation of printing a document received through the FAX with retrieval data being added to the document, and at the same time storing the received data in the hard disk together with the retrieval data.
Figure 35A:
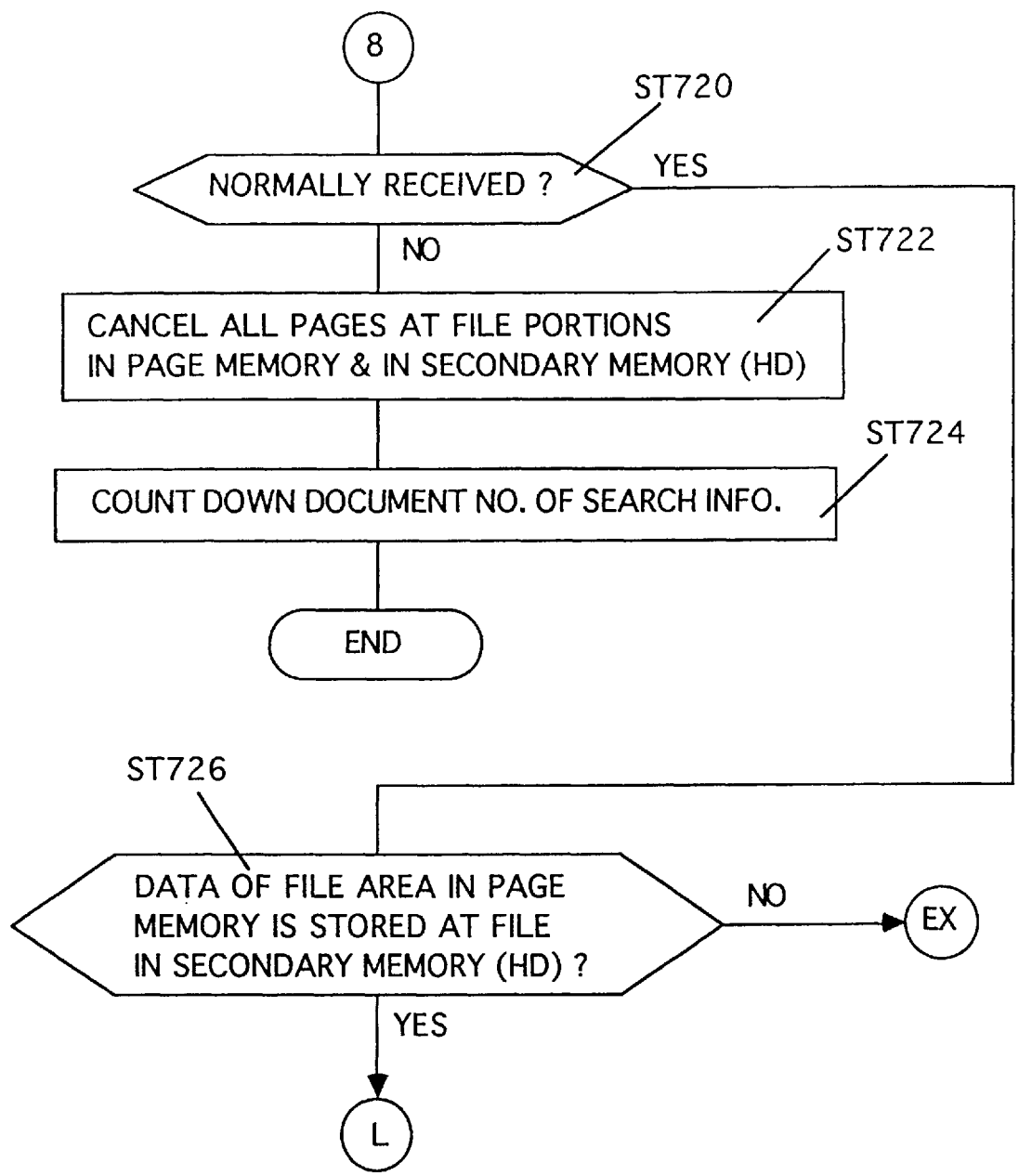
FIGS. 35A and 35B are flow charts for explaining an operation of printing a document received through the FAX with retrieval data being added to the document, and at the same time storing the received data in the hard disk together with the retrieval data.
Figure 35B:
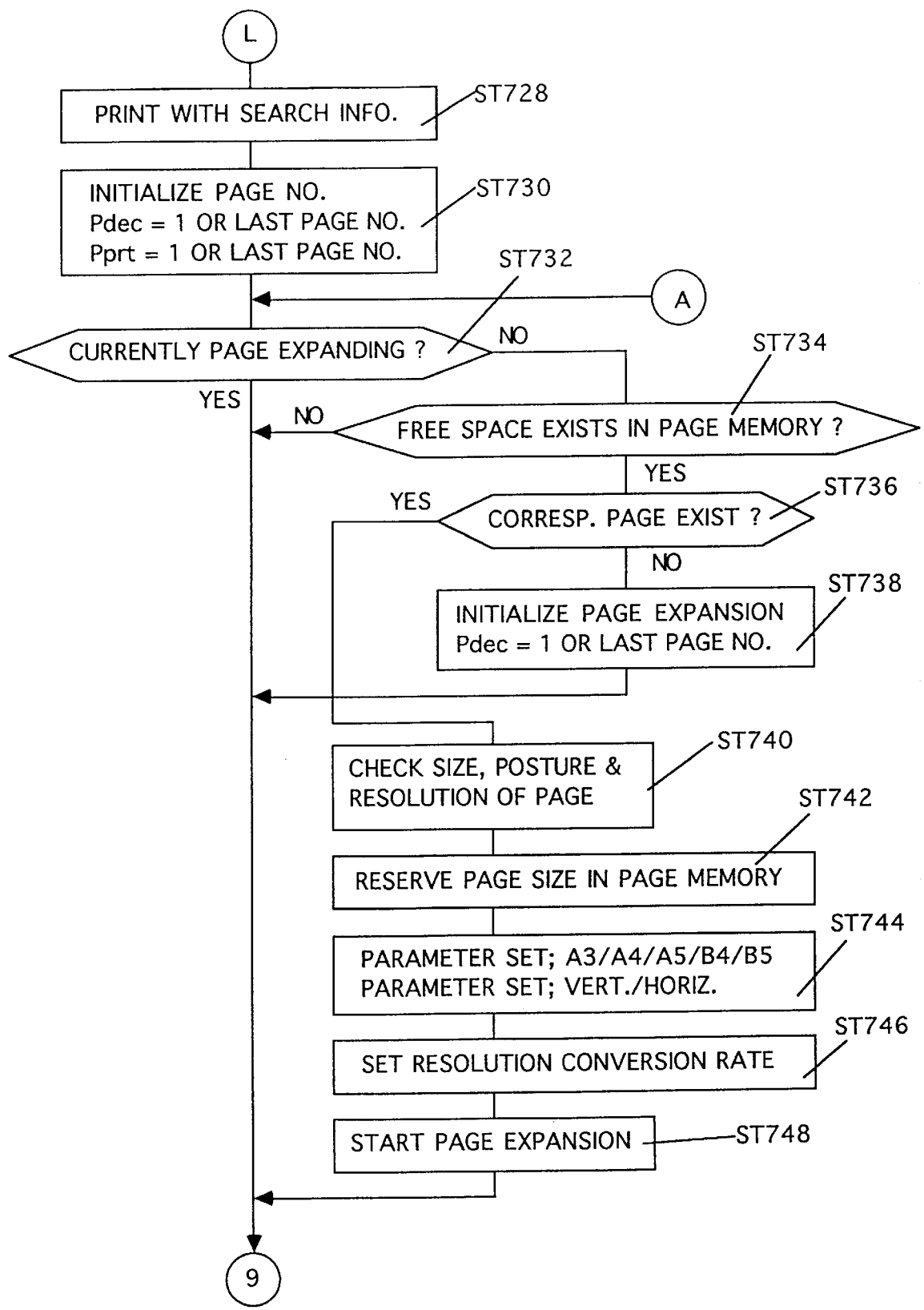
Figure 36A:
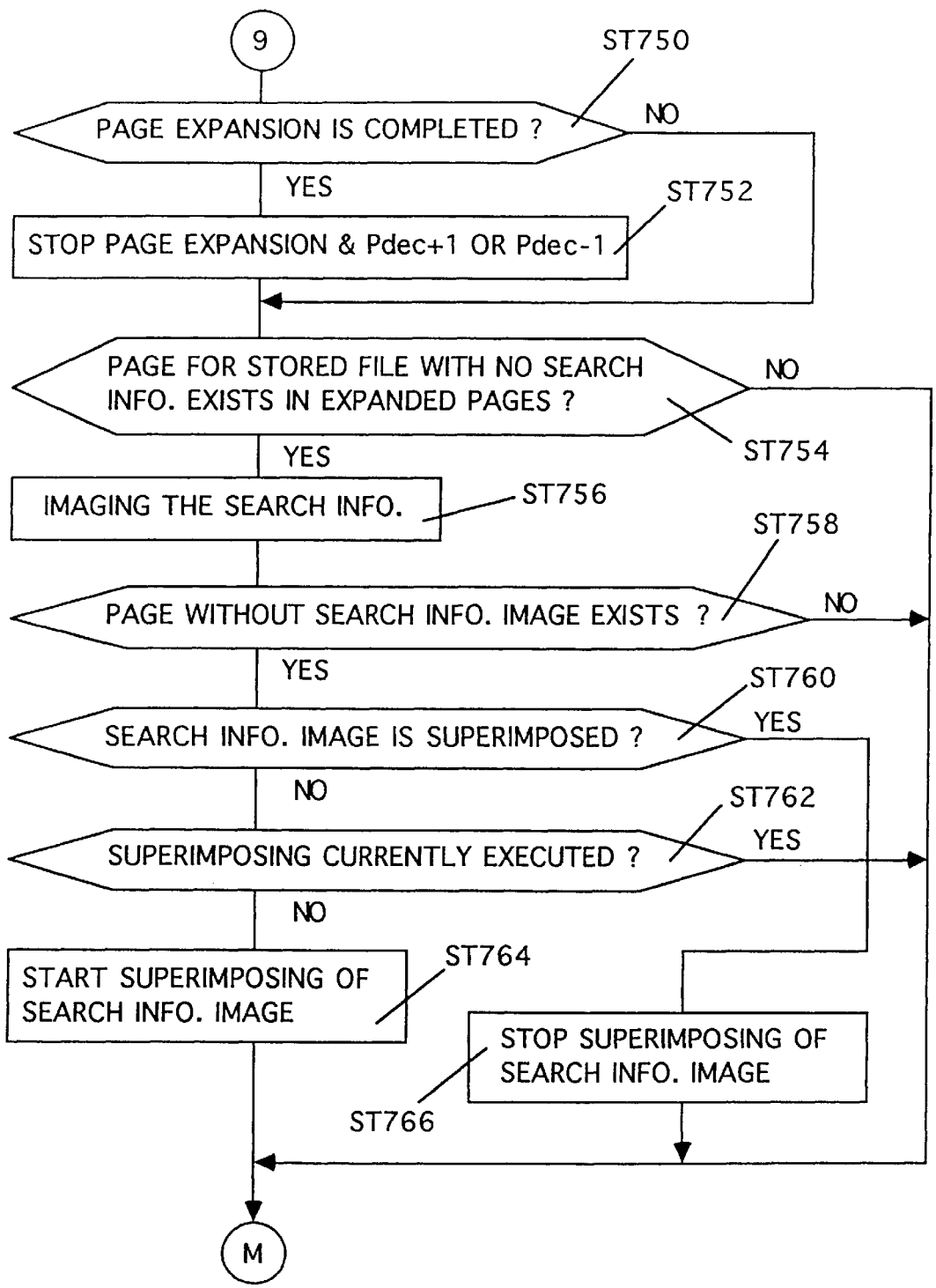
FIGS. 36A and 36B are flow charts for explaining an operation of printing a document received through the FAX with retrieval data being added to the document, and at the same time storing the received data in the hard disk together with the retrieval data.
Figure 36B:
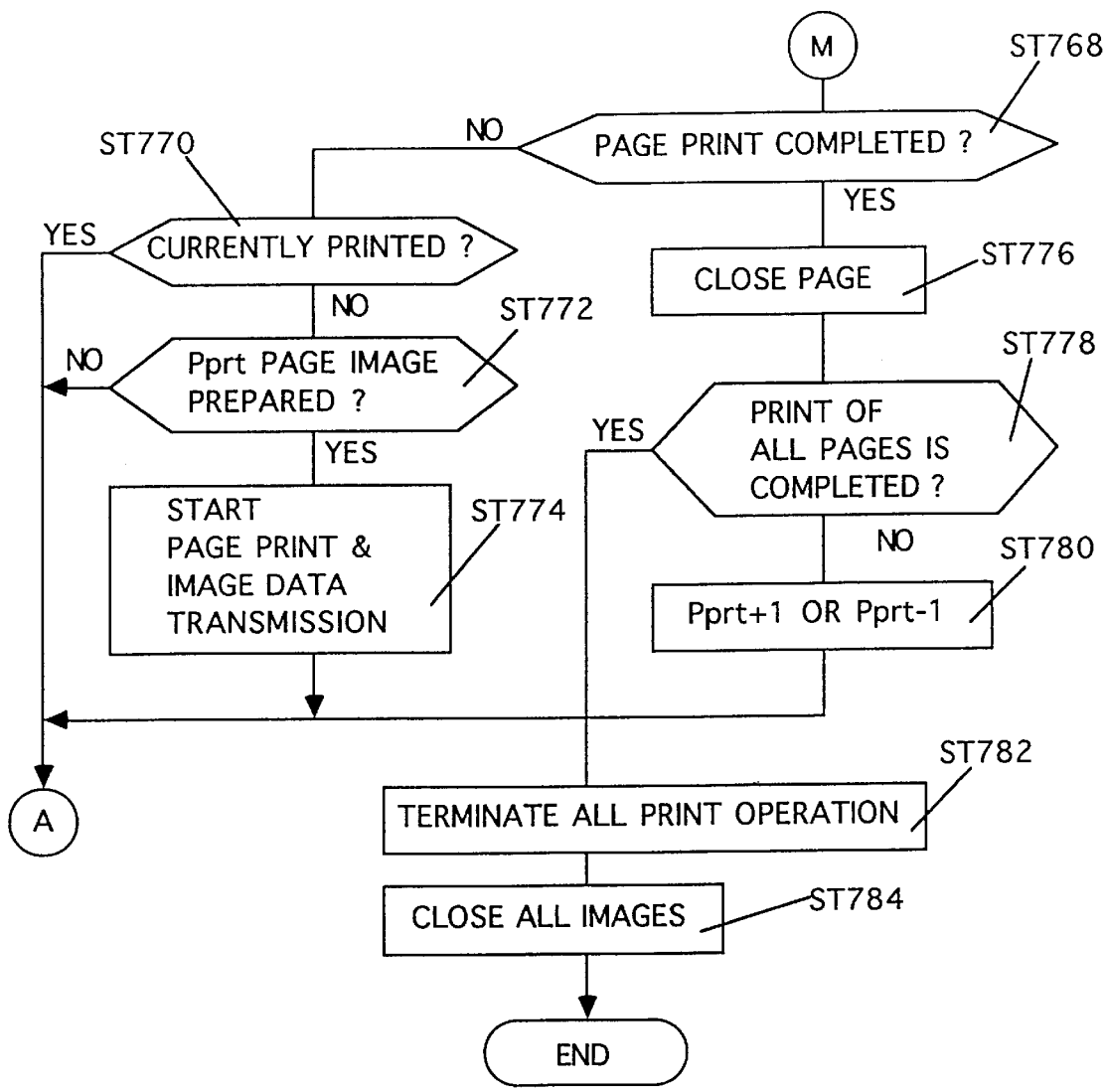

Oldest file deletion routine 2 (deletion after predetermined period of time) for hard disk HD as a secondary memory will be described below with reference to FIG. 25C.

When routine 2 is started (step ST120), the time data of all files are retrieved, and a file which has been retained for a period of time exceeding a time T (predetermined data) after it was filed is detected (step ST122). If such a file is detected (YES in step ST124), the file is deleted from hard disk HD (step ST126). Routine 2 is then terminated (step ST128).

Assume that an image stored in hard disk HD is retrieved by using retrieval data, and printing of a plurality of copies (i.e., memory retrieval copy processing) is performed. This operation will be described next with reference to the flow charts shown in FIGS. 26A to 28B.

First of all, in image retrieval/search processing, an operator of the system inputs from control panel 12 in FIG. 1B a request for producing a desired number of prints (copies) of a specific document which has been printed by the system of FIGS. 1A and 1B. This request includes information (serial number, file name or the like) for identifying the specific document whose data is stored in HDD 35 in FIG. 1B.

After the operator inputs the above request, it is checked whether there is a compressed file of a document image corresponding to an input code (step ST200). If there is no such a file (NO in step ST200), a message "No corresponding document is present" is displayed on control panel 12 (step ST202), and the processing is terminated.

If there is the compressed file of the document image corresponding to the input code (YES in step ST200), the compressed file of the corresponding document image is read out from hard disk HD (step ST204). It is then checked whether the mode of the file includes a check on a user code (step ST206). If the mode includes such a check (YES in step ST206), a user code input through control panel 12 is checked (step ST208). Thereafter, it is checked whether the input user code is verified (step ST210). If the user code is not verified (NO in step ST210), a message "The user code is not verified" is displayed on control panel 12 (step ST211), and the processing is terminated.

If the mode does not include such a check (NO in step ST206), or the input user code is verified (YES in step ST210), it is checked whether the mode includes a check on a user password (step ST214). If the mode includes such a check (YES in step ST214), a user password input through control panel 12 is checked (step ST216). Thereafter, it is checked whether the input user password is verified (step ST218). If the user password is not verified (NO in step ST218), a message "The user password is not verified" is displayed on control panel 12 (step ST220), and the processing is terminated.

If the mode does not include a check on a user password (NO in step ST214), or the input password is verified (YES in step ST218), it is checked whether the input page number is "00" (step ST222). If the input page number is not "00" (NO in step ST222), it is checked whether a corresponding page is present (step ST224). If no corresponding page is present (NO in step ST224), a message "No corresponding page is present" is displayed on control panel 12 (step ST226), and the processing is terminated. If the input page number is "00" (YES in step ST222), page number initialization is performed (step ST228). That is, page No. Pdec is set to "1" or "last page", and page No. Pprt is set to "1" or "last page". After this initialization, or if a corresponding page is present (YES in step ST224), the flow advances to image copy processing (step ST230).

In the image copy processing, first of all, it is checked whether page expansion is in progress (step ST232). If page expansion is not in progress (NO in step ST232), it is checked whether there is a free area in page memory 23 (step ST234). If there is a free area in page memory 23 (YES in step ST234), it is checked whether a corresponding page is present (step ST236). If no corresponding page is present (NO in step ST236), the expanded page number is initialized (step ST238). That is, Pdec is set to "1" or "last page". After this initialization, or if a corresponding page is present (YES in step ST236), the page size/posture is checked (step ST240). The page size in page memory 23 is reserved (step ST242), and parameters are set (step ST244), thereby starting page expansion processing (step ST246).

If page expansion is in progress (YES in step ST232), or there is no free area in page memory 23 (NO in step ST234), it is checked whether the page expansion is completed (step ST248). If the page expansion is completed (YES in step ST248), the page expansion processing is stopped (step ST250). When this page expansion processing is stopped, or if page expansion is not completed (NO in step ST248), it is checked whether retrieval data is added and printed (step ST252).

It such a printing operation is to be performed (YES in step ST252), it is checked whether there is a page to which no retrieval data is added (step ST254). If such a page is present (YES in step ST254), imaging processing of the retrieval data is performed (step ST256). It is then checked whether superimposition processing of the retrieval data image is completed (step ST258). If such processing is not completed (NO in step ST258), it is checked whether superimposition processing of the retrieval data is in progress (step ST260). If superimposition processing is not in progress (NO in step ST260), superimposition processing of the image is started (step ST262). If superimposition processing of the retrieval data image is completed (YES in step ST258), the superimposition processing of the image is stopped (step ST264).

Assume that this superimposition processing is stopped, no retrieval data is to be added and printed, there is no page having no retrieval data added thereto (NO in step ST254), superimposition processing of the retrieval data is in progress (YES in step ST260), or superimposition processing of the image is started (step ST262). In this case, it is checked whether preparation of an image of page Pprt is completed (step ST266). If this preparation is completed (YES in step ST266), it is checked whether page print processing is completed (step ST268). If the page print processing is not completed (NO in step ST268), it is checked whether the page print processing is in progress (step ST270). If the page print processing is in progress (YES in step ST270), or preparation of an image of page Pprt is not completed (NO in step ST266), the flow returns to the first step of the image copy processing (step ST230).

If the page print processing is completed (YES in step ST268), or the page print processing is not in progress (NO in step ST270), it is checked whether a group mode is set (step ST272). If the group mode is set (YES in step ST272), it is checked whether printing of the required number of copies is completed (step ST274). If such print processing is completed (YES in step ST274), the page is closed (step ST276), and it is checked whether printing of all the pages is completed (step ST278). If printing of all the pages is not completed (NO in step ST278), page No. increment "Pprt+1" or page No. decrement "Pprt−1" is performed (step ST280), and the flow returns to the first step of the image copy processing (step ST230). If printing of the required number of copies is not completed (NO in step ST274), page (re-print) print processing is started, and transfer of image data is started (step ST302). The flow then returns to the first step of the image copy processing (step ST230).

If the group mode is not set (NO in step ST272), it is checked whether an electronic sort mode is set (step ST282). If the electronic sort mode is set (YES in step ST282), it is checked whether page print processing is completed (step ST284). If the page print processing is completed (YES in step ST284), the page is closed (step ST286), and it is checked whether printing of all the pages is completed (step ST288). If printing of all the pages is completed (YES in step ST288), it is checked whether printing of the required number of copies is completed (step ST292). If such print processing is not completed (NO in step ST292), Pprt is set to "1" or "last page" (step ST294), and the flow returns to the first step of the image copy processing (step ST230).

If printing of all the pages is not completed (NO in step ST284), page (re-print) print processing is started, and transfer of image data is started (step ST302). The flow then returns to the first step in the image copy processing (step ST230). If printing of all the pages in the electronic sort mode is not completed (NO in step ST288), page No. increment "Pprt+1" or page No. decrement "Pprt−1" is performed (step ST290), and the flow returns to the first step in the image copy processing (step ST230).

If the electronic sort mode is not set (NO in step ST282), it is checked whether printing of a single page is completed (step ST296). If printing of the single page is not completed (NO in step ST296), the flow returns to the first step in the image copy processing (step ST230).

Assume that printing of the single page is completed (YES in step ST296); printing of all the pages in the group mode is completed (YES in step ST278); or printing of the required number of pages in the electronic sort mode is completed (YES in step ST292). In this case, all the pages of the image data in page memory 23 are closed (step ST298), and the file retention time is updated (updated to current time data) (step ST300). The processing is then terminated.

Assume that an image stored in hard disk HD is retrieved by using retrieval data, and FAX transmission (i.e., memory retrieval FAX processing) of the retrieved data is performed. This operation will be described next with reference to the flow charts shown in FIGS. 29A to 33.

In transmission document selection processing, first of all, it is checked whether there is a document image compressed file corresponding to a code input through control panel 12 (step ST400). If there is no such a file (NO in step ST400), the message "No corresponding document is present" is displayed on control panel 12 (step ST402), and the flow advances to the processing of checking the presence/absence of a cumulative total designation document (step ST442 in FIG. 30A).

If such a file is present (YES in step ST400), the image compressed file of the corresponding document is read out (step ST404). It is then checked whether the mode of the file includes a check on a user code (step ST406). If such a mode is set (YES in step ST406), a user code input through control panel 12 is checked (step ST408). It is then checked whether the input user code is verified (step ST410). If the user code is not verified (NO in step ST410), the message "The user code is not verified" is displayed on control panel 12 (step ST412), and the flow advances to the processing of checking the presence/absence of a cumulative total designation document (step ST442).

If the mode does not include a check on a user code (NO in step ST406), or the input user code is verified (YES in step ST410), it is checked whether the mode includes a check on a user password (step ST414). If such a mode is set (YES in step ST414), a user password input through control panel 12 is checked (step ST416). It is then checked whether the input user password is verified (step ST418). If the user password is not verified (NO in step ST418), the message "The user password is not verified" is displayed on control panel 12 (step ST420), and the flow advances to the processing of checking presence/absence of a cumulative total designation document (step ST442).

If the mode does not include a check on a user password (NO in step ST414), or the input user password is verified (YES in step ST418), it is checked whether the input page number is "00" (step ST422). If the input page number is not "00" (NO in step ST422), it is checked whether a corresponding page is present (step ST424). If no corresponding page is present (NO in step ST424), the message "No corresponding page is present" is displayed on control panel 12 (step ST426), and the flow advances to the processing of checking presence/absence of a cumulative total designation document (step ST442). Assume that the input page number is "00" (YES in step ST422), a corresponding page is present (YES in step ST424), or a scanner input routine is completed. In this case, a message "Are there any other documents to be added?" is displayed on control panel 12 (step ST430).

If the presence of another document to be added is designated in response to this guide (YES in step ST430), a message "Do you want to add another document after the preceding document?", which guides the user to choose between post-addition or pre-addition, is displayed on control panel 12 (step ST432). If post-addition (step ST434) or pre-addition (step ST436) is designated in response to this guide, a message "Is the document in the memory?", which guides the user to select a document to be added, is displayed on control panel 12 (step ST438). If it is designated in response to this guide that the document is not in the memory (NO in step ST438), a message "Is the document input by the scanner?", which guides the user to select a document to be added, is displayed on control panel 12 (step ST440). If it is designed in response to this guide that the document is not input by the scanner (NO in step ST440), the flow returns to the processing of checking the presence/absence of a document to be added (step ST430).

If the document to be added is in the memory (YES in step ST438), the flow returns to the first step in the transmission document selection processing (step ST400). If the document to be added is input by the scanner (YES in step ST440), the flow advances to the scanner input routine (to be described later with reference to FIG. 33).

Assume that the corresponding document is not present (step ST402), the user code is not verified (step ST412), the password is not verified (step ST420), or no corresponding page is present (step ST426). In this case, the presence/absence of a cumulative total designation document is checked (step ST442). If no cumulative total designation document is present (YES in step ST442), the processing is terminated. If a cumulative total designation document is present (NO in step ST442), or no document to be added is present (NO in step ST430), time data update processing (updated to current time data) of an extracted designated document stored in hard disk HD as a secondary memory is performed (step ST446). Subsequently, a message "Please designate a transmission destination", which guides the user to designate a transmission destination, is displayed on control panel 12 (step ST448). In response to this guide, a transmission destination is designated.

Processing of registering transmission document data as a new document is started (step ST450). First of all, the document number of the retrieval/search data is counted up (step ST452), and the file is retained or saved (step ST454). It is then checked whether retention/saving of the file is completed (step ST456). If retention of the file is not completed (NO in step ST456), it is checked whether a file retention area is present (step ST458). If no file retention area is present (NO in step ST458), the processing is terminated. If a file retention area is present (YES in step ST458), the flow returns to the file retention processing (step ST454). If retention of the file is completed (YES in step ST456), the flow advances to FAX transmission processing (step ST460).

In the FAX transmission processing (step ST460), first of all, a transmission request for a designated document is sent to the FAX board, together with transmission destination data (step ST462). The flow waits (NO in step ST464) until this transmission is completed. If the transmission is completed (YES in step ST464), it is checked whether the processing is normally terminated (step ST466). If the transmission is not normally terminated (NO in step ST466), it is checked whether a transmission retry operation is performed N times (e.g. three times) (step ST 468). If the transmission retry operation is not performed N (3) times (No in step ST 468), a transmission retry request is generated (step ST470), and the flow returns to the check processing (step ST464) after the transmission. If a transmission retry operation is performed N (3) times (YES in step ST468), a transmission error flag is set (step ST472), and the flow advances to transmission document print processing (step ST474 in FIG. 31A). If the transmission is normally terminated (YES in step ST466), the flow advances to the transmission document print processing (step ST474).

In the transmission document print processing (step ST474), first of all, Pdec is set to "1" or "last page", and Pprt is set to "1" or "last page", thus initializing the page number (step ST476). It is then checked whether page expansion is in progress (step ST478). If page expansion is not in progress (NO in step ST478), it is checked whether there is any free area in page memory 23 (step ST480). If there is a free space (YES in step ST480), it is checked whether a corresponding page is present (step ST482). If the corresponding page is present (YES in step ST482), the page size/posture is checked, and a corresponding area is reserved in page memory 23 (step ST484). Parameters are set (step ST486), and page expansion is started (step ST488).

Assume that this page expansion is started (step ST488), the page expansion is in progress (YES in step ST478), no free space is present (NO in step ST480), or no corresponding page is present (NO in step ST482). In this case, it is checked whether the page expansion is completed (step ST490). If the page expansion is completed (YES in step ST490), it is checked whether there is any other page which has not undergone page expansion (step ST492). If such a page is present (YES in step ST492), page No. Pdec is either incremented or decremented by one (step ST494). If no such a page is present (NO in step ST492), the page expansion processing is stopped, and the file area in page memory 23 is made free (step ST496).

Assume that this file area is made free (step ST496), page No. Pdec is changed (step ST494), or the page expansion is not completed (NO in step ST490). In this case, it is checked whether there is any other page to which no retrieval data is added (step ST498). If such a page is present (YES in step ST498), imaging processing of the retrieval data is performed (step ST500). It is then checked whether there is any transmission error flag (step ST502). If a transmission error flag is present (YES in step ST502), imaging of the transmission error information is performed (step ST504). After imaging of the transmission error information is performed (step ST504), or if no transmission error flag is present (NO in step ST502), it is checked whether image superimposition processing of the retrieval data is completed (step ST506). If this processing is not completed (NO in step ST506), it is checked whether superimposition processing of the image of the retrieval data is in progress (step ST508). If this processing is not in progress (NO in step ST508), image superimposition processing of the retrieval data is started (step ST510). If image superimposition processing of the retrieval data is completed (YES in step ST506), the image superimposition processing is stopped (step ST512).

Assume that this image superimposition processing is stopped (ST512), no page having no retrieval data added thereto is present (NO in step ST498), image superimposition processing of the retrieval data is in progress (YES in step ST508), or image superimposition processing of the retrieval data is started (step ST510). In this case, it is checked whether page print processing is completed (step ST514). If the page print processing is not completed (NO in step ST514), it is checked whether page print processing is in progress (step ST516). If page print processing is not in progress (NO in step ST516), it is checked whether preparation of an image of page Pprt is completed (step ST518). If this preparation is completed (YES in step ST518), page print processing is started, and transfer of image data to the main body is started (step ST520).

If the page print processing is completed (YES in step ST514), the page is closed (step ST522), and it is checked whether printing of all the pages is completed (step ST524). If printing of all the pages is not completed (NO in step ST524), page No. Pprt is either incremented or decremented by one (step ST526). If printing of all the pages is completed (YES in step ST524), the page print processing is stopped, and all the pages are closed (step ST528). The processing is then terminated.

Assume that page print processing is in progress (YES in step ST516), preparation of an image of page Pprt is not completed (NO in step ST518), transfer of image data to the main body is started (step ST520), or page No. Pprt is changed (step ST526). In this case, the flow returns to the processing of checking whether page expansion is in progress (step ST478).

The scanner input routine will be described next. First of all, a message "Please press the start button after an original is set" is displayed on control panel 12 (step ST600). If the start button is depressed in response to this guide (YES in step ST602), the original size is detected, and a corresponding area is reserved in page memory 23 (with this operation, size/posture data is reserved) (step ST604). The original is then scanned (step ST606), and it is checked whether scanning of the original is completed (step ST608). If scanning of the original is completed (YES in step ST608), it is checked whether there is another original to be scanned (step ST610). If another original is present (YES in step ST610), page No. Psc is incremented by one (step ST612).

If scanning of the original is not completed (NO in step ST608), or no other original is present (NO in step ST610), it is checked whether compression of the scanned original page is completed (step ST614). If this processing is completed (YES in step ST614), it is checked whether there is any non-compressed page data (step ST616). If such page data is present (YES in step ST616), page No. Pscdec is incremented by one, and compression of the original is started (step ST618).

Assume that this compression is started (step ST618), compression of the scanned original page is not completed (NO in step ST614), or non-compressed page data is present (NO in step ST616). In this case, it is checked whether there is another original (step ST620). If another original is present (YES in step ST620), it is checked whether there is any free area in page memory 23 (step ST622). If a free area is present (YES in step ST622), the flow returns to the processing of checking whether the start button is depressed (step ST614). If no other original is present (No in step ST620), it is checked whether scanning and compression of all the originals are completed (step ST624). If this processing is not completed (NO in step ST624), the flow returns to the processing of checking whether compression of a scanned original page is completed (step ST614). If scanning and compression of all the pages are completed (YES in step ST624), the scanner input routine is terminated.

Assume that a document received through the FAX is printed with retrieval data being added thereto, and at the same time data received through the FAX is stored in hard disk HD as a secondary memory together with the retrieval data. This operation will be described next with reference to the flow charts shown in FIGS. 34 to 36B.

In FAX reception/file retention processing, first of all, it is checked whether FAX reception is started by the FAX board (step ST700). If reception is started (YES in step ST700), the user password portion is separated from the received data and stored (step ST702), and the retrieval data (document number) is counted up (step ST704). The retrieval data (page number) is then initialized to set P to "1" (step ST706). The code portion of the document received through the FAX is sequentially stored in a file portion in page memory 23 (step ST708), and retention/saving processing of a file (the retrieval/search data, the retention/saving start time, the resolution, the password, etc.) is started with respect to hard disk HD (35 in FIG. 1B) as a secondary memory (step ST710).

It is then checked whether there is any free file area in hard disk HD 35 as a secondary memory (step ST712). If a free area is present (YES in step ST712), the file area in page memory 23 is read out and stored in the file in hard disk HD 35 (step ST714). The code from the FAX board is stored in the file portion in page memory 23 (step ST716), and it is checked whether the end of reception is notified by the FAX board (step ST718). If the end of reception is not notified (NO in step ST718), the flow returns to the processing of checking the presence of a free file area in hard disk HD 35 (step ST712). If the end of reception is notified (YES in step ST718), it is checked whether reception is terminated without any error (step ST720). If an error is present (NO in step ST720), all the pages in the file portion in page memory 23 are discarded, and all the pages in the file portion in hard disk HD are also discarded (step ST722). The document number of the retrieval data is then counted down (step ST724), and the processing is terminated.

If reception is terminated without any error (YES in step ST720), it is checked whether the contents of the file area in page memory 23 are completely stored in the file in hard disk HD 35 (step ST726). If this processing is not completed (NO in step ST726), the flow returns to the processing of checking the presence of a free file area in hard disk HD 35 (step ST712). If the processing is completed (YES in step ST726), the flow advances to retrieval data add/print processing (step ST728).

In the retrieval data add/print processing (step ST728), the page number is initialized (step ST730). That is, Pdec is set to "1" or "last page", and Pprt is set to "1" or "last page". It is then checked whether page expansion is in progress (step ST732). If page expansion is not in progress (NO in step ST732), it is checked whether there is any free area in page memory 23 (step ST734). If a free area is present (YES in step ST734), it is checked whether a corresponding page is present (step ST736). If no corresponding page is present (NO in step ST736), the expanded page number is initialized to set Pdec to "1" or "last page" (step ST738). The flow then advances to the processing of checking the end of page expansion processing (step ST750 in FIG. 36A).

If the corresponding page is present (YES in step ST736), the page size/resolution/posture is checked (step ST740), and the page size is reserved in page memory 23 (step ST742). Parameters are set (step ST744), and a resolution conversion ratio is set (step ST746). Page expansion is then started (step ST748).

Assume that this page expansion is started (step ST748), the page expansion is in progress (YES in step ST732), no free area is present in page memory 23 (NO in step ST734), or the expanded page number is initialized to set Pdec to "1" or "last page" (step ST738). In this case, it is checked whether the page expansion is completed (step ST750). If the page expansion is completed (YES in step ST750), the page expansion processing is stopped, and Pdec is incremented or decremented by one (step ST752). After Pdec is changed (step ST752), or if the page expansion is not completed (NO in step ST750), it is checked whether the pages which have undergone page expansion include a page to which no retrieval data is added (step ST754). If such a page is present (YES in step ST754), imaging processing of the retrieval data is performed (step ST756). It is then checked whether there is any page which has not undergone superimposition processing of a retrieval data image (step ST758). If such a page is present (YES in step ST758), superimposition processing of the retrieval data image is completed (step ST760). If the superimposition processing is not completed (NO in step ST760), it is checked whether superimposition processing of the image is in progress (step ST762). If superimposition processing of the image is not in progress (NO in step ST762), superimposition processing of the image is started (step ST764).

If the superimposition processing of the retrieval data image is completed (YES in step ST760), the image superimposition processing is stopped (step ST766). Assume that this image superimposition processing is stopped (step ST766), the pages which have undergone page expansion include no page to which no retrieval data is added (NO in step ST754), there is no page which has not undergone superimposition processing of the retrieval data image (NO in step ST758), superimposition processing of the image is in progress (YES in step ST762), or superimposition processing of the image is started ((step ST764). In this case, it is checked whether page print processing is completed (step ST768 in FIG. 36B).

If page print processing is not completed (NO in step ST768), it is checked whether page print processing is in progress (step ST770). If page print processing is not in progress (NO in step ST770), it is checked whether preparation of a page Pprt image is completed (step ST772). If this preparation is completed (YES in step ST772), page print processing is started, and transfer of the image data to the main body is started (step ST774).

If page print processing is completed (YES in step ST768), the page is closed (step ST776), and it is checked whether printing of all the pages is completed (step ST778). If printing of all the pages is not completed (NO in step ST778), page No. Pprt is either incremented or decremented by one (step ST780). If printing of all the pages is completed (YES in step ST778), all the page print processing is stopped (step ST782), and all the pages are closed (step ST784). The processing is then terminated.

Two or more hard copies of the same data can be printed. This data may be any of image data obtained by scanning at scanner 13, image data received by a communication device such as FAX 39, image data read out from a data storage medium such as an optical disk (or CD-ROM) 38, and other image data such as a graphic data prepared by a personal computer (not shown).

When the embodiment of the present invention prints the above hard copies, it may work as follows:

(1) When a first copy is printed, the corresponding image data is expanded at printer controller 40, and the expanded image data is stored in page memory 23. (This often takes a relatively long period of time.) Then, search information such as a file name or a serial number (cf. the number "940224006-01" placed at the upper right corner of FIG. 22) is added, as needed, to the expanded image data, and the image data with the search information is printed by printer 15.

(2) As the background processing of printing the first copy, the image data having an optional file name (=search information) is stored (or filed) in HDD 35. The method for managing the above filed data using a file name may be the same as a hierarchical file management method conventionally used in a well-known computer operating system such as "UNIX" or "MSDOS" (registered trademarks).

With use of such a hierarchical file management method, when the logical name of HDD 35, the file name (search information), and the path defining the location of a desired image data file stored in HDD 35 are specified, the operating system running on CPU 31 can read the image data of the first copy from HDD 35.

Preferably, the image data filed in HDD 35 should be compressed in size by CODEC 24 in order to obtain a large file space in HDD 35. Conventionally, the time required to compress the filed image data can be actually shorter than that required to expand the print image data in printer controller 40.

(3) When another copy is produced after printing the above first copy, the print data of the first copy is erased from page memory 23. If additional copies which are the same as the first copy become necessary, according to the embodiment of the present invention, no re-scanning for the original of the first copy nor re-expanding for the image data of the first copy original is needed.

More specifically, when the file name (search information) added to the first copy is input from control panel 12 and an operator or user of the embodiment pushes a print start button (not shown) on panel 12, then CPU 31 automatically read from HDD 35 the image data corresponding to the input file name, and the read image data is transferred (, via CODEC 24, if necessary) to page memory 23 without image expansion at printer controller 40.

In this case, the time required to obtain the additional copies can be shortened because the time-consuming image expansion at printer controller 40 is omitted.

Incidentally, when a program, which automatically save the image data of a first copy, runs on CPU 31, a serial number (or a sequential code) as shown at the upper right corner in FIG. 22 is suitable for the search information of the automatically-saved image data file. (This automatic file saving is explained in the flow chart of FIG. 24B.)

Figure 24A:
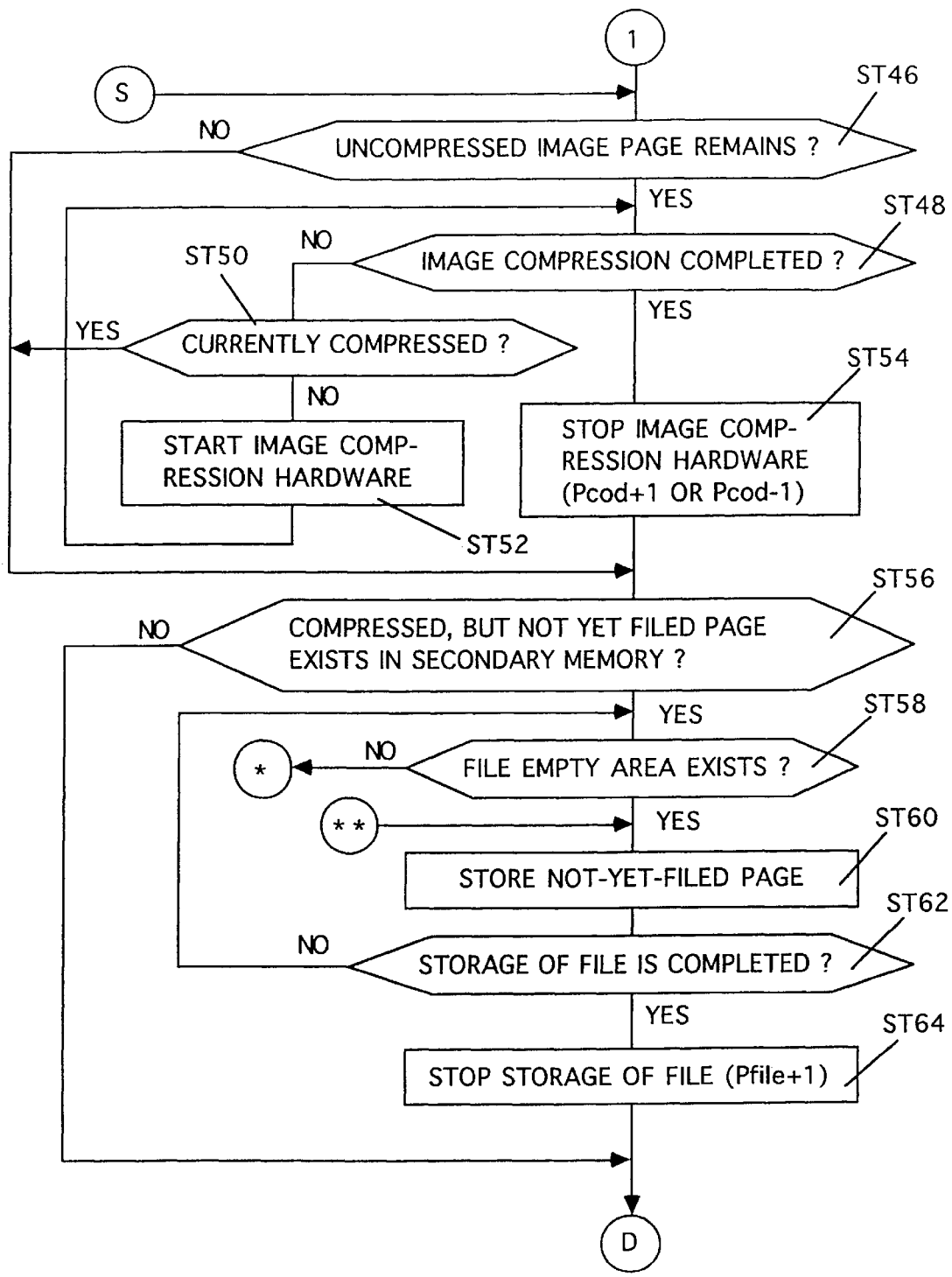
FIGS. 24A and 24B are flow charts for explaining an operation of printing out an image with retrieval data being added thereto in the printer output mode, and at the same time compressing and storing the print image in the hard disk together with the retrieval data.
Figure 24B:
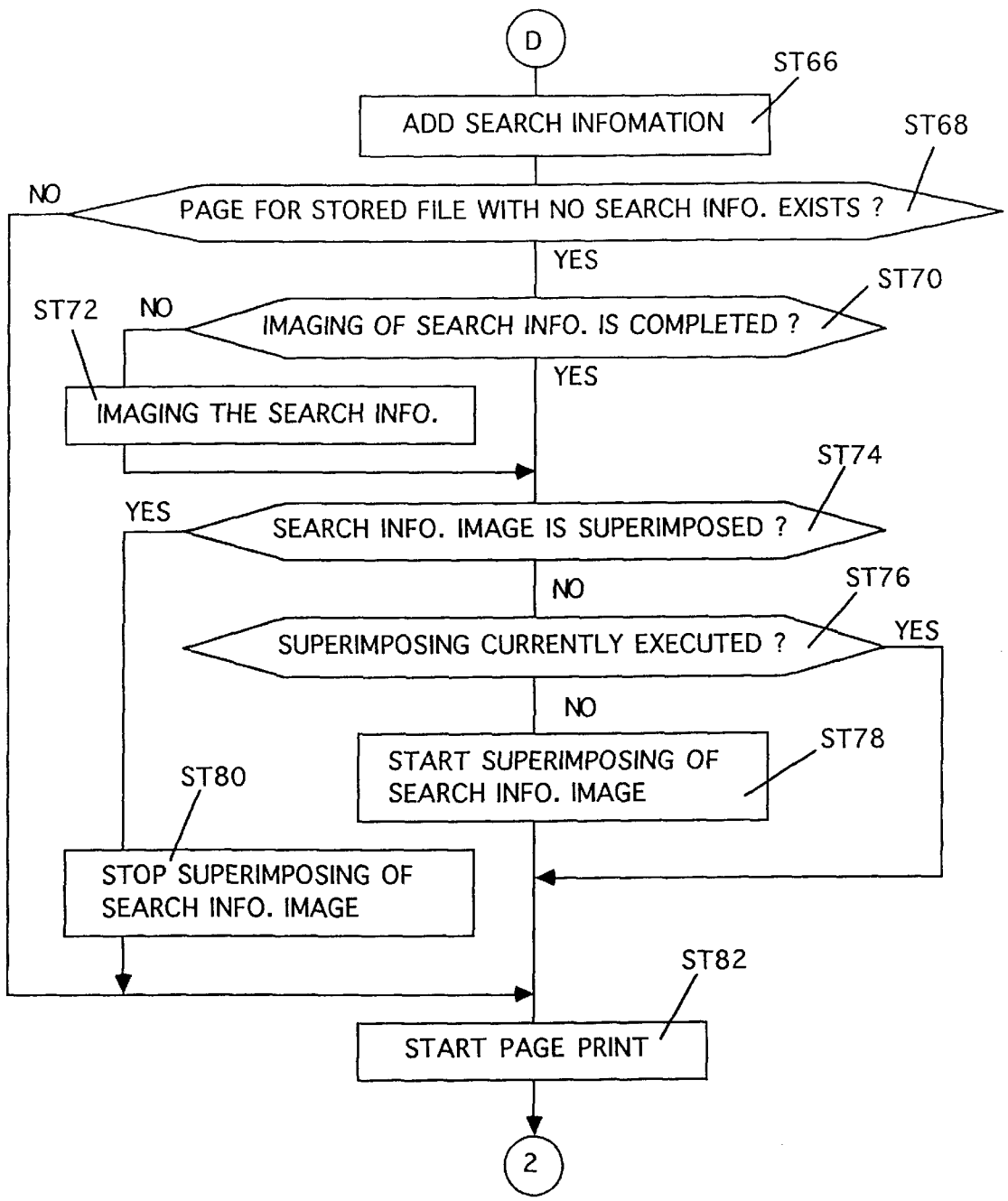

On the other hand, when a program, which optionally save the image data of a first copy in accordance with the manipulation of a user, runs on CPU 31, a file name familiar to the user (e.g., his/her own name or ID number) is suitable for the search information of the optionally-saved image data file. (This optional file saving can be achieved when step ST66 in the flow chart of FIG. 24B is replaced with a manual input step for search information such as the user's name.)

If control panel 12 is provided with a microphone connected to an A/D converter (not shown) and digital voice data output from the A/D converter is sent to CPU 31 in which a conventional voice recognition program runs, the voice of a user can be used for the above-mentioned search information. For instance, when the user's voice pattern "ahaaaaa . . . " or "Thomas Alva Edison" is digitized by the A/D converter and the characteristic(s) of the digitized voice pattern is entered as a specific voice code in the voice recognition program, the entered specific voice code can be used as a file name of the image data to be stored in HDD 35. Once the image data is filed with the specific voice code, only a particular user who has entered his/her voice can access the image data filed in HDD 35.

More specifically, when the user pushes a specific button (not shown) on control panel 12 for producing additional copies of data stored in HDD 35, and speaks his/her name at the microphone (not shown) on panel 12, CPU 31 recognizes the user's voice to obtain the entered specific voice code. Thereafter, CPU 31 searches a specific file indicated by the entered specific voice code. If the specific file is found, the image data of the found file is read from HDD 35 and sent to page memory 23 without expansion at printer controller 40. Then, CPU 31 requests to CPU 11 in basic part 1 that printer 15 starts to produce the copy/copies of the read image data.

In this example, no voice code (search information) is printed on the copy.

According to the embodiment of the present invention, when a first copy has been printed and additional copies identical to the first copy are needed thereafter, a user is required only to input the search number (cf. upper right corner in FIG. 22) and to push the start button (not shown) on control panel 12. Then, the user can obtain the additional copies quickly, because no image expansion for the image data of the additional copies is necessary. (When the present invention is not used, a user has to print in advance a number of copies which could be needed thereafter but could be wasted, or to repeat the copying process from the scanning of the original or the first copy to obtain the necessary number of copies through time-consuming image expansion process at printer controller 40.)

As described above, in the composite digital copying machine of a plain paper copying machine, a printer, and a facsimile apparatus, in printing out document data as codes created by a wordprocessor or the like, when the machine is operated as a printer, an internally obtained data image is compressed and stored, as image data, in the hard disk simultaneously with print processing of the data. When this printout is to be copied (especially, a plurality of copies are required), the original image data is retrieved or searched to be printed without scanning the printout.

With this operation, a printout identical to the first printout can be obtained at a high speed without any image deterioration.

Similarly, when an image is received through the FAX, the received image is printed, and at the same time the compressed data is stored. This data can be used for subsequent facsimile transmission or copy processing.

In addition, the above compressed data of the print image can be used for facsimile transmission of print data.

If the remaining capacity of the hard disk is smaller than the data amount of a document to be stored, old documents in the hard disk can be deleted or erased. Alternatively, when a predetermined period of time has elapsed since an old document was stored in the hard disk, the old document can be deleted or erased from the hard disk.

With this operation, maintenance required when the hard disk becomes full, need not be performed, thereby improving the operability from the viewpoint of the user.

As has been described above, according to the present invention, there is provided an image forming apparatus which can obtain a printout identical to another printout, obtained by performing image development/expansion of document data or codes, at a high speed without any image deterioration.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image forming system comprising:

means for receiving code data of pages of a document from an external device;

means for converting the code data into corresponding image data of the pages of the document;

means for adding predetermined search information to the image data, the search information being common to each of the pages of the document;

means for printing out the image data together with a visible image of the search information on a printing medium;

means for compressing the image data into compressed image data;

means for storing the compressed image data;

means for inputting the search information recognized by an operator on the printing medium and a request of the operator that one or more prints of the code data are produced;

means for reading out the corresponding compressed image data from said storing means in accordance with the search information and the request of said inputting means;

means for expanding the read out compressed image data to provide expanded image data;

means for superimposing the search information to each of the pages of the expanded image data on which the search information has not been superimposed; and means for forming all pages of the image with the search information on one or more print media using the expanded image data in order to obtain the prints of a number being requested by said inputting means.

2. The system of claim 1, further comprising:

means for adding the predetermined search information to at least a first one of the prints to be obtained by said forming means.

3. The system of claim 2, further comprising:

means for superimposing an image of the predetermined search information onto the image data.

4. The system of claim 3, further comprising:

means for automatically adding sequential information, as the predetermined search information to be superimposed, to respective prints obtained by said forming means.

5. The system of claim 3, further comprising:

means for inputting a file name or file code, as the predetermined search information to be superimposed, to any one of the prints obtained by said forming means.

6. The system of claim 1, further comprising:

means for erasing part of the compressed image data stored in said storing means, wherein the erasing part of the stored data has an earlier time stamp given when the erasing part is stored.

7. The system of claim 1, further comprising:

means for erasing part of the compressed image data stored in said storing means, wherein the erasing part of the stored data has a specific time stamp from which a predetermined period of time has elapsed.

8. The system of claim 1, further comprising:

memory means for memorizing one or more time stamps respectively obtained when one or more image data files are stored in said storing means;

timer means for calculating a period of time defined between a prior time indicated by the time stamp memorized in said memory means and a current time, so as to detect an old image data file having the period of time which is longer than a predetermined period of time;

means for erasing from said storing means the old image data file detected by said timer means; and means for renewing the one or more time stamps in said memory means when the compressed image data file is read from said storing means and a visual print of the read compressed image data file is obtained by said forming means.

9. The system of claim 1, further comprising:

memory means for memorizing one or more time stamps respectively obtained when one or more image data files are stored in said storing means;

detector means for calculating a remaining storage size of said storing means as well as a data size of the image data file which is to be stored in said storing means, and comparing the former remaining storage size with the latter image data file size so as to detect whether the image data file size to be stored exceeds the remaining storage size; and means for erasing from said storing means at least one older file within the files stored in said storing means, if said detector means detects that the image data file size to be stored exceeds the remaining storage size.

10. A method of forming an image comprising the steps of:

receiving code data of pages of a document;

converting the received code data into corresponding image data of the pages of the document;

adding predetermined search information to the image data, the search information being common to each of the pages of the document;

printing out the image data together with a visible image of the search information on a printing medium;

compressing the converted image data into compressed image data;

storing the compressed image data;

inputting the search information recognized by an operator on the printing medium and a request of the operator that one or more prints of the received code data are produced;

reading out the corresponding compressed image data stored in the preceding storing step in accordance with the search information and the request of the preceding inputting step;

expanding the read out compressed image data to provide expanded image data;

superimposing the search information to each of the pages of the expanded image data on which the search information has not been superimposed; and forming all pages of the image with the search information on one or more print media using the expanded image data provided by the preceding expanding step, in order to obtain the prints of a number being requested by the preceding inputting step.

11. The method of claim 10, further comprising the steps of:

printing a content of the predetermined search information, corresponding to the request of the requesting step, on the print of the image data expanded at the expanding step at the same time when a first print is obtained.

12. The method of claim 10, further comprising the steps of:

automatically printing a content of sequential search information, corresponding to the request of the requesting step, on the print of the image data expanded at the expanding step at the same time when a first print is obtained.

13. The method of claim 10, further comprising the steps of:

memorizing one or more time stamps respectively obtained when one or more image data files are stored;

calculating a remaining storage size for the compressed image data as well as a data size of the image data file which is to be stored, and comparing the former remaining storage size with the latter image data file size so as to detect whether the image data file size to be stored exceeds the remaining storage size; and erasing at least one older file within the files stored in said storing step, if the image data file size to be stored exceeds the remaining storage size.

14. The method of claim 10, further comprising the steps of:

memorizing one or more time stamps respectively obtained when one or more image data files are stored;

calculating a period of time defined between a prior time indicated by the memorized time stamp and a current time, so as to detect an old image data file having the period of time which is longer than a predetermined period of time;

erasing the detected old image data file; and renewing the one or more time stamps when the compressed image data file is read and a visual print of the read compressed image data file is obtained.

* * * * *